United States Patent
Edelberg et al.

[15] 3,661,681
[45] May 9, 1972

[54] APPARATUS FOR ASSEMBLING INSOLE STRIPS

[72] Inventors: Alan K. Edelberg, Cincinnati, Ohio; Roy T. Swanfeldt, Burlington, Mass.

[73] Assignee: The United States Shoe Corporation, Cincinnati, Ohio

[22] Filed: Sept. 18, 1969

[21] Appl. No.: 859,143

[52] U.S. Cl. ............................ 156/546, 156/304, 156/557, 156/559
[51] Int. Cl. ................................. B32b 31/12, B32b 31/20
[58] Field of Search .................. 156/209, 304, 352, 362, 363, 156/366, 367, 538, 539, 543, 544, 546, 547, 556, 557–561

[56] References Cited

UNITED STATES PATENTS

| | | | |
|---|---|---|---|
| 2,311,766 | 2/1943 | Lumbard | 156/304 X |
| 2,548,527 | 4/1951 | Goff | 156/556 X |
| 2,708,649 | 5/1955 | Cunningham | 156/559 X |
| 2,723,936 | 11/1955 | Ryan | 156/209 |
| 3,084,090 | 4/1963 | Rambo et al. | 156/299 |
| 3,185,130 | 5/1965 | Pratt | 156/546 X |
| 3,251,722 | 5/1966 | Holman | 156/368 X |
| 3,306,805 | 2/1967 | Klein et al. | 156/470 |

*Primary Examiner*—Benjamin A. Borchelt
*Assistant Examiner*—J. M. Hanley
*Attorney*—Jones & Lockwood

[57] ABSTRACT

A machine for assembling diverse strip materials into a composite edge-laminated sheet from which insoles for shoes can be cut is disclosed. Stacks of insole strip materials are arranged on aligned, side by side loading platforms in a feeder portion of the machine. Adjacent edges of contiguous strips may be beveled to permit edge bonding by the machine into a single, composite, flat sheet. A vacuum device in the feeder portion picks up the top strips from each stack and delivers them to corresponding parallel endless belts. The strip from the centrally located loading platform and the strips from the two adjacent platforms are delivered to a first adhesive station where a hot melt adhesive is applied to the edges of the central strip or the corresponding inside edges of the outer strips. After passing the adhesive section, the strips are delivered to an assembly station where the two adjacent strips are moved laterally into alignment with the edges of the central strip. The three strips are then bonded together by being passed through suitable nip and pressure rolls. The resultant intermediate sheet is passed through a second adhesive section, where adhesive is applied to the outer edges, or the corresponding inside edges of the remaining strips, and then passes to a second assembly section. The remaining outer strips are then aligned with the edges of the intermediate sheet for joining by passing through a second set of nip and pressure rolls. The finished composite sheet is then delivered to a stacking station and subsequently may be cut into individual insoles of the desired size and composition.

41 Claims, 32 Drawing Figures

Patented May 9, 1972

INVENTORS
ALAN K. EDELBERG
ROY T. SWANFELDT

BY Beale and Jones

ATTORNEYS

Patented May 9, 1972 3,661,681

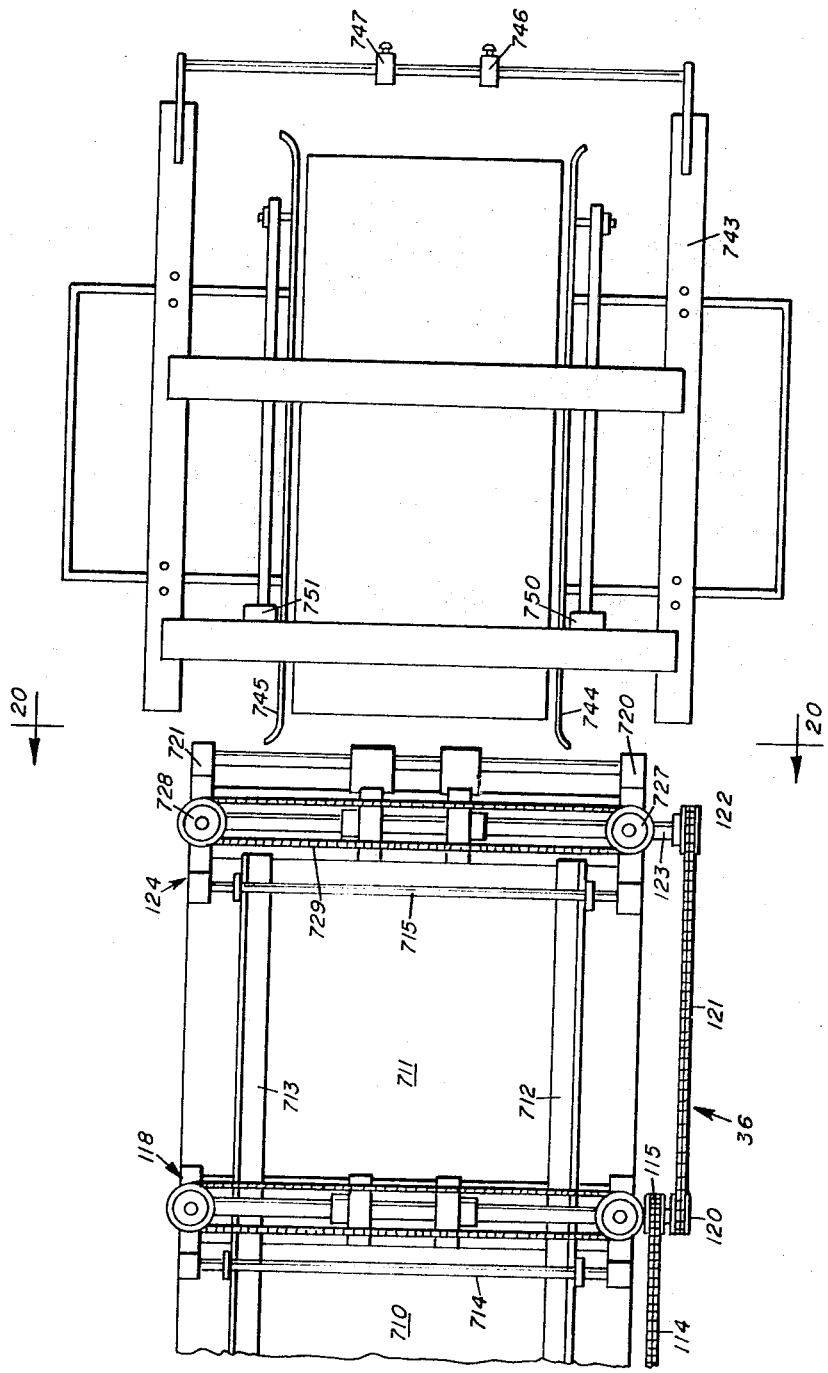

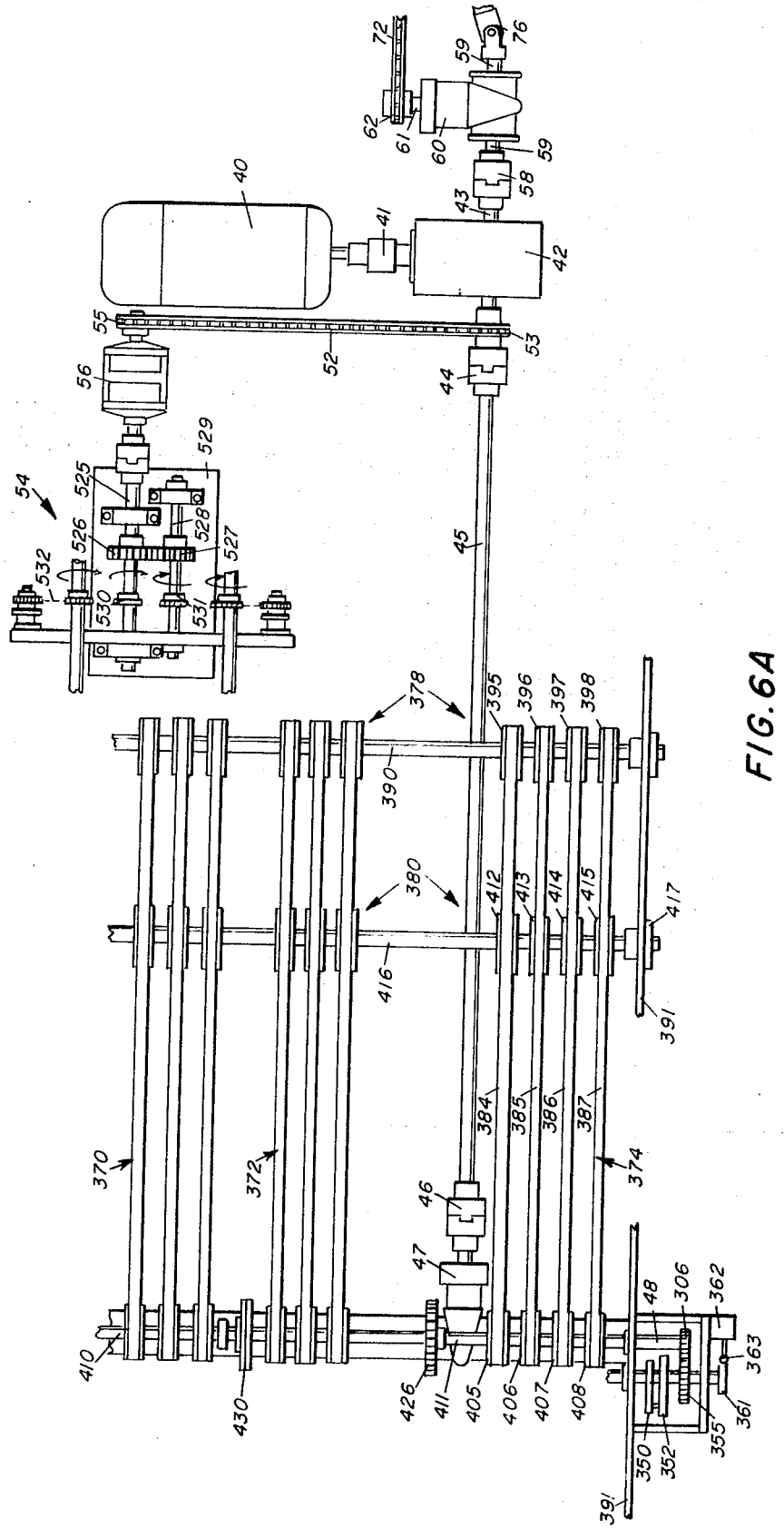

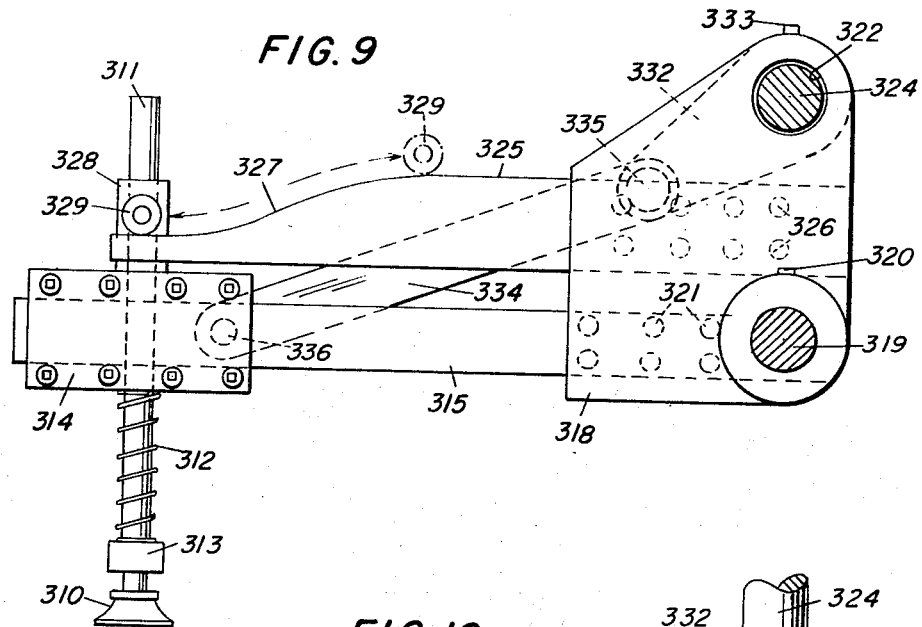
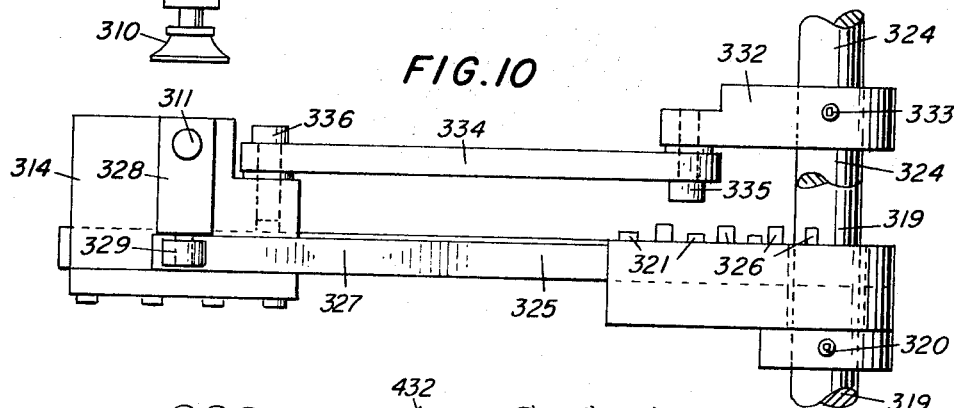
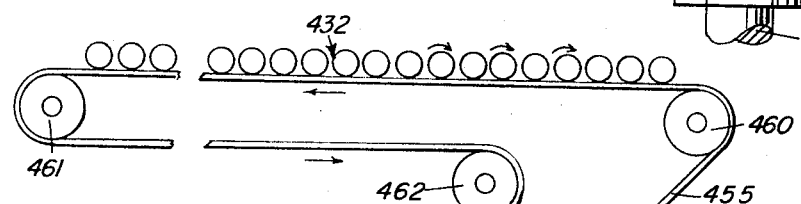
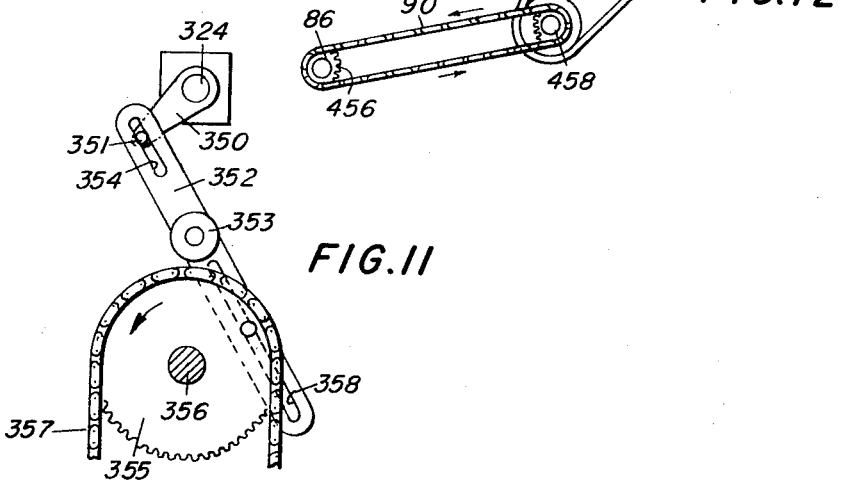

Patented May 9, 1972 3,661,681

APPARATUS FOR ASSEMBLING INSOLE STRIPS

BACKGROUND OF THE INVENTION

The present invention relates, in general, to machines for joining strips edge to edge to produce a composite sheet; more particularly, the invention describes a method and apparatus for assembling strips of diverse materials into a single sheet from which insoles for shoes may be cut.

In the construction of men's, women's and children's shoes, an insole is conventionally utilized to act as a base member to which the upper leather portion of the shoe is attached and to which the sole portion is fastened. The insole must be so constructed as to provide body and strength to certain parts of the shoe, as, for example, the heel or tuck portion, as well as providing flexibility in those areas of the shoe which must be flexible. This latter requirement is particularly important in the case of high-heeled women's shoes where the toe portion of the shoe must be able to bend at a considerable angle with respect to the shank of the shoe. Because of these diverse requirements, a single material is not used for insoles, but several materials are joined together to provide a composite sheet having areas of different characteristics from which the insole itself may be cut.

The requirement for various degrees of strength and flexiblity is complicated by the fact that different types and styles of men's, women's and children's shoes require insoles of widely varying characteristics, while the differences in size may require still other considerations. Thus, some types of shoes may require an insole having two different characteristics, while others may require three different characteristics: a relatively stiff toe portion, a flexible forepart, at the area of greatest flexibility, and a hard, stiff heel portion, or tuck. Thus, it is not possible to make up one type of composite insole sheet which would be usable for all sizes, styles and types of shoes, and any machine for making such sheets must be capable of handling a variety of sizes and materials of strips, and must also be able bond different numbers of strips to produce the desired sheet material.

It is the practice in the art to make up a single composite insole sheet by joining strips of material having the desired characteristics for various portions of the insole, and then to cut out the insoles from such sheets, the cutout extending across the strips in a manner to embrace the desired materials. To avoid waste, the insole sheets must be made in various configurations. At present, they are formed by edge joining selected component strips wit latex adhesives, which require heat drying to drive off the water carrier for the latex prior to joining, and thus require a time delay between the coating and bonding steps. The coated edges must then be pressure bonded to complete the joint.

Because of the variety of materials and sizes of sheets required for insoles, and because of the problems inherent in edge joining the constituent strips, automatic machinery has not been devised, and in the prior art, assembly of insole sheets has been done primarily by hand. The adhesive was applied by hand to the edges of the strips, and adjacent strips were placed together and fed by hand through a press roll to effect the desired bond. Since thermoplastic adhesives set too quickly for hand application and assembly, latex adhesives, requiring drying time, have been used, further extending the assembly time. To produce sheets of the desired size, additional strips would be added to the sheet, one strip at a time, the gluing and pressing steps being repeated for each strip. Such hand operations require a considerable degree of skill if usable insole sheets are to be produced in any quantity. Further, in hand operations of this type, the limit of productivity is quickly reached, and these factors, among others, have resulted in substantial costs to shoe manufacturers who rely on independent contractors for their supplies of insole sheets. Increasing labor costs and increasing demand have, in recent years, caused the prices of such sheets to reach a substantial proportion of the total shoe manufacturing costs. For these reasons, the industry has been seeking improved and less expensive methods of production to provide better quality insole sheets together with lower costs. In addition, means have been sought to increase the supply of insole sheets, for the limited production facilities now available with hand assembly of insole sheets reduces the availability of materials for shoe manufacture.

SUMMARY OF THE INVENTION

It is, therefore, an object of the present invention to provide a method of producing insole sheets of desired configurations automatically, thereby to reduce the cost of such sheets and to improve their quality and availability.

A further object of the invention is to provide a machine for automatically assembling insole sheets from constituent strips of material.

An additional object of the invention is to provide a method and apparatus for manufacturing a composite sheet of material from constituent strips of material by automatic edge lamination.

Another object of the invention is to provide a machine for assembling constituent strips of material into a single composite sheet by automatically feeding the strips to a first adhesive station where an adhesive is applied to at least one edge of one strip, moving the glued strip to an assembly station where a second strip is moved into alignment with the glued edge, and passing the two contiguous strips through a roller mechanism to effect edge bonding.

A further object of the invention is to provide a machine for edge laminating up to five strips into a single sheet of material, the machine including means for passing a first strip through an adhesive applying station to an assembly station where second and third strips are moved into positions adjacent the glued edges of the first strip, passing the three strips through a pressure roller station to edge laminate the first strip to corresponding edges of the second and third strips to produce an intermediate strip, passing the intermediate strip through a second adhesive station for applying adhesive to the outer edges of the intermediate strip and positioning the intermediate strip at a second assembly station, moving fourth and fifth strips into alignment with corresponding adhesive-coated edges of the intermediate strip, passing the intermediate strip and the fourth and fifth strips through a second pressure roll station for edge bonding to produce the final composite sheet which may then be transported to a delivery station for stacking.

Briefly, the invention comprises a machine for automatically assembling a composite sheet of material from up to five strips of material. The strips from which the final sheet is assembled are stacked on aligned, side-by-side loading platforms, and feeder means automatically feed one strip at a time from each loading platform onto corresponding parallel conveyors. The central, or first strip may be a relatively stiff fiberboard which will ultimately comprise the toe portion of a typical insole. The second and third strips, which flank the first strip and are to be bonded to opposite edges of the first strip, may be comprised of a flexible material such as foam rubber laminated to a fiber sheet or a leather scrap sheet. This portion of the composite sheet will be used to make up the forepart of an insole.

Flanking the second and third strips, respectively, are the fourth and fifth strips which are adapted to be bonded to the outermost edges of strips two and three. The outermost strips may be hard fibrous material which forms the heel portion, or tuck, of an insole. It will be apparent that these five strips may be made up of any suitable materials, such materials being known in the art and dependent upon the particular characteristics desired in the final composite sheet. Further, although the machine as illustrated is adapted to laminate five strips, it will be apparent that by proper adjustment of the control mechanisms, a lesser number of strips can be assembled. On the other hand, by extending the machine laterally to accommodate additional stacks of strips, and by extending its length to include additional adhesive, assembly and roller stations, any desired additional number of strips may be assembled to form a composite sheet of the desired configuration. Various adjustments are also provided in appropriate locations to permit varying widths and thicknesses of strips to be used.

After the five strips are fed from their stacks onto their corresponding conveyors, strip 1 is passed through an adhesive applying station, where a suitable thermoplastic adhesive is applied to the longitudinal edges of the strip. In the illustrated embodiment, the adhesive is applied to a lower beveled surface of this strip, but it will be apparent that other arrangements are possible. For example, the adhesive might be applied to the upper or under surfaces of the inner edges of strips 2 and 3 or, with a slight modification in the assembly portion of the machine, the adhesive could be applied to the upper surface of strip 1. The "hot melt" preferably is applied by means of a driven roller to insure that the adhesive is applied evenly to a well-defined area of the strip.

The first three strips are delivered to a first assembly station where they are longitudinally aligned. The two outer strips are then moved laterally into vertical alignment with the adhesive-coated edges of the central strip. Preferably, the central strip is located on a raised surface so that the two side strips can be moved laterally under and slightly spaced from the central strip. When the three strips are properly aligned, means are provided to feed them to a first roller station which is comprised of a nip roller and a pressure roller which securely bonds the outer edges of the central strip to the corresponding inner edges of strips 2 and 3.

After passing through the pressure rollers, the intermediate sheet, formed of edge-laminated strips 1, 2 and 3, is fed to a second adhesive station where a hot melt adhesive is applied to the lower surfaces of the outer edges of strips 2 and 3, in the same manner as occurred with strip 1 in the first adhesive section. The intermediate strip then passes to a second assembly station where it is aligned longitudinally with the fourth and fifth strips which have been carried by their corresponding conveyors directly to this location. Strips 4 and 5 are then moved laterally toward the intermediate strip so that the inner edges of strips 4 and 5 are aligned with the outer edges of the intermediate sheet to which the adhesive has been applied. As before, the intermediate sheet is located on a raised surface so that sheets 4 and 5 may be vertically aligned and slightly spaced from the edges to which they are to be joined. Means are then provided to feed the intermediate sheet and the two outer strips to a second roller section which is comprised of a second nip roller and second and third pressure rollers for bonding the strips to the intermediate sheet, thereby forming the final composite sheet.

The final sheet is delivered to a suitable stacking mechanism which receives the sheets and, when it is full, shuts down the machine to permit unloading. Various other control mechanisms are provided for the machine to provide automatic operation of the feeder mechanism so that the machine will only operate when there is a sufficient supply of strips, and to operate the assembly sections so that the strips will automatically be aligned and will operate only when the proper number of strips are present at the assembly station.

The foregoing and additional objects, features and advantages of the present invention will best be understood and appreciated from the following detailed description of a preferred embodiment thereof, selected for purposes of illustration and shown in the accompanying drawings, in which.

Figure 4A:
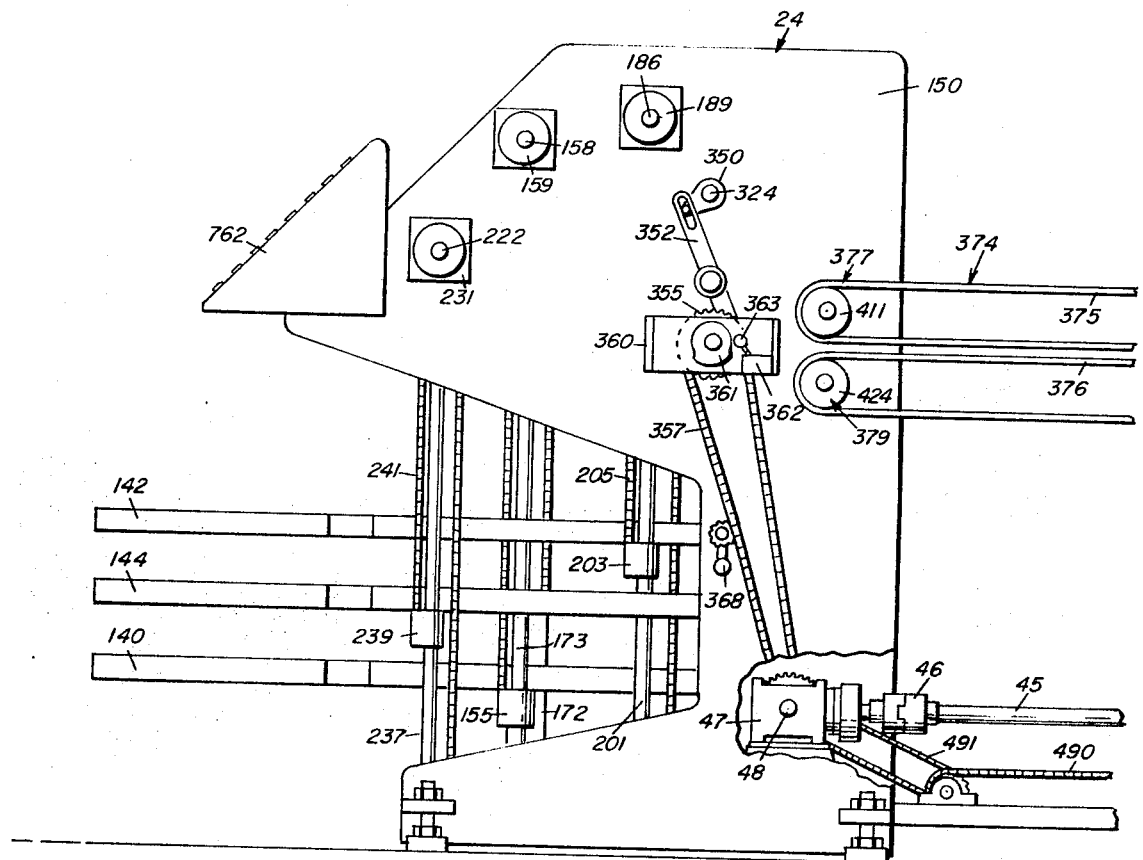
Figure 5A:
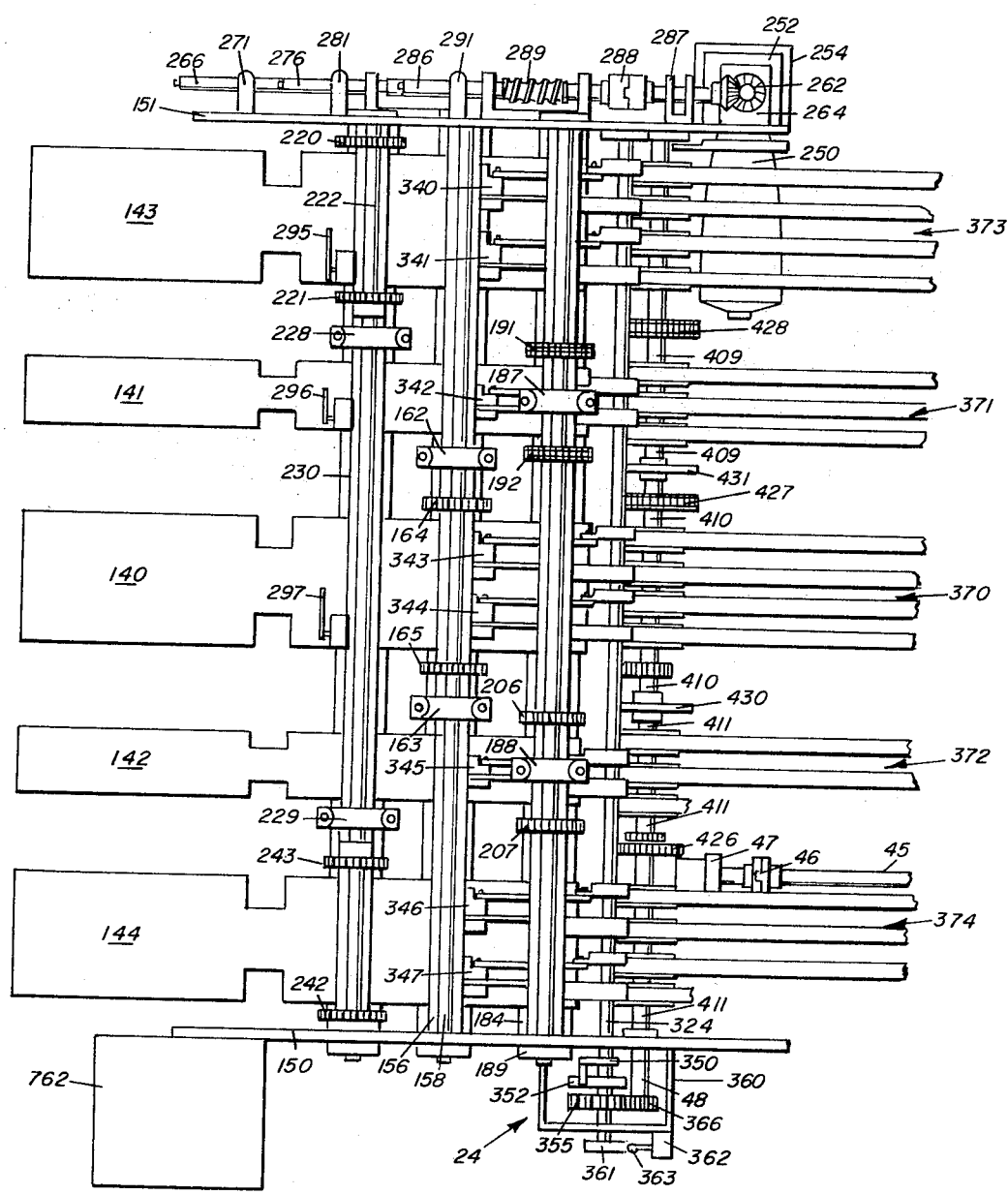
Figure 5B:
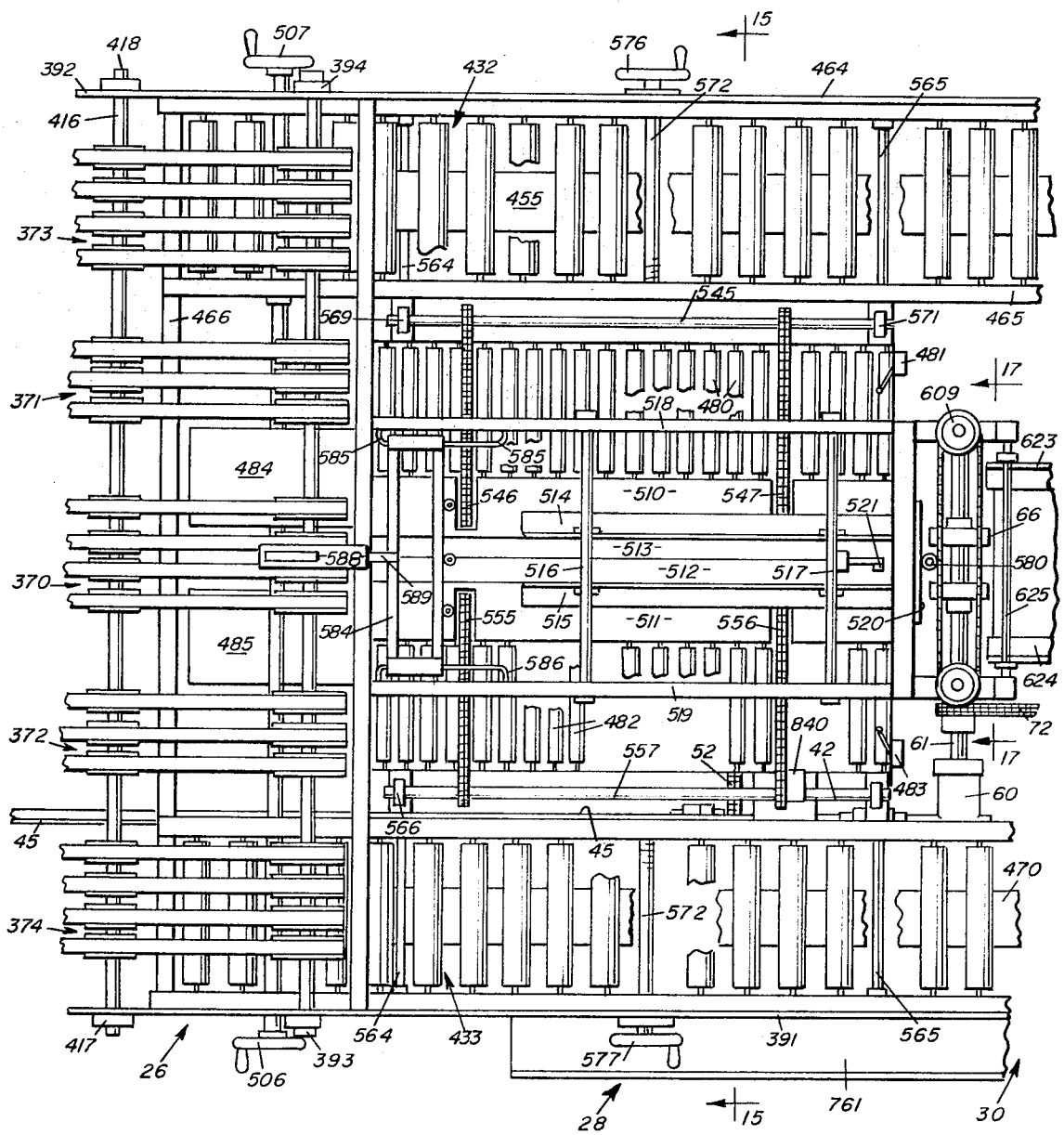
Figure 6B:
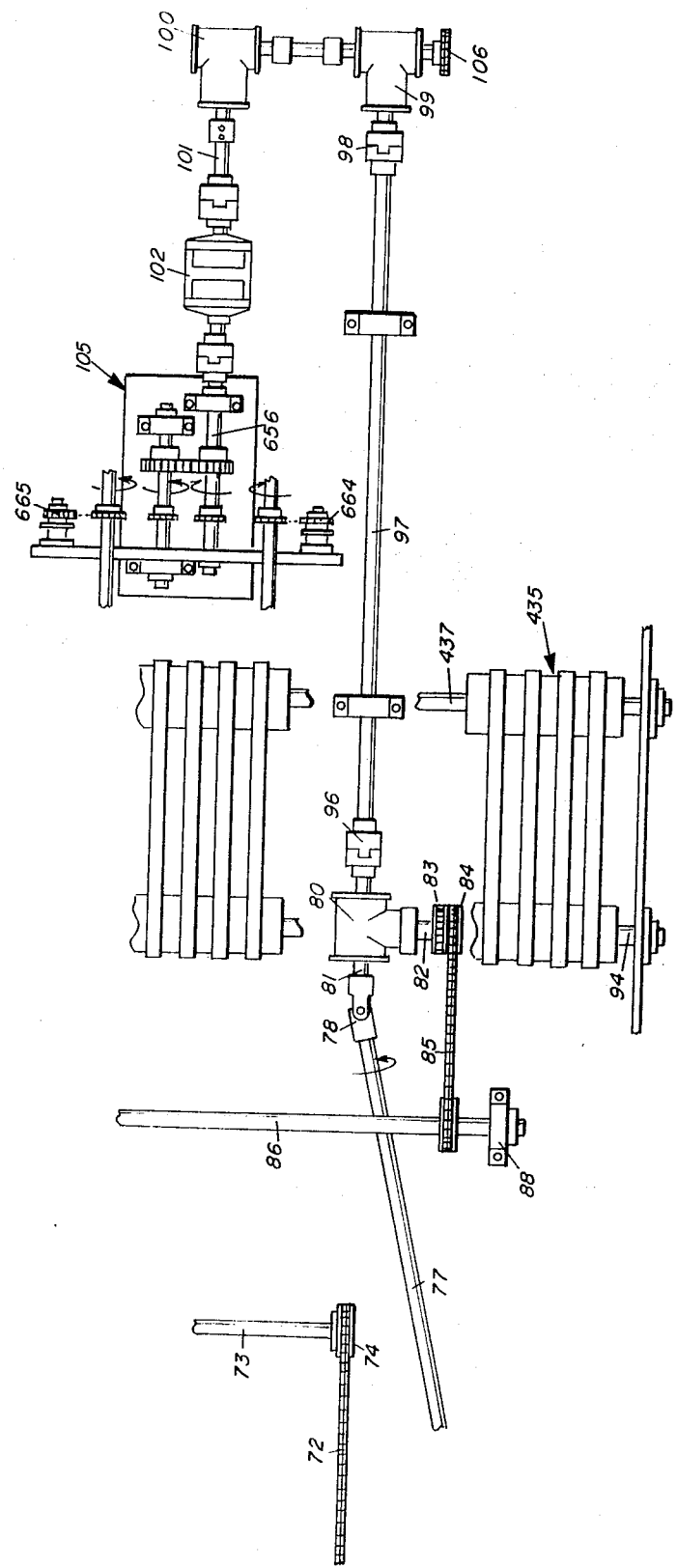
Figure 7:
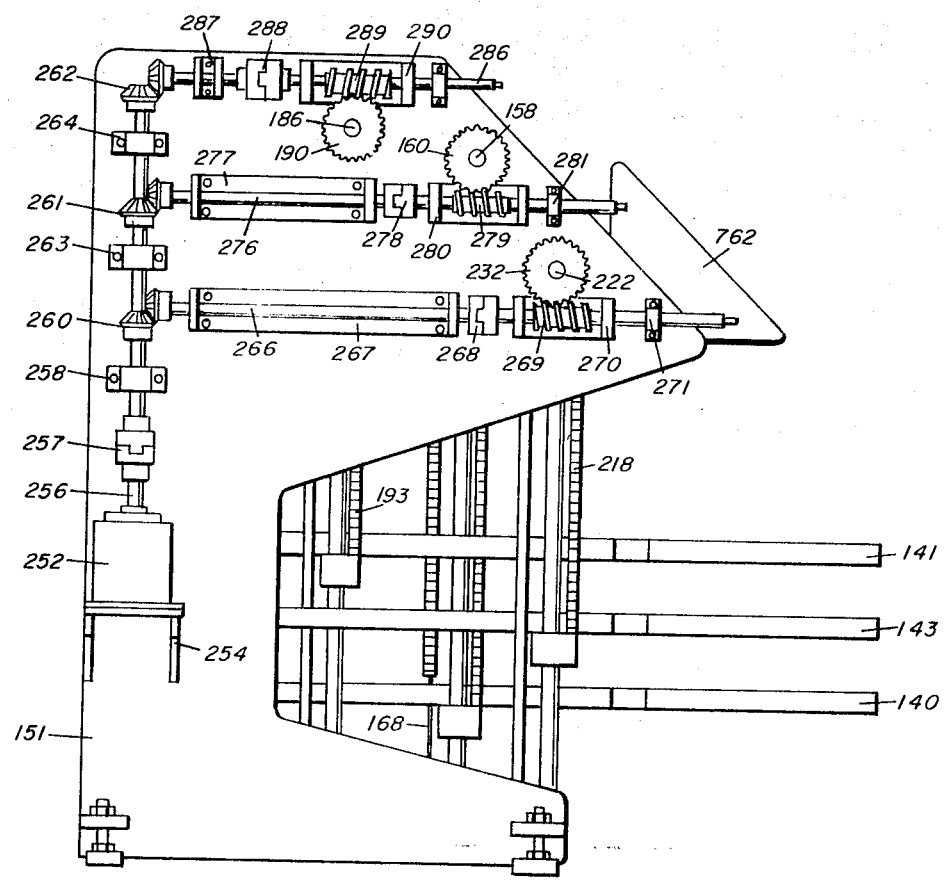
Figure 8:
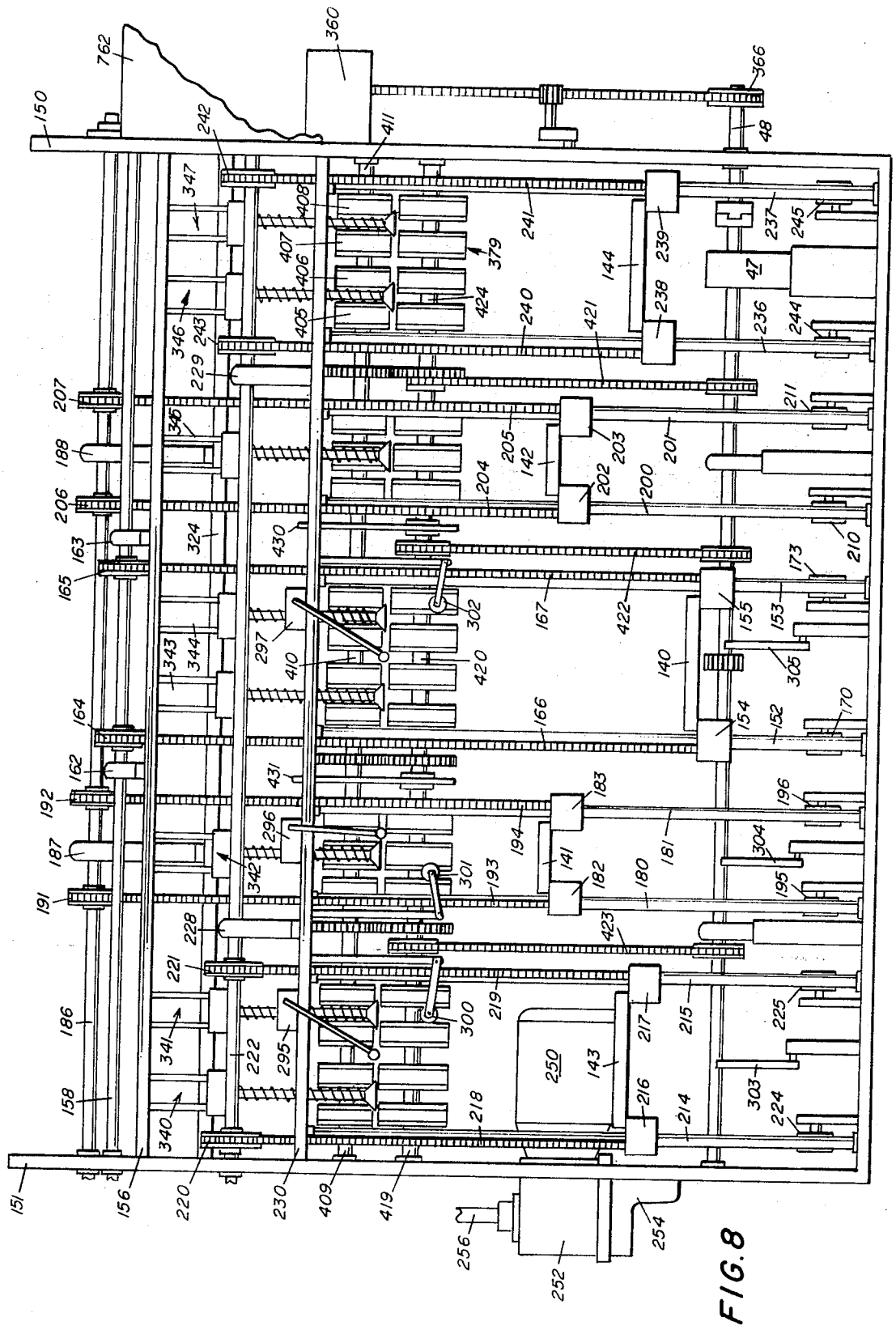
Figure 13:
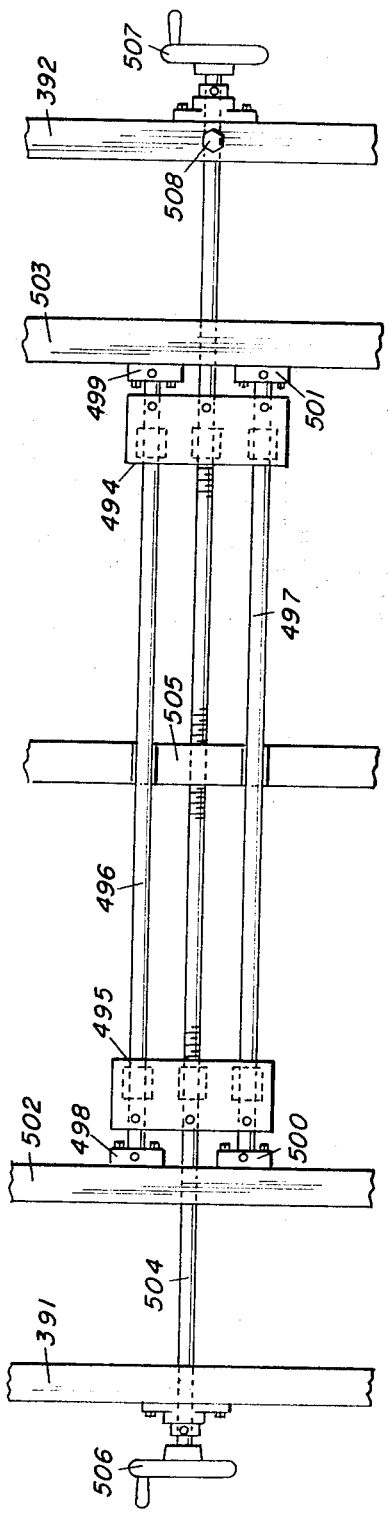
Figure 14:
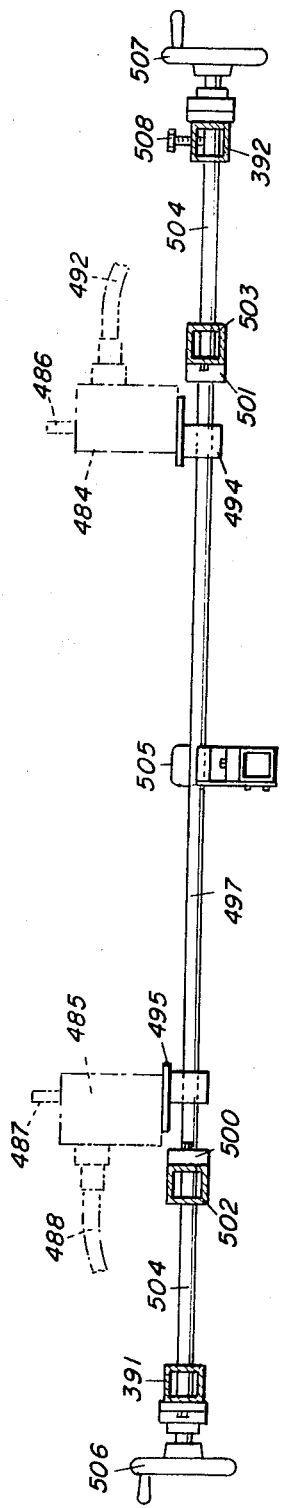
Figure 15:
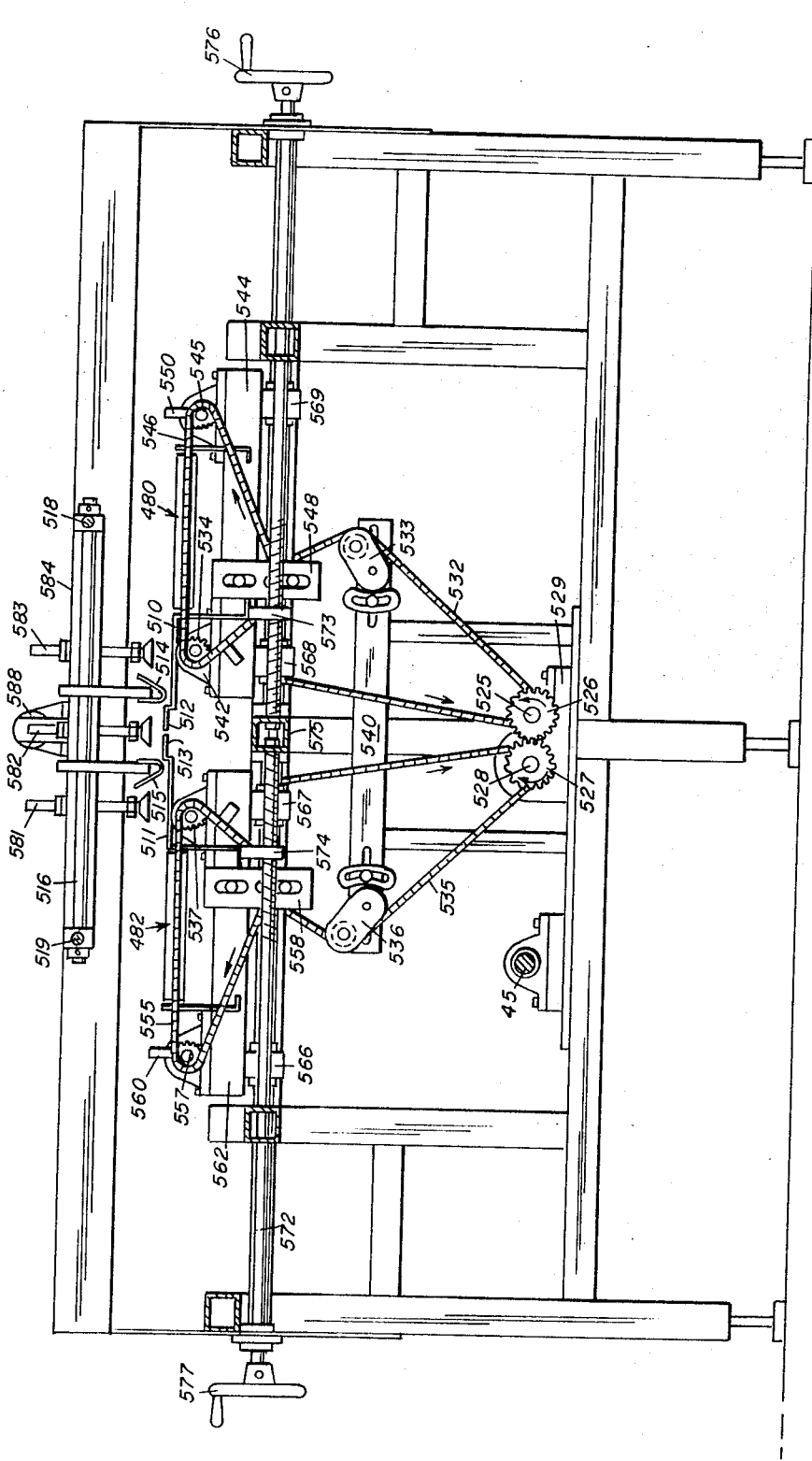
Figure 16:
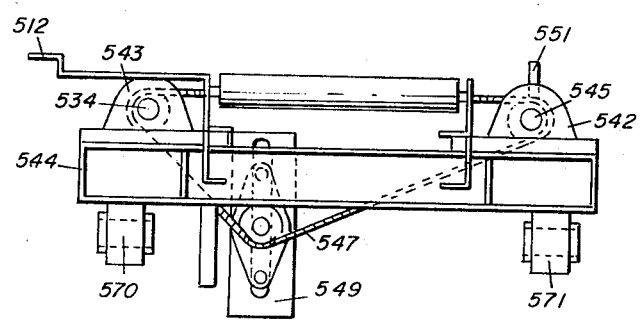
Figures 17, 21A:
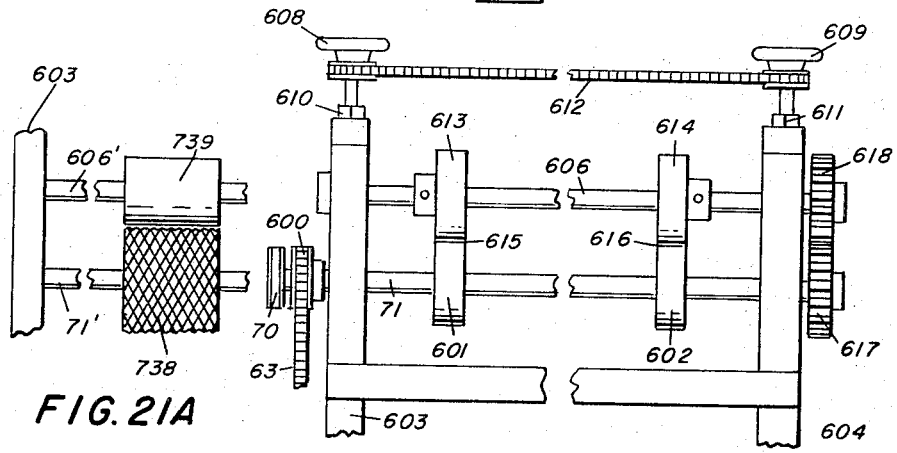
Figure 19:
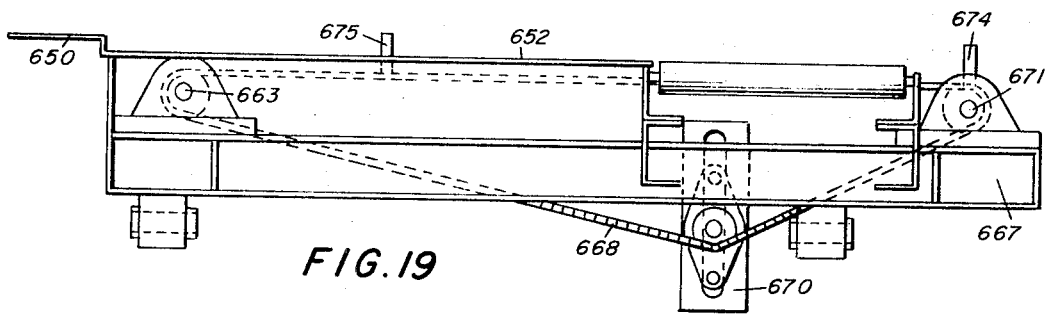
Figures 20, 21:
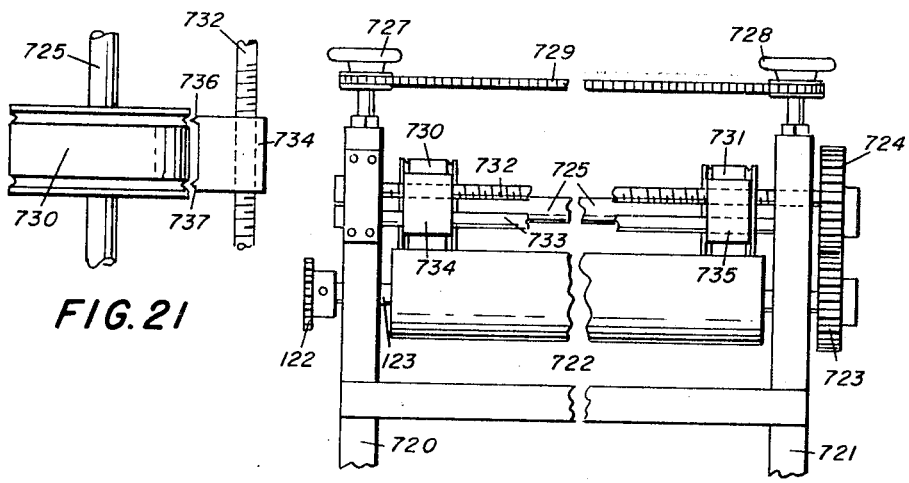
Figure 18:
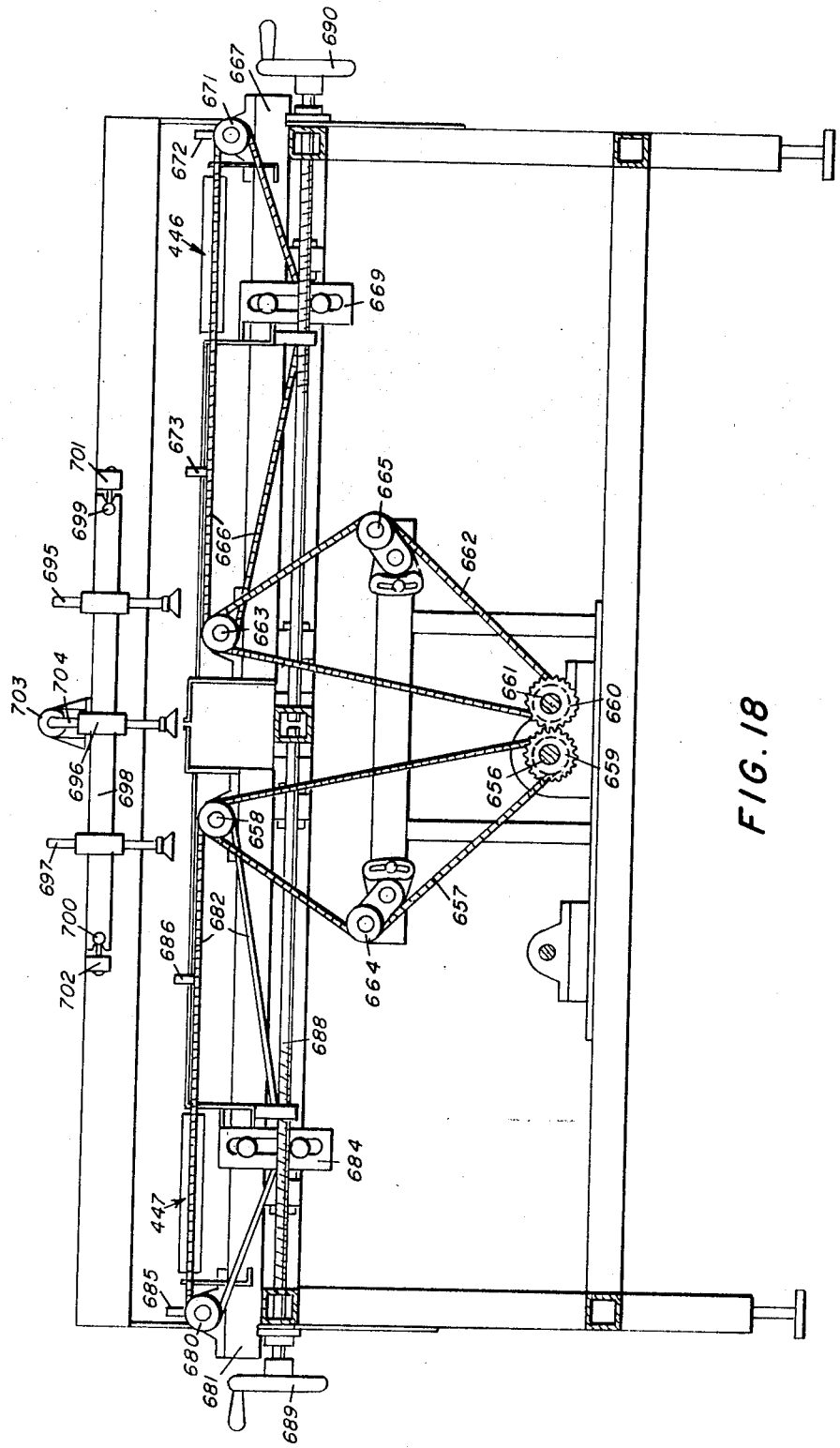

FIGS. 4A through 4D taken together provide a side plan view, with portions of the side housing cut away, of a machine constructed in accordance with the present invention;

Figure 5C:
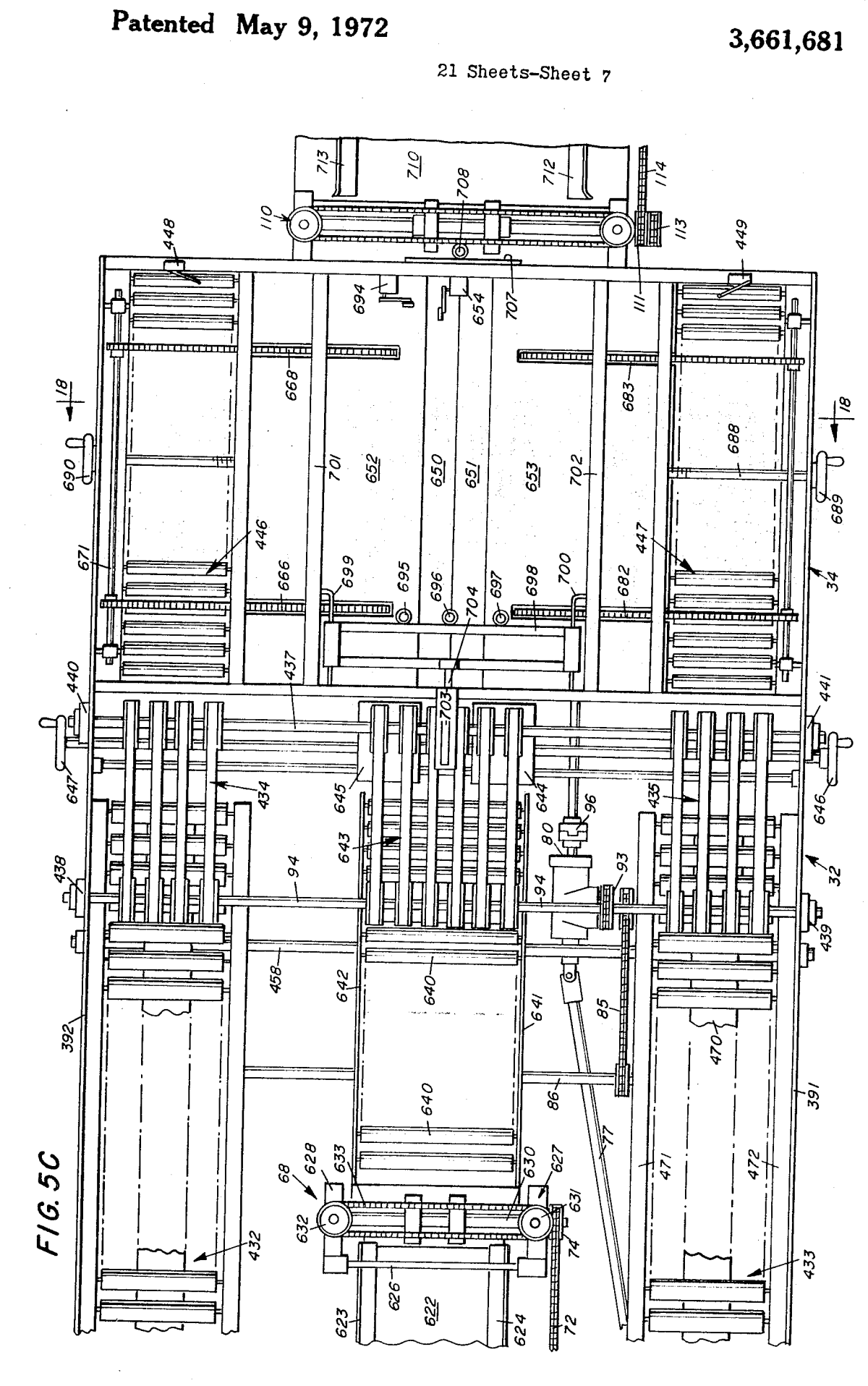

FIGS. 5A through 5D taken together are a top plan view of the machine of FIGS. 4A through 4D;

FIGS. 6A and 6B are a top view of the drive train for the machine of FIGS. 4A through 4D, showing portions of the conveyor belts;

FIG. 7 is a side plan view of the feeder section of the machine of FIGS. 4A through 4D, showing the side of the feeder opposite to that shown in FIG. 4A;

FIG. 8 is an end view of the feeder section of the machine of FIGS. 4A through 4D;

FIG. 9 is an enlarged side view of a suction head feed mechanism used in the delivery section;

FIG. 10 is a top view of the suction device of FIG. 9;

FIG. 11 is an enlarged view of the reciprocating drive mechanism for the suction feeder of FIG. 9;

FIG. 12 is a partial, enlarged view of the conveyor drive mechanism used in the machine of the present invention;

FIGS. 13 and 14 are top and side views, respectively, of the adhesive station used in the machine of the present invention;

FIG. 15 is a cross section of the first assembly section of the machine of the present invention taken along lines XV—XV of FIG. 5B and looking toward the feeder section;

FIG. 16 is an isolated view of the portion of the first assembly section shown in FIG. 15 which may be adjusted to accommodate various widths of strip material;

FIG. 17 is an end view of the nip roller used in the first roller section of the machine of the present, the view being taken along lines XVII—XVII of FIG. 5A;

FIG. 18 is a sectional view of the second assembly station taken along line XVIII-XVIII of FIG. 5C and looking toward the feeder section;

FIG. 19 is an isolated view of the portion of the assembly station of FIG. 18, illustrating the adjustable portion of the assembly mechanism;

FIG. 20 is an end view taken along line XX—XX of FIG. 5D, showing the pressure rollers of the second roller station;

FIG. 21 is an enlarged view of the roller adjustment mechanism for the pressure roller of FIG. 20 while FIG. 21A shows an alternative form of roller; an FIGS. 22A—22D taken together provide a schematic diagram of the electrical circuitry used in the operation and control of the machine of the present invention.

DESCRIPTION OF A PREFERRED EMBODIMENT

Figure 1:
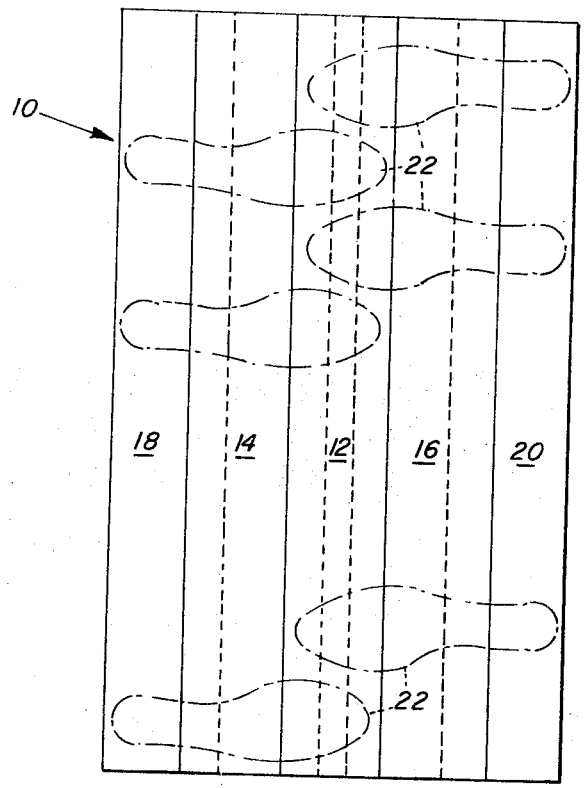
FIG. 1 is a top view of an insole sheet assembled by the machine of the present invention.
Figure 2:
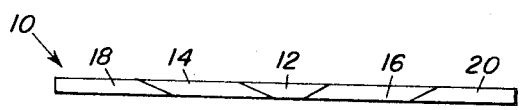
FIG. 2 is an end view of the sheet of FIG. 1.
Figure 3:
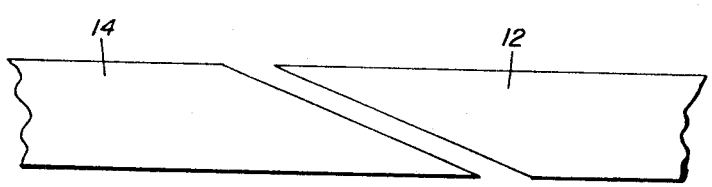
FIG. 3 is an enlarged view of the bonded joints between adjacent strips in the sheet of FIG. 1.

Turning now to a consideration of the drawings, there are illustrated in FIGS. 1, 2 and 3 various views of the composite sheet produced by a strip assembly machine made in accordance with the present invention. This composite sheet is comprised of a plurality of strips of material which have been edge laminated, or bonded together along corresponding sides to form a single sheet 10 from which insoles for shoes may be cut in a manner known to the prior art. Such composite insole sheets are, of themselves, well known to the shoe manufacturing industry, and are in present use in the manufacture of footwear. At the present time, these sheets are manufactured by independent contractors in what is essentially a hand process; that is, automatic machinery for bonding the constituent strips to form an insole sheet is not presently used or known. Thus, the manufacturer of these sheets must hand assemble the strips, applying a latex adhesive to the edges which are to be bonded, allowing the adhesive to dry, and feeding the strips by hand through pressure rolls which bond the edges of the strips. As has been noted, this is a time consuming and expensive operation and the manufacturers of such sheets are often unable to meet the demand, thus causing delays in the manufacture of footwear and increasing its cost.

The composite sheet 10 of FIGS. 1, 2 and 3 may be made up of various numbers of strips, depending upon the particular type of shoe in which the insoles cut from the sheet are to be used. In normal manufacture, it is expected that 2, 3, 4 or 5 strips may be bonded together to form different insole sheets, and it is not uncommon for a manufacturer to require a continuous supply of each type of composite, which various materials being used in combination to form additional types of sheets. Such variations in the final sheet are easily handled in a hand operation, but produce serious problems in automatic machine assembly, particularly when the strips may vary not only in number and material, but in width. For this reason, machine assembly of insole strips into insole sheets has not been practical up to the present time. The present machine overcomes the difficulties described above, and permits automatic assembly of insole sheets more quickly, more economically, and more accurately than previously was possible. For purposes of illustration, a machine for handling a five-strip sheet is shown in the present description; however, it will appear from what follows that lesser numbers of strips may be assembled by the present machine without mechanical changes, and that various strip widths may be accommodated by simple mechanical adjustments to the operating mechanism, whereby sheets of 2, 3, 4 or 5 strips may be assembled, and the strips may be of any desired widths.

The composite sheet illustrated in FIGS. 1-3 typically may include a first, or center strip 12 of a relatively stiff fiberboard which may be approximately 3 or 4 inches wide and 0.060 inch thick. This central strip may comprise the toe part of the resultant insole. Flanking the central strip are second and third strips 14 and 16, respectively, which are to be bonded to corresponding edges of the central strip. As shown in FIGS. 2 and 3, the corresponding edges of strips 12, 14 and 16 are beveled, the edges of strip 12 being undercut to match the upper beveled surfaces of the adjacent strips. Adhesive may conveniently be applied to the undercut beveled surface of toe strip 12 by passing the strip over a suitably positioned roller-applicator. The side strips 14 and 16 may then be positioned under their corresponding beveled edges and the strips passed through a roller to effect the desired bonding.

Strips 12, 14 and 16, when assembled, form an intermediate sheet to which the outermost strips 18 and 20, which are the fourth and fifth strips of the composite sheet, may be joined. The outer edges of strips 14 and 16 are shown as being beveled in the manner described with respect to the central strip 12; that is, the outer edge of strip 14, which corresponds to strip 18, is beveled on its lower surface to match the bevel on the upper surface of strip 18. Thus, adhesive may be applied to the beveled surface of strip 14 by means of a roller, strip 18 may be aligned under the edge of strip 14 and the two parts may be bonded by passing them through a roller. Similarly, the outer edge of strip 16 and the corresponding inner edge of strip 20 are beveled and bonded. It may be preferred to leave some or all of the edges unbeveled, in which case the adhesive would be applied to the upper or lower surfaces of the strips, adjacent the edges.

Strips 14 and 16 comprise the forepart of the completed insole, and will be referred to herein as the forepart strips. These strips may be made up of various flexible materials, depending upon the requirements of the shoe. Foam rubber laminated to a fiber sheet or to a leather scrap sheet has been found suitable, although other flexible materials such as felt may also be used. This strip may be one thirty-second to one-sixteenth of an inch thick, and may be 3 to 5 inches wide, for example. The outermost strips 18 and 20 form the heel part, or tuck, of the completed insole and will be referred to herein as the heel strips. These outermost strips generally are of a hard fibrous material that is relatively inflexible. This strip may be approximately 5 to 8 inches wide and 0.080 to 0.125 inch thick. These dimensions are illustrative of the normally-used strips, but it will be apparent that variations can be made, dependent on the needs of the industry.

As illustrated by the dotted outlines 22, insoles may be cut from the insole sheet 10 which will embrace the toe, forepart and heel strips. The insoles are cut on opposite sides of the toe strip in order to obtain a maximum number of insoles from a given sheet with a minimum amount of wastage. It will be apparent that where three different types of materials are not required in an insole, a composite sheet using a fewer number of strips will be constructed. Similarly, the width of the strips will vary with the size of the insole to be cut, the desired location in the mode of the various materials, and other factors.

A machine for assembling toe, forepart and heel strips into a composite insole sheet such as that illustrated in FIGS. 103 will now be described in a preferred embodiment. FIGS. 4A through 4D present a side view of such a machine, with portions of the side housing removed to provide a more detailed illustration of the manner in which the invention is carried out, while FIGS. 5A through 5D present a top plan view of the machine of FIG. 4, and reference is now made to these FIGURES. The insole assembly machine of FIG. 4 may be divided into roughly eight sections: a feeder section indicated generally at 24, a first adhesive section 26, a first assembly section 28, a first roller section 30, a second adhesive section 32, a second assembly section 34, a second roller section 36 and a delivery section 38.

Feeder section 24 stores the insole strips which are to be joined together to form the final sheet, and feeds one set at a time to corresponding conveyors, one conveyor being provided for each strip. The center toe strip passes through the first adhesive section 26 where a suitable thermoplastic adhesive is applied to the beveled undersurface of each longitudinal edge. This center strip then passes into the assembly section 28 along with the second and third forepart strips. All three strips are longitudinally aligned, and the forepart strips are moved laterally so that their inner edges are vertically aligned with the beveled edges of the center strip. These three strips are then fed together into the first roller section 30, where the corresponding edges of the three strips are pressed together and, as the adhesive cools, bonded.

The intermediate sheet, composed of the now assembled center and forepart strips, is passed through the second adhesive section 32, where thermoplastic adhesive is applied to the beveled outer edges of the forepart strips, the adhesive being applied to the lower surface of the edges. The intermediate sheet then is fed to the second assembly section 34, where it is longitudinally aligned with the two heel strips which have been fed directly to this location from the feeder section 24. Upon alignment, the heel strips are moved laterally inwardly until the inner edges of the heel strips are aligned vertically with the beveled edges of the intermediate sheet to which they are to be bonded. The intermediate sheet and the two heel strips are then fed together through the second roller section 36 for bonding, after which the completed insole sheet is fed to the delivery section 38 for stacking. A common drive train, together with suitable control circuits and appropriately placed sensing microswitches for sensing the location of the various strips during the operation insure a synchronous operation of the machine.

DRIVE TRAIN

The drive train for the insole sheet assembly machine is illustrated in top plan view in FIGS. 6A and 6B, to which reference is now made. A main drive motor 40 provides the drive power for the machine. This motor may be a 1½ horsepower General Electric Model 186AT motor or equivalent, connected by way of shaft coupler 41 to a suitable speed reducing gear 42 from which output power is obtained. An output shaft 43 from the gear reducer is connected by way of coupler 44 to a drive shaft 45, the opposite end of which is connected through a coupler 46 to a bevel gear drive 47, by means of which feeder drive shaft 48 is driven. Shaft 48 provides the motive power for the first set of conveyors which receive insole strip components from the feeder mechanism and provides drive power to the reciprocating feeder mechanism in feeder section 24.

Coupled to the output of the gear reducer by way of a chain 52 carried by a sprocket 53 on shaft 43 is the first assembly section drive mechanism, generally indicated at 54 and shown in side view in FIG. 4. This drive mechanism is actuated by chain 52 through sprocket 55 on electrically controlled clutch-brake 56, energization of this clutch serving to move the forepart strips laterally toward the center strip in the first assembly section, as will be explained in detail hereinbelow.

Figure 4B:
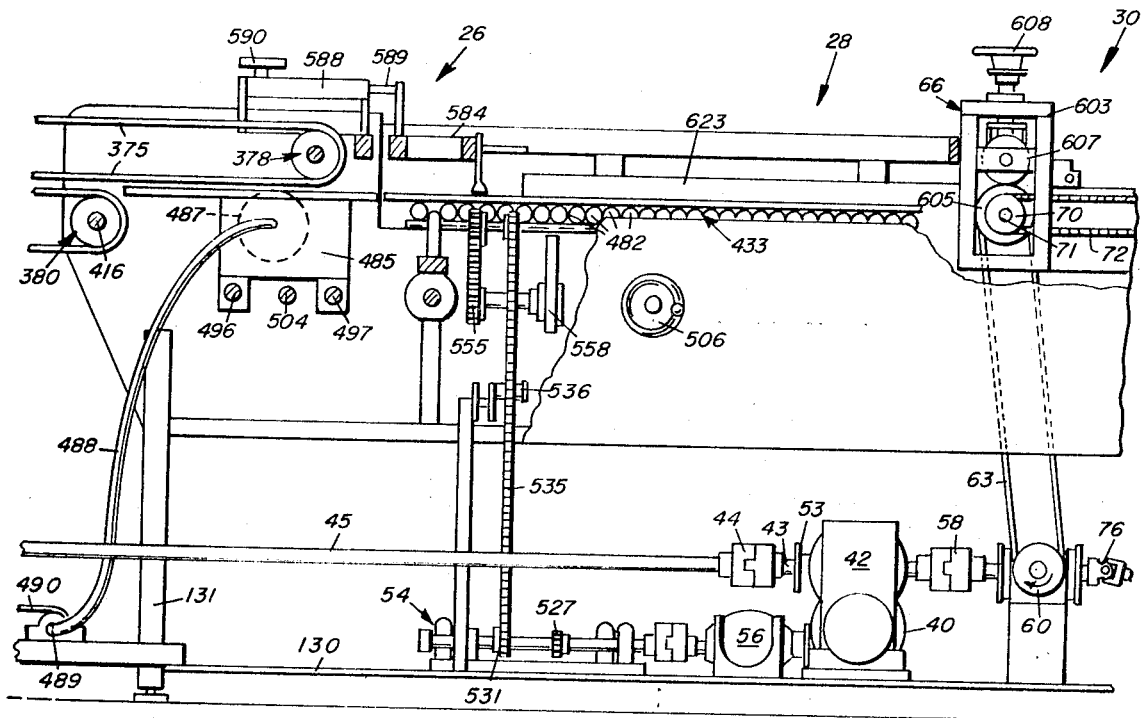
Figure 4C:
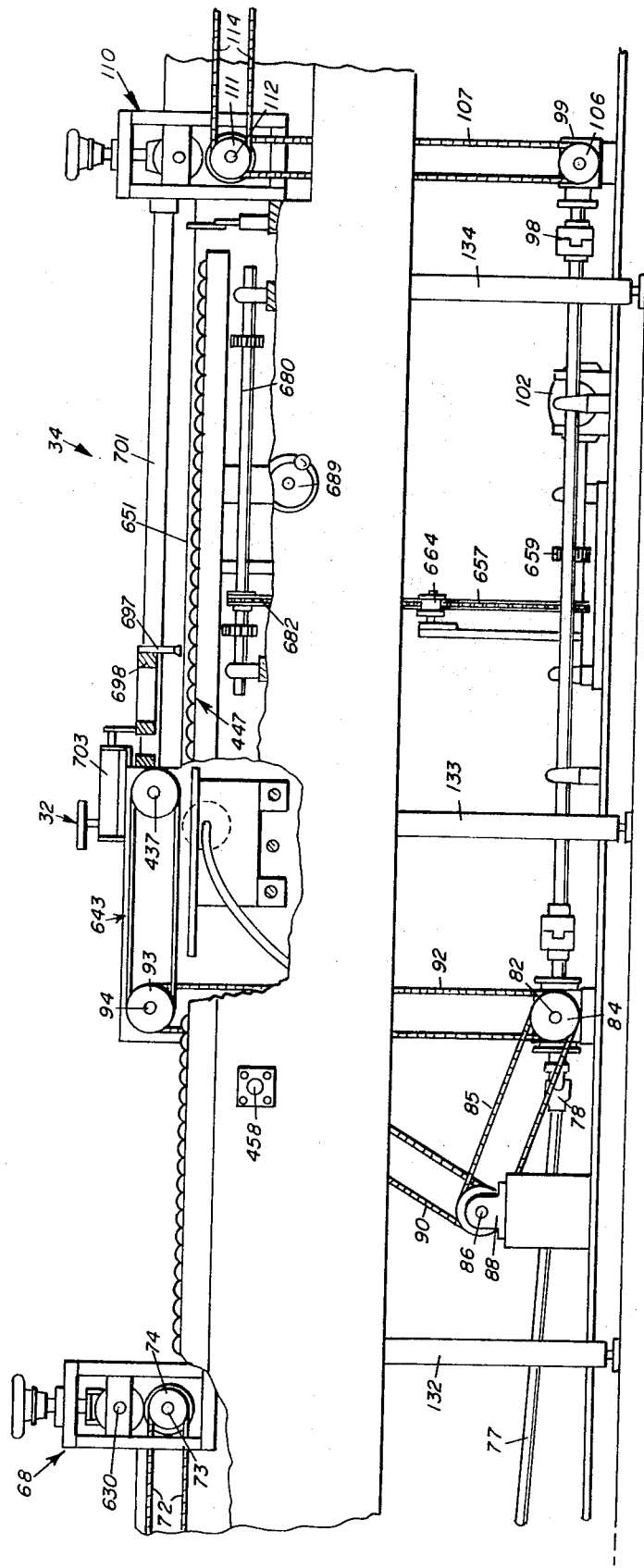

Output shaft 43 is also connected by way of coupler 58 and shaft 59 to a second bevel gear drive 60 having an output shaft 61 carrying a sprocket 62 which provides drive power by way of chain 63 (FIG. 4A) to the first roller section 30. The first roller section comprises a nip roller assembly 66 (FIG. 4A) and a pressure roller assembly 68 (FIG. 4B). Chain 63 drives the nip roller assembly by means of a sprocket 70 on the lower roller shaft 71; a connecting chain 72 is driven by a second sprocket (not shown) carried on shaft 71 to drive the lower roller shaft 73 in the pressure roller assembly 68 by means of sprocket 74 carried on shaft 73, thus providing synchronism between the two sets of rollers in the first roller assembly.

Referring again to FIG. 6, the bevel gear shaft 59 continues through gear drive 60 and is connected through universal joint 76, drive shaft 77 and universal joint 78 to rotate a third bevel gear drive 80. This third gear drive has an input shaft 81 and an output shaft 82 carrying a pair of sprockets 83 and 84. Rotation of sprocket 84 drives, by way of drive chain 85, the main outer conveyor power shaft 86 which is journalled in a support bearing 88 at one end and similarly supported at the opposite end by a bearing not shown. Shaft 86 provides the power to the outermost conveyors which carry the heel strips to the second assembly station, as will be described. This power is supplied to the conveyors by way of drive chain 90 (FIG. 4C), the drive mechanism for both conveyors being mounted on a common shaft which extends laterally across the machine, whereby both conveyors are synchronously driven by the single chain 90. A suitable drive arrangement for this conveyor is illustrated in FIG. 12, and will be further explained hereinbelow.

The rotation of output shaft 82 of the bevel gear is also used to drive feed belts for the second adhesive section 32 by way of a drive chain 92 which is connected between sprocket 83 on shaft 82 and a sprocket 93 (FIG. 5C) on the feed belt drive shaft 94.

Shaft 81 of the bevel gear drive 80 passes through the bevel gear and is connected by a coupler 96, drive shaft 97, coupler 98, bevel gear drives 99 and 100 and shaft 101 to an electrically controlled clutch-brake 102 to drive a second assembly section drive mechanism 105. This second assembly section drive mechanism is activated upon energization of clutch-brake 102 to move the outermost heel strips from their respective conveyors into alignment with the intermediate insole sheet at the second assembly station. It will be noted that the output shaft of bevel gear 99 carries a sprocket 106 for a drive chain 107 (FIG. 4C), whereby the nip roller assembly 110 of the second roller section 36 is driven. As was the case with roller section 30, the drive chain is connected around a sprocket 111 carried on a lower roller shaft 112 of the second nip roller assembly. A second sprocket 113 (FIG. 5C) on shaft 112 carries a chain 114 which is connected to a corresponding sprocket 115 (FIG. 5D) on a lower roller shaft 116 of pressure roller assembly 118. In similar manner, shaft 116 carries a second sprocket 120, (FIG. 5D), with a drive chain 121 being connected between sprocket 120 and a sprocket 122 mounted on the lower shaft 123 of the final pressure roller assembly 124, whereby all three rollers are driven in synchronism.

As will be apparent from the drawings, in particular FIGS. 4A through 4D, the drive train is supported by the machine frame 130 which is carried by appropriately spaced supporting legs such as those illustrated at 131, 132, 133, 134 and 135, which legs may include adjustable feet to permit leveling of the machine. The various elements of the drive train are suitably attached to the frame, with the various drive shafts being provided with appropriate journal bearings to assure smooth running of the mechanism.

FEEDER SECTION

Consideration will now be given in turn to the various sections of the machine of the present invention, and thus to the method of assembling composite strips carried out by this machine. The first section of the machine is the feeder indicated generally at 24 and illustrated variously in FIGS. 4A, 5A, 7 and 8, to which reference is now made. FIG. 4A presents a side plan view of the feeder, FIG. 5A a top view, FIG. 7 a plan view of the side of the feeder opposite to that shown in FIG. 4A, and FIG. 8 an end plan view.

The feeder 24 comprises five side-by-side loading platforms 140-144 adapted to receive stacks of the strips which are to be edge laminated to form the final composite sheet. Each platform is adapted to move upwardly during operation of the assembly machine to supply the strips one at a time to a section feeding mechanism. Platform 140 is adapted to receive a stack of the center, or toe, strips 12; platforms 141 and 142 receive stacks of shank strips 14 and 16, respectively; and platforms 143 and 144 receive stacks of the heel strips 18 and 20, respectively. The platforms are journalled on vertical poles, or posts, for vertical motion under the control of support chains looped over corresponding platform support shafts. These shafts are journalled in the end plates 150 and 151 of the feed section and are individually rotatable to raise or lower their corresponding platforms. Platform 140 is mounted on vertical poles 152 and 153 by means of guide bearings 154 and 155 adapted to slide up and down their corresponding poles. Posts 152 and 153 are supported at their lower ends by a cross beam (not shown) and at their upper ends by a cross beam 156 extending laterally across the feed section and welded or otherwise attached at its ends to the side plates 150 and 151. Immediately above and parallel to cross beam 156 is a feed shaft 158 for platform 140. This shaft is journalled in side plate 150 by means of suitable journal bearings 159 (FIG. 4), with its other end journalled in and passing through side plate 151 and carrying a spur gear 160 (FIG. 7) by means of which the feed shaft is driven. The shaft is supported along its length by means of pillow blocks 162 and 163 (FIGS. 5 and 8), mounted on cross beam 156. Shaft 158 carries sprockets 164 and 165 which are splined, keyed or otherwise fixed to the shaft for rotation therewith. These sprockets are vertically aligned with posts 152 and 153, respectively, and carry support chains 166 and 167. Support chain 166 is connected to one end to guide bearing 154, passes upwardly parallel to post 152 and over sprocket 164 which it engages, passes down behind post 152, as viewed in FIG. 8, and is connected at its other end to a suitable cable 168 (FIG. 4). Cable 168 is wound on a spring loaded drum 170 (partially hidden in FIG. 8) which maintains a constant tension on chain 166 as platform 140 is moved up and down by rotation of shaft 158.

Chain 167 is similarly connected at one end to the guide bearing 155 of platform 140, is looped over and engaged with sprocket 165 on shaft 158 and is attached at its opposite end to a cable 172 (FIG. 4) mounted on a biased drum 173 (partially shown in FIG. 8) which maintains a predetermined tension on chain 167.

Platform 141 is supported on vertical posts 180 and 181 by means of corresponding guide bearings 182 and 183 on which the platform is mounted. These posts are supported at the bottom of the feeder section on a cross bar (not shown), with their upper ends being supported by a cross beam 184, illustrated in FIG. 5, but not visible in FIG. 8. Cross beam 184 supports feed shaft 186 by means of pillow blocks 187 and 188, shaft 186 extending laterally across the feed section and being journalled in plate 150 by means of journal bearing 189 (FIG. 4). As illustrated in FIG. 7, shaft 186 passes through side plate 151 and terminates in a spur gear 190. Shaft 186 carries sprockets 191 and 192 aligned over posts 180 and 181, respectively, which sprockets carry and drive a pair of support chains 193 and 194, respectively. Each chain is fastened to guide bearings 182 and 183 of the platform 141 at one end, passes up and over its respective sprocket and extends downwardly for connection at its other end to a cable which is wrapped around a corresponding one of biased drums 195 and 196 suitably supported on the base of the feed section. As has been explained, these drums maintain tension in the support chains, whereby the chains are held in engagement with sprockets 191 and 192 so that rotation of shaft 186 will raise or lower platform 141.

Platform 142 is a duplicate of platform 141, being supported on vertical posts 200 and 201 by guide bearings 202 and 203. Support chains 204 and 205 are connected at one end to guide bearings 202 and 203 of platform 142 and pass upwardly over sprockets 206 and 207, mounted on shaft 186, passing downwardly behind posts 200 and 201 (as viewed in FIG. 8) for connection to suitable cables on the biased drums 210 and 211. Thus, rotation of shaft 186 moves platforms 141 and 142 in synchronism.

Platform 143 is carried on support posts 214 and 215 by means of guide bearings 216 and 217, respectively. Support chains 218 and 219 are mounted on sprockets 220 and 221, respectively, carried by a horizontal feed shaft 222, the other ends of chains of 220 and 221 being connected by way of cables to biased drums 224 and 225. Feed shaft 222 is journalled in side plates 150 and 151 and is supported by pillow blocks 228 and 229 which are mounted on a cross beam 230 extending between the side plates. Shaft 222 is mounted in side plate 150 by means of journal bearing 231 and is journalled in side plate 151 by bearing means not shown, the shaft passing through the plate and terminating in spur gear 232 (FIG. 7).

Finally, platform 144 is carried on vertical support posts 236 and 237 by guide bearings 238 and 239, the platform being positioned on the support posts by means of support chains 240 and 241. The support chains are connected at one end to guide bearings 238 and 239 of the platform and pass upwardly over sprockets 242 and 243 on feed shaft 222, the chains extending down the other side of the posts for connection by way of suitable cables to biased drums 244 and 245 which serve to maintain tension in the chains. Rotation of feed shaft 222 thus regulates the height of both platforms 143 and 144 in synchronism.

Platforms 140-144 receive stacks of the strip materials which are to be assembled into the composite insole sheets, and the position of each platform is continuously adjusted during operation of the machine to maintain the topmost strip on each stack at approximately a given level. This allows the feed mechanism to be operative to lift the strips one at a time from their respective stacks and pass them into the conveyor system which carries them to the various assembly stations. Since the strips may be of varying thicknesses, the platforms for each type of strip must be able to move upwardly at different rates for this reason, the shafts which regulate the motion of platforms 140, 141 and 143 are separately controlled. Since platforms 141 an 142 carry the same kind of material, they are driven by a common feed shaft; similarly, platforms 143 and 144 operate in synchronism and carry the same type of strip material.

The regulation of vertical movement for platforms 140-144 is substantially independent of the operation of the remainder of the assembly machine, and is not synchronized therewith. Again, because variations in the thicknesses of the strip materials cause the platforms to move at different rates to maintain the topmost strip in each stack at the desired level during the feed operation; it is necessary to provide independent drive controls for the platforms. For this reason, a separate motor 250 (FIG. 8) is mounted on side plate 151 with its drive shaft connected to a reducing gear 252 that is in turn supported on side plate 151 by bracket 254. Referring now to FIG. 7, the output shaft 256 from reducing gear 252 is connected through coupler 257 and thrust bearing 258 to three spiral miter gears 260, 261 and 262 which are vertically spaced along shaft 256. The shaft is held in position by two pillow blocks 263 and 264 positioned between the miter gears and mounted on side plate 151.

Spiral miter, or bevel, gear 260 drives a horizontal control shaft 266 which is mounted in and supported by bearing block 267. Shaft 266 is coupled through an electrically operated solenoid clutch 268 to a worm gear 269 mounted in and supported by bearing block 270. The end of shaft 266 extends through pillow block 271 and is adapted to receive a suitable crank handle for manual operation of the worm gear, and thus for manual adjustment of the position of the corresponding loading platforms. Worm gear 269 is engaged with spur gear 232 and thus is in driving relationship with feed shaft 222.

In similar manner, miter gear 261 drives horizontal control shaft 276 which is supported in bearing block 277. Shaft 276 is connected through electrically operated solenoid clutch 278 to worm gear 279 mounted in and carried by bearing block 280. Again, the end of shaft 276 is supported in pillow block 281, with the end of the shaft adapted for manual cranking. Worm gear 279 is in driving relationship with spur gear 160 to effect rotation of feed shaft 158.

Spiral miter gear 262 drives a horizontal control shaft 286 which is supported in bearing block 287. Shaft 286 is connected through an electrically operated clutch 288 to worm gear 289 carried by bearing block 290, the worm gear being in driving relationship with spur gear 190 to rotate feed shaft 186. Again, the end of shaft 286 is supported in pillow block 291 affixed to side plate 151, with the end of the shaft being adapted to receive a crank for manual operation.

During operation of the feed mechanism, motor 250 is continuously energized to rotate shaft 256 and thereby drive the horizontal control shafts 266, 276 and 286. Whenever it is desired to change the height of one of the platforms 140-144, its corresponding feed shaft is rotated by energizing the corresponding solenoid clutch 268, 278 or 288, thereby driving the appropriate worm gear. Motor 250 is reversible so that when the supply of strips on any one of platforms 140-144 has been depleted, the platform may be lowered for reloading, but during operation of the machine continuously rotates in a direction to raise the platforms. Suitable sensing switches are provided to regulate the energization of clutches 268, 278 and 288, whereby the raising of the various platforms is carried out automatically. When any one of the platforms reaches its uppermost limit and must be refilled, the feed mechanism is automatically stopped by suitable platform level limit switches. This prevents the feed mechanism from supplying to the machine only a part of the number of strips required for a composite sheet, and thus avoids wastage. The limit switches which regulate the operation of motor 250 and the solenoid clutches 268, 278 and 288 are illustrated diagrammatically in FIG. 8; their electrical connections are set forth hereinbelow with reference to FIG. 22. Three stack level sensing switches 295, 296 and 297 are mounted on cross beam 230 (which also supports shaft 222) above platforms 143, 141 and 140, respectively. These switches preferably are microswitches having relatively long contact arms which are positioned to sense the location of the topmost insole strip of the respective stacks. The switches are normally closed, with the contact arms being moved to open positions when the platforms have moved the corresponding top strips into the proper position for feeding. After the feed mechanism has removed a number of strips, the exact number depending on the thickness of individual strips, the range of the suction head feeders, the length of the switch contact arm, and like factors, the microswitches will close to energize their corresponding solenoid clutches. Thus, for example, when the stack carried by platform 143 has been reduced by the feed mechanism to the point where switch 295 closes its contacts, solenoid clutch 268 will be energized, causing worm gear 269 to drive feed shaft 222, thereby raising platform 143 until the insole strips open switch 295. Of course, platform 144 will also be raised by rotation of shaft 222, but since it carries the same type of strip material as platform 143, and the stacks of material will be reduced at the same rate, this is the desired operation. In similar manner, switch 296 controls the energization of solenoid clutch 288 to drive the feed shaft 186 and regulate the position of platforms 141 and 142, and switch 297 controls the energization of solenoid 278, thereby positioning platform 140 by means of shaft 158.

To detect the condition where all of the insole strips have been removed from one of the platforms, upper platform limit switches 300, 301 and 302 are provided for platforms 143, 141 and 140, respectively. These switches are normally closed, and are connected in series circuit with motor 250 so that when any one of the platforms reaches a predetermined upper limit, the corresponding switch will open the motor circuit. These switches may be mounted on the cross beam 230, as illustrated in FIG. 8, or at some other suitable location on the feeder section where their contact arms can be operated by the upward movement of the respective loading platforms as the insole strip stacks are depleted during operation of the machine.

The opening of one of switches 300, 301 or 302 not only shuts down the feed mechanism but after a time delay halts the operation of the whole machine and signals the operator that the supply of insole strips must be replenished. The operator may then reverse motor 250 and energize the appropriate solenoid clutch 268, 278 or 288 to lower the empty platform or platforms. Lower platform level limit switches 303, 304 and 305, which are also connected in circuit with motor 250, are normally closed, but open when their corresponding platforms reach the desired lower limit of travel. These lower limit switches are actuated by contact arms which extend into the paths of the downwardly moving platforms so that when the platforms are correctly positioned the corresponding switches de-energize their respective solenoids. When all the solenoids have been de-energized, the circuit to motor 250 opens, stopping the motor and allowing the platforms to be loaded; thereafter motor 250 is energized by the operator in the forward direction, the replenished stack of strips is raised to the proper feed level, the main motor 40 is energized, and the feeding operation resumes.

Removal of individual strips from the stacks carried by platforms 140–144 for feeding into the conveyors leading to the assembly portion of the machine is accomplished by means of movable suction heads which serve to lift the top strip from a corresponding stack and move it forward into engagement with the belts of the first conveyor stage. These strips are then released and the heads return to their initial position to pick up the next strips. The suction heads all move together and are driven by the main machine drive train, whereby the feeding of the strips is synchronized with the assembly operation.

A typical suction head is illustrated in side elevation in FIG. 9 and in a top plan view in FIG. 10, to which reference is now made. The suction head assembly includes a rubber cup 310 mounted on a vertical hollow tube 311, the interior of the tube communicating with the hollow portion of rubber cup 310 at the lower end and being adapted to receive a suitable vacuum hose at the upper end, whereby when the cup 310 is placed in contact with an insole strip or other sheet, suction can be exerted on such sheet to lift it. Cup 310 is biased downwardly by means of a coil spring 312 which surrounds tube 311, the spring being held in position on the tube by means of a collar 313. The upper end of the spring abuts against a guide block 314 mounted on a horizontal guide arm 315, the guide block being slidable on arm 315 to permit horizontal motion of suction head 310. Tube 311 is mounted in guide block 314 for vertical motion therethrough, the guide block serving to hold the tube in vertical alignment, and coil spring 312 urging the tube downwardly.

Guide arm 315 is fastened to a support plate 318 which is carried by a stationary support shaft 319 which extends across the feed section and is attached at opposite ends to side plates 150 and 151. Plate 318 may be laterally positioned on shaft 319 and held in place by a suitable set screw 320. Guide arm 315 may be fastened to the support plate by suitable screws or bolts such as that illustrated at 321 in FIG. 10. To prevent the support plate 318 from rotating on shaft 319, the upper portion of the plate is journalled by means of bearing 322 on a reciprocating suction head drive shaft 324.

A cam arm 325 is fastened to support plate 318 between shafts 319 and 324 by suitable machine screws or bolts such as that illustrated at 326, the cam arm being spaced above guide arm 315, extending parallel thereto, and being shaped on its upper edge to form a cam surface 327 having a contour which defines the path to be followed by suction cup 310 during operation of the feeder.

The upper portion of tube 311 carries a cam follower block 328 to which is fastened a cam follower 329. The cam follower may be mounted on block 328 by a suitable nut and bolt arrangement and preferably will be a roller provided with suitable bearings for friction-free motion along cam surface 327. Cam follower 329 causes vertical motion of suction head tube 311 through guide block 314 as the follower moves along cam surface 327 during horizontal motion of the guide block along guide arm 315. This horizontal motion of the suction head is accomplished by a reciprocating linkage connected to the oscillating drive shaft 324, the linkage including a crank arm 332 fastened to the oscillating drive shaft by a set screw 333 and a link arm 334 connected between the crank arm and guide block 314 by pivot pins 335 and 336, respectively. Suitable bushings are provided on the pins to permit free motion of the linkage arm.

Motion of crank arm 332 in a counterclockwise direction serves to draw guide block 314 along guide arm 315 toward support shaft 319, causing the cam follower 329 to move along cam surface 327, thus raising the suction cup 310. A rotation of the crank arm through approximately 120° of arc serves to raise the suction cup 310 to its fullest extent; thereafter, shaft 324 is rotated in a clockwise direction to return the crank arm to the position indicated in FIG. 9. This returns the cam follower 329 to its initial position, spring 312 serving to urge the suction cup downwardly, whereby the cam follower stays on surface 327.

Suction heads of the type illustrated in FIGS. 9 and 10 are provided for each stack of insole strips, the number of suction heads required depending upon the size and weight of the strip to be lifted from the stack and fed into the conveyor. As illustrated in FIGS. 5 and 8, suction head assemblies 340 and 341 are provided above platform 143, a single suction head assembly 342 is provided for platform 141, two assemblies 343 and 344 are used for the toe strips carried by platform 140, a single suction head assembly 345 lifts the shank strips on platform 142 and two suction heads 346 and 347 lift the heel strips stacked on platform 144. The combined horizontal and vertical motion of the suction heads permits the heads to pick up the uppermost strip on each stack and move them forward into the corresponding conveyors.

The mechanism to oscillate shaft 324 is shown in a side view in FIG. 4, a top view in FIG. 5 and in partial detail in FIG. 11, to all of which reference is now made. The end of shaft 324 which is journalled in side plate 150 extends therethrough an carries at its outer end a crank arm 350 which is splined to the shaft for motion therewith. The outer end of crank arm 350 carries a drive pin 351 by means of which the crank arm is caused to oscillate about the axis of shaft 324, as indicated by the double headed arrow on the crank arm. A slotted drive lever arm 352 is mounted for oscillation about the axis defined by a shaft 353, by means of which the drive arm is mounted on side plate 150. The upper end of the drive lever arm includes a slot 354 adapted to receive drive pin 351, whereby oscillation of arm 352 causes crank arm 350 to be oscillated about the axis of shaft 324. Arm 352 is driven by a sprocket 355 which is rotated about sprocket shaft 356 by means of a drive chain 357. The sprocket carries a drive pin which engages a second slot 358, located in the lower portion of drive lever arm 352. As sprocket 355 rotates, its pin causes arm 352 to oscillate about shaft 353, the pin moving up and down in slot 358. This oscillation of lever arm 352 drives crank arm 350 and causes shaft 324 to oscillate, thereby moving all of the suction head assemblies 340–347 in synchronism.

As illustrated in FIG. 4A, sprocket 355 is enclosed by a housing 360 through which the end of shaft 356 extends. Outside the housing, shaft 356 carries a cam 361 which rotates with the sprocket and operates switch 362 through cam follower 363 mounted on the switch contact arm. Switch 362 thus senses the operation of the suction head assemblies, energizing and de-energizing the vacuum circuits to the suction heads to regulate the picking up and releasing of the insole strips at the proper points in the motion of the suction heads, as will be explained further hereinbelow.

Drive chain 357 is connected between sprocket 355 and a sprocket 366 (FIG. 8) which is carried by the portion of feeder drive shaft 48 which extends through and is journalled in side plate 150. Thus, chain 357 is driven by the main drive motor for the machine, thereby assuring synchronization of the suction head assemblies with the remainder of the machine operation. Chain 357 is held taut by means of an idler assembly 368 (FIG. 4A).

FIRST ADHESIVE SECTION

The insole strips which are lifted from the several platforms by the suction head assemblies are fed thereby into corresponding conveyors, by means of which they are delivered to the appropriate adhesive and assembly stations. The strips from platforms 140–144 thus are fed to corresponding first conveyors 370–374, respectively. Each conveyor is comprised of an upper and a lower run of endless belts, as illustrated in FIGS. 4A and 4B. Thus, conveyor 374 has an upper run 375 and a lower run 376, the upper run extending between feeder assembly pulleys 377 and adhesive station pulleys 378. Similarly, the lower run 376 extends between pulleys 379 and 380. Although the conveyors are illustrated as being made up of a plurality of parallel belts mounted on individual pulleys, it will be understood that various other forms of conveyors will be satisfactory.

As viewed in FIGS. 5A, 5B, 6A and 8, the upper run of belts for conveyor 374 is made up of four individual and parallel belts which may be of cloth of other suitable material. These belts are indicated in FIG. 6 at 384, 385, 386 and 387 and are shown as being mounted on individual pulleys at the adhesive assembly end. The pulleys are mounted on shaft 390 journalled between the side housings 391 and 392, a journal bearing 393 being carried by housing 391 and a journal bearing 394 being carried by machine housing 392 for support and alignment of the shaft. Suitable pillow blocks may be located along the shaft for added support, where needed. The pulleys are indicated in FIG. 6A at 395–398, and are free wheeling on shaft 390 for rotation with the conveyor belts. The feeder end of the upper run of conveyor 374 is carried by feeder pulleys 405–408, indicated generally at 377, in FIG. 4A, mounted on an upper pulley shaft which consists of three separately driven sections 409, 410 and 411 extending between side plate 150, bearing support plates 430 and 431, and side plate 151. The pulleys may be positioned on their respective shafts by means of set screws or other suitable means.

The lower conveyor run 376 similarly comprises four parallel belts corresponding to the belts of the upper run. The lower run is supported at the adhesive assembly and by pulleys 412–415 (FIG. 6A) mounted on a pulley shaft 416 which extends between and is journalled in side panels 391 and 392 by journal bearings 417 and 418. The feeder end pulleys on the lower run are illustrated in FIG. 8 at 379 as being mounted on a lower pulley shaft consisting of three sections 419, 420 and 424 journalled for rotation in side plate 150, bearing support plates 430, 431 and side plate 151 of the feeder section. Movement of these pulleys, and thus of the conveyor belts, is accomplished by means of drive chains 421, 422 and 423 (FIG. 8) which are connected between corresponding sprockets on the feeder drive shaft 48 and the lower pulley shafts 419, 420 and 424. The sprockets on which drive chains 421 and 423 are mounted are of the same size so that shaft 48 drives the corresponding outer conveyor belts at the same speed. The sprockets for drive chain 422 are slightly smaller so that shaft 48 drives the remaining three conveyors at a slower speed. Thus, by means of chains 421, 422 and 423, shafts 419, 420 and 424 are driven in synchronism with the main drive train of the insole assembly machine, but at different rates of speed. Each section of the lower pulley shaft carries a spur gear which engages a corresponding one of spur gears 426, 427 and 428 (FIG. 5A) by means of which the upper pulley shafts 409, 410 and 411 are driven in synchronism with the corresponding lower pulley shaft sections 419, 420 and 424.

It will be noted that each of the conveyor sections 370, 371, 372 and 373 are substantially identical to conveyor 374, having their upper runs extending between pulleys supported by rotating shafts 409, 410 and 411, and 390 and having their lower runs extending between pulleys supported by shafts 419, 420 and 424, and 416. The number of belts in the illustrated embodiment varies with the width of the strip material being carried; however, it will be apparent to those skilled in the art that variations in conveyor configurations will work equally well.

During operation of the machine, insole strips fed to the belt conveyors 373 and 374 are carried to roller conveyors 432 and 433, respectively. These roller conveyors carry their corresponding strips, which are the heel strips from platforms 143 and 144, past the first adhesive section 26, past the first assembly station 28 and past the first roller section 30 to the second adhesive section 32 (FIG. 5C). The heel strips are picked up at this point by belt conveyors 434 and 435 which extend between pulleys mounted on shafts 94 and 437, the pulleys on shaft 94 being driven and the pulleys on shaft 437 being free-wheeling. The shafts are journalled in the housings 391 and 392 by suitable journal bearings, shaft 94 being carried by bearings 438 and 439 and shaft 437 being supported by bearings 440 and 441. Shaft 94 is driven by sprocket 93, as has been described above, and thus its rotation is synchronized with that of the main drive train.

Conveyors 434 and 435 act as feed belts to carry the heel strips to the roller conveyors 446 and 447 in the second assembly section 34, these rollers carrying the respective strips to the end of the conveyors where they abut against the contact arms of sensing switches 448 and 449, the strips coming to rest here until a further operation is to be performed on them. Conveyors 446 and 447 each comprise a plurality of rollers, bearing-mounted in frames for free rotation and which do not require a drive mechanism, the feed belts 434 and 435 serving to provide the necessary impetus to carry the strips along the rollers into contact with the sensing switches.

The rollers which make up conveyors 432 and 433 are not free rotating, because of the distance which the strips must travel and because of the requirement for synchronized movement, but are driven by contact with a moving endless belt such as that illustrated for conveyor 432 in FIG. 12 at 455. As illustrated, shaft 86 carries a sprocket 456 which, in turn, carries a drive chain 90 for rotating a conveyor drive shaft 458. This latter shaft extends laterally across the machine and is journalled in sides 391 and 392 for rotation. Shaft 458 carries locked to it a friction drive drum 459 around which passes the endless belt 455, the belt extending around a guide pulley 460 suitably mounted for rotation on side wall 392, and along the length of the conveyor. The belt is in contact with the bottom of the rollers which make up conveyor 432, thereby turning the rollers as the belt moves. The belt extends around a second guide pulley 461 and returns back to the drive drum 459, after passing around a tension regulating pulley 462. The rollers which are used in conveyor 432 are each mounted by means of suitable bearings in channels 464 and 465 (FIG. 5B), the channels being suitably supported on the machine frame, as on cross bar 466. Other support members are not shown for purposes of clarity in the drawings.

In similar manner, conveyor 433 is driven by shaft 86 through the medium of a drive belt 470 (FIGS. 5B and 5C) in contact with rollers mounted in channels 471 and 472.

The forepart strips for the insole which are carried by platforms 141 and 142 are lifted by their corresponding suction head assemblies 342 and 345, respectively, and are fed to conveyors 371 and 372. This feed operation is synchronized with the feeding of the heel strips onto conveyors 373 and 374, as has been explained. The strip from platform 141 is fed between the upper and lower runs of conveyor 371 and is fed past the adhesive section 26 to roller conveyors 480. Since the lower run of conveyor 371 ends at the pulleys carried by shaft 416, it may be necessary to provide additional rollers between shaft 416 and the beginning of rollers 480, through the adhesive section, to support the forepart strip in this area. Rollers 480 are mounted in suitable bearings and are free turning so that the strip will be carried the length of roller conveyor 480 and will stop against sensing switch 481. Similarly, the forepart strip from platform 142 will be fed between the upper and lower runs of conveyor 372 and will be fed thereby to roller conveyor 482. The strip will be carried to the end of conveyor 482 and will stop against sensing switch 483.

The toe strip from the insole which is carried by platform 140 is picked up by suction head assemblies 343 and 344 and fed between the upper and lower runs of conveyor 370, which carries the strips across two adhesive applicators 484 and 485. These applicators are so spaced as to apply adhesive to the undersurface of the beveled edges of the toe strip (see FIGS. 2 and 3) as conveyor 370 moves the strip. As shown in FIGS. 4A, 13 and 14, the adhesive applicators include applicator wheels 486 and 487, respectively, which carry a liquified hot melt adhesive from within the applicator housing to the beveled edges of the toe strip. The applicator wheels are driven in synchronism with the upper run of conveyor 370 and thus assist in driving the toe strip past the adhesive station and to the assembly station.

A suitable adhesive may be stored in a separate hot melt reservoir, where it is heated and fed to the individual applicators as required. Suitable level sensing apparatus may be provided in the applicators, but these and the tubing for feeding hot melt adhesive to the applicators are not shown, since they are conventional and would not add to the understanding of the present invention. It should also be noted that for the same reasons, the vacuum lines leading to the suction head assemblies in the feed section of the machine and in other sections to be described, are not shown. Such suction lines may be connected to any suitable source of vacuum, and if none is available where the present machine is to be installed, a suitable vacuum pump may be mounted on the machine frame and driven by a separate electric motor.

As shown in FIG. 4A, applicator wheel 487 may be driven by a flexible drive cable 488 which is connected to the main drive train by way of shaft 489 and chain 490 which is, in turn, driven by drive chain 491 connected to feeder drive shaft 48. Shaft 489 also drives adhesive applicator wheel 486 through a flexible drive cable 492 (FIG. 14). It will be apparent that alternative drive arrangements, such as drive chains, may replace the flexible cables, if desired.

The adhesive applicators 484 and 485 are laterally adjustable to accommodate varying widths of toe strip material, and the mechanism for such lateral adjustment is illustrated in FIGS. 13 and 14. As shown, adhesive applicator 484 is mounted on a movable platform, or base plate, 494, while applicator 485 is mounted on a corresponding base plate 495. The base plates are slidably mounted on parallel shafts 496 and 497 which are mounted in suitable support blocks 498, 499 and 500, 501, respectively, which are carried on corresponding frame elements 502 and 503. The two support plates may be moved along the support shafts 496 and 497 by means of a centrally located screw shaft 504 which is journalled in the side plates 391 and 392 of the insole assembly machine. Screw shaft 504 passes through a threaded bushing carried by each of the base plates and is supported at its center by a mounting block 505 which also provides support for shafts 496 and 497. The screw shaft and bushings are oppositely threaded on opposite sides of block 505 so that rotation of the shaft moves the bushings toward or away from each other. Hand wheels 506 and 507 are fastened to opposite ends of screw 504 whereby the screw may be turned to move platforms 494 and 495 along their support shafts 496 and 497 and thus to adjust the lateral spacing of the adhesive applicator wheels 486 and 487. If desired, a set screw 508 may be provided to hold screw shaft 504 in the selected position.

FIRST ASSEMBLY STATION

As the toe strip moves past the adhesive-applying wheels 486 and 487, it is fed onto a raised portion of the first assembly station 28. The assembly station includes two abutting assembly platforms 510 and 511 each having a stepped up toe strip receiving portion indicated at 512 and 513, respectively. As the strip is fed onto the raised part of the assembly platform, it is positioned by two guide rails 514 and 515. As will appear hereinbelow, the assembly platforms and the associated assembly mechanism are mounted for lateral motion from the positions shown in FIG. 5B toward the edges of the insole strip assembly machine, whereby the width of the raised toe receiving portion 512, 513 may be varied to accommodate different sizes of toe strips. For the same reason, guide rails 514 and 515 are slidably mounted on cross bars 516 and 517 to accommodate toe strips of different widths. The cross bars are supported by frame members 518 and 519 which extend longitudinally above roller conveyors 480 and 482, as illustrated in FIG. 5B and in cross section in FIG. 15, the cross sectional view being taken along lines 15—15 of FIG. 5B.

The toe strip moves along the raised portion 512, 513 to the end of the first assembly station 28 where it is stopped by a vertically movable gate 520. Its arrival at this location is sensed by sensing switch 521. When the toe strip and the two adjacent forepart strips have reached their proper position in the first assembly station, as indicated by the closure of sensing switches 481, 483 and 521, the first assembly station mechanism is energized for the first assembly operation.

The first assembly operation is initiated by the energization of electrically controlled clutch-brake 56 (FIG. 6A) which transmits power from the main drive motor to the first assembly section drive mechanism 54. Energization of clutch-brake 56 causes rotation of shaft 525 which carries a spur gear 526 (FIG. 15) by means of which a corresponding spur gear 527 and its shaft 528 are driven, shafts 525 and 528 rotating in opposite directions. As will be seen in FIGS. 6 and 15, shafts 525 and 528 are journalled in suitable mounting blocks carried by a support platform 529 on the machine frame. Each shaft carries a drive sprocket, indicated in FIG. 6 at 530 and 531, respectively. Drive sprocket 530 carries a drive chain 532 (FIG. 15) which extends around an idler sprocket assembly 533 that is adjustable to permit the drive chain to be tightened when the assembly mechanism is moved laterally, and extends around a sprocket (not shown) on the first assembly section drive shaft 534. In similar fashion, drive sprocket 531 carries a drive chain 535 which passes around an idler sprocket assembly 536 and a drive sprocket (not shown) on a first assembly section drive shaft 537. It will be noted that both idler sprocket assemblies are mounted on a transverse frame member 540 and are adjustable both laterally and vertically.

The first assembly section drive shaft 534 is operable to remove the shank strip positioned on conveyor 480, the strip being moved laterally off the conveyor onto the corresponding assembly platform 510. This is accomplished by the mechanism illustrated in FIG. 15 and in isolated detail in FIG. 16. As shown in these two Figures shaft 534 is journalled in mounting blocks 542 and 543 which are supported by a laterally adjustable assembly section frame 544 which also supports the roller conveyor 480, the assembly platform 510 and the toe strip receiving portion 512. This frame also supports by suitable mounting blocks an assembly section shaft 545 (also shown in FIG. 5B). A pair of assembler chains 546 and 547 join shafts 534 and 545. Chain 546 is shown in the cross sectional view of FIG. 15, and is shown passing around an idler assembly 548 which is vertically adjustable, while assembler chain 547 is shown in FIG. 16, which is an end view of a portion of the first assembly section, wherein assembler chain 547 also passes around an idler assembly 549. Assembler chains 546 and 547 carry one or more corresponding assembler lugs 550 and 551. As is seen in FIGS. 5B and 15, each assembler chain passes between two rollers of the roller conveyor 480, below the upper surface of the roller, whereby the forepart strip may pass along the roller conveyor without interference from the assembler chain. When the assembly section drive shaft 534 is rotated in a counterclockwise direction, drive chains 546 and 547 also move in a counterclockwise direction, as viewed in FIGS. 15 and 16. This moves assembler lugs 550 and 551 transversely across the machine, pushing the shank strip off of the conveyor 480 onto the assembly platform 510. The spacing of the lugs and the time during which the solenoid clutch 56 is energized are so arranged that the shank strip is moved sufficiently far to abut the shoulder formed by the raised portion 512 on the assembly platform.

The left-hand portion of the assembly section, as viewed in FIG. 15, is similar to, but the reverse of, the portion described above. Thus, the assembly section drive shaft 537 carries a pair of assembler chains 555 and 556. These chains pass around suitable corresponding sprockets on assembly section shaft 557 and around corresponding idler assemblies, one assembly being shown at 558 in FIGS. 4B and 15. The assembler chains carry assembler lugs, one of which is shown in FIG. 15 at 560, whereby upon clockwise rotation of shaft 537, chain 555 will cause lug 560 to move the shank strip resting on conveyor 482 in cooperation with chain 556 and its corresponding lug. The shank strip will be moved onto the assembly platform 511, against the shoulder formed by the raised toe strip receiving portion 513. Shafts 537 and 557, roller conveyor 482 and the vertically adjustable assembly 558 are all carried on a laterally adjustable assembly section frame 562.

The assembly section frames 544 and 562 are supported on transverse support shafts illustrated in FIG. 5B at 564 and 565 which are supported by the side plates 391 and 392 of the machine or by other suitable frame members. These frames 544 and 562 are slidably supported by the support shafts by means of bushings such as those illustrated in FIG. 15 at 566, 567, 568 and 569 and in FIG. 16 at 570 and 571. A transverse threaded screw shaft 572 passes through threaded bushings 573 and 574 mounted on frames 544 and 562, respectively, whereby rotation of screw shaft 572 moves the frame assemblies laterally across the width of the machine. Shaft 572 is continuous across the width of the machine, with the threads reversing at the middle so that the assembly sections move in opposite directions, i.e., toward or away from each other, with rotation of the screw shaft. The support shafts 564 and 566 and screw 572 may be supported at the center line of the machine by a suitable frame element 575 (FIG. 15) and hand wheels 576 and 577 may be provided on the ends of shaft 572 for adjusting the lateral position of the assembly platforms.

By proper adjustment of the position of assembly platforms 510 and 511 and of the position of guide rails 514 and 515, the two forepart strips may be moved laterally into alignment with the edges of the center toe strip, the inner beveled edges of the forepart strips being vertically aligned with the corresponding adhesive-coated, beveled edges of the toe strip. The vertical alignment is made possible by placing the toe strip on the raised portion 512, 513, whereby the forepart strips may slide into position under the edges of the toe strip. It will be apparent, then, that the width of the raised portion 512, 513 and the spacing of the guide rails 514 and 515 must be such that the adhesive-coated edges extend slightly beyond the shoulders formed in the platforms 510 and 511 by an amount equal on each side to the width of the lap between the toepiece and the forepart.

At least one sensing switch may be provided which will indicate when the forepart strips have been positioned under the edges of the toe strip. Such a switch may be mounted, for example, under guide rail 514 or 515, but is not illustrated. This switch, when closed, can be used to de-energize the clutch and energize the brake to initiate the next step in the operation, which is to feed all three strips into the first roller section 30. This is accomplished by first moving gate 520 by means of a solenoid 580. The armature of the solenoid may be connected to gate 520 to pull the gate vertically downward out of the path of the strips upon energization. Three suction heads 581, 582 and 583 may then be activated to lift the three strips slightly. These suction heads are mounted on a movable frame 584 (FIG. 5B and FIG. 15) which is supported on slide rods 585 nd 586 connected to frame members 518 and 519. A hydraulic cylinder 588 (FIG. 4B and FIG. 5B) is connected by way of piston rod 589 to the movable frame 584, whereby the suction heads may be moved longitudinally along the assembly platforms 510 and 511. The hydraulic cylinder may be activated through a control valve 590 whereby after the three strips are lifted by activation of the suction heads 181-183, the hydraulic cylinder moves frame 584 forwardly along the slide bars 585 and 586, feeding the three strips forwardly past the lowered gate 520. The strips move into nip rollers illustrated generally at 66 in FIGS. 4B and 5B, the nip roller assembly being shown in detail in FIG. 17, to which reference is now made.

FIRST ROLLER STATION

The view of nip roller 66 illustrated in FIG. 17 is taken along the lines 17—17 of FIG. 5B. The nip roller assembly comprises a lower shaft 71 which is driven by the main machine power train through chain 63 and sprocket 600, and which carries lower rolls 601 and 602. Shaft 71 is journalled in a support frame having end members 603 and 604 which carry appropriate journal bearings such as that illustrated in FIG. 4B at 605. Upper shaft 606 is also journalled in end members 603 and 604 as by means of journal bearing 607 (FIG. 4B) supported by end member 603. Journal bearing 607 and its corresponding bearing (not shown) in end member 604 are both vertically movable within their respective end supports 603 and 604 by means of hand wheels 608 and 609. These hand wheels turn threaded shafts which extend through fixed threaded bushings 610 and 611 in the upper rail of end members 603 and 604, respectively, and are connected at their lower ends to the vertically movable journal bearings, whereby rotation of the threaded shafts raises and lowers the upper roller shaft. The hand wheels are connected together by a chain 612, whereby adjustment of one hand wheel results in a similar adjustment of the other so that shaft 606 will remain parallel to lower shaft 71 when moved vertically. The upper shaft carries upper rolls 613 and 614 which cooperate with lower rolls 601 and 602, respectively, to define nips 615 and 616 through which pass the adhesive-coated edges of the strips which are to be joined. Rolls 601, 602 and 613, 614 are laterally adjustable on their respective shafts and are splined or otherwise keyed on those shafts for rotation therewith. The rolls may be held in position by any suitable means, such as set screws or the like.

The upper and lower shafts are rotated in synchronism by means of spur gears 617 and 618 connected to the ends of shafts 71 and 606, respectively. As illustrated, the spur gears are located on the portions of their respective shafts which extend beyond the end member 604. These gears provide a positive drive for shaft 606 so that the rotation of the rolls will be synchronized and the insole strips will be passed smoothly through the nip roller assembly. The spacing of the nips 615 and 616 is adjusted by moving shaft 606 vertically so that the corresponding beveled edges of the toe strip and the flanking forepart strips are pressed lightly together in the nip roller.

The intermediate sheet produced by joining the toe and forepart strips is fed by the nip rollers onto a table 622 (FIGS. 5B and 5C) and is guided across the table by means of guide fences 623 and 624. These fences are supported at the nip roller assembly end by means of transverse support bar 625 which may be carried by the end members 603 and 604 of the nip roller. The other ends of the guide fences are supported by a transverse support bar 626 which is carried by end members 627 and 628 of the support frame for the pressure roll assembly 68.

The pressure roll assembly 68 is substantially identical to the nip roll assembly 66, having a lower shaft 73 (FIG. 4C) carrying laterally adjustable lower rolls and mounted in fixed journal bearings supported by the end members 627 and 628.

An upper shaft 630 (FIG. 5C) carrying upper laterally adjustable rolls is also supported in end members 627 and 628 by means of vertically adjustable journal bearings. These upper shaft journal bearings are vertically movable by means of hand wheels 631 and 632 interconnected by a chain 633 which serves to keep the upper and lower shafts parallel. Lower shaft 73 of the pressure roll assembly is connected to lower shaft 71 of the nip roll assembly by means of chain 72 and thus is driven in synchronism with the nip roll assembly. Suitable spur gears or the like (not shown) insure synchronous rotation of upper shaft 630. As with the nip roll assembly 66, the rolls carried by the shafts of the pressure roll assembly 68 are laterally adjustable so as to be capable of receiving intermediate sheets of various widths.

The nip rolls in assembly 66 are rubber coated so that they are resilient, whereby the strips are initially contacted by relatively light pressure. The pressure rolls, on the other hand, are steel so that substantial pressure will be applied to the adhesive joints in the intermediate strip to assure a tight bond.

SECOND ADHESIVE STATION

After passing through the pressure roll assembly 68, the intermediate sheet is fed onto roller conveyor 640 which is comprised of a plurality of free-turning rollers journalled by suitable bearings in side channels 641 and 642. The roller conveyor carries the intermediate sheet to the second adhesive section 32 where the strip is picked up by a belt conveyor 643 mounted on pulleys carried by shafts 94 and 437. Conveyor 643 carries the intermediate sheet from the roller conveyor 640 across adhesive applicators 644 and 645, which are the the substantial duplicates of adhesive applicators 484 and 485 described above. These applicators are laterally adjustable by means of hend wheels 646 and 647, and are so adjusted that the adhesive applicator wheels apply hot melt adhesive to the outer beveled edges of the intermediate sheet; i.e., to the lower beveled surfaces of forepart strips 14 and 16 illustrated in FIG. 2. Suitable guide fences may be provided to direct the intermediate sheet from pressure roll assembly 68 to the second adhesive applicators. Such fencing is particularly desirable where the forepart material is soft and flexible, for such material is easily thrown off track and the fence holds it in place.

SECOND ASSEMBLY STATION

Belt conveyor 643 cooperates with the rotation of the adhesive applicator wheels to feed the intermediate sheet into the second assembly section 34 of the insole assembly machine, where the strip is supported by the raised portions 650 and 651 of assembly platforms 652 and 653, respectively. The strip is positioned between adjustable guide rails 648 and 649 slidably mounted on suitable cross bars. An additional wide belt conveyor may be required in addition to conveyor 643 to insure that the intermediate strip is carried all the way onto the assembly platforms. When the intermediate sheet has been properly located on the assembly platforms, as indicated by sensing switch 654, the final assembly operation is then initiated, whereby the heel strips previously located on roller conveyors 446 and 447 are moved onto platforms 652 and 653, respectively.

The mechanism for moving the heel strips onto their corresponding assembly platforms is illustrated in FIG. 18, which is a cross sectional view of the second assembly section 34 taken along the lines 18—18 of FIG. 5C. It will be apparent from a comparison of FIGS. 15 and 18 that the assembly mechanism for the second assembly section is substantially the same as the mechanism for the first assembly section, the primary difference being the lateral extension of the mechanism of FIG. 18 necessary to reach the outermost conveyors 446 and 447. The assembly mechanism is energized by electrically controlled clutch 102 which becomes operative upon closure of all of switches 448, 449 and 654 to transmit power from shaft 101 (FIG. 6) to shaft 656 on the second assembly section drive mechanism 105. Shaft 656 drives chain 657 to rotate the second assembly section drive shaft 658. Shaft 656 is also connected through spur gears 659 and 660 to rotate shaft 661 which, in turn, drives chain 662 to rotate the second assembly section drive shaft 663. Chains 657 and 662 pass around respective idler assemblies 664 and 665 to permit adjustment of the respective chains.

Shaft 663 drives assembler chain 666 which is carried on the laterally adjustable assembly section frame 667, which is illustrated in FIG. 19 in end view, while FIG. 18 illustrates this frame in cross section. Shaft 663 also drives assembler chain 668 (FIGS. 5C and 19), the two assembler chains passing around respective idler assemblies 669 and 670 and thence about sprockets carried by shaft 671 which is also mounted on the frame 667. The chain carries one or more assembler lugs 672, 673 and 674, 675 for sliding the heel strip off of roller conveyor 446, onto assembly platform 652 and into position against the shoulder formed by the raised portion 650 of the platform.

In similar manner, drive shaft 658 and shaft 680 are carried by a laterally adjustable assembly section frame 681, with assembler chains 682 and 683 passing around suitable sprockets on the shafts and around idler assemblies such as that illustrated at 684. Chain 682 is shown as carrying two assembler lugs 685 and 686 for removing heel strips from roller conveyor 447 and moving them into abutment with the shoulder formed by raised portion 651 on platform 653.

The assembly section frames 667 and 681 are laterally adjustable by means of a screw shaft 688 in the manner of the assembly section of FIG. 15, whereby the width of the raised portion 650, 651 may be varied by rotation of hand wheels 689 and 690 so that the raised portion will accommodate various widths of intermediate sheets. The width of the raised portion will be adjusted so that the beveled edges of the intermediate sheet which carry the adhesive applied at the second adhesive station will extend beyond the shoulder portions of assembly platform 652 and 653. Thus, when the heel strips are in position against this shoulder, the beveled edges of the heel strips will be vertically aligned with corresponding adhesive-coated edges of the intermediate sheet and in position for further assembly.

When the heel strips are in position, as will be indicated by sensing switch 694, three suction heads 695, 696 and 697 are energized to pick up the three strips. These suction heads are mounted on a movable frame 698 which is supported by slide rails 699 and 700 mounted on longitudinal support bars 701 and 702. A hydraulic cylinder 703 is connected to the movable frame 698 by means of a piston rod 704, whereby activation of the hydraulic cylinder effects longitudinal motion of the frame. Energization of the suction heads, followed by operation of the hydraulic cylinder, serves to pick up the intermediate sheet and heel strips and move them forwardly through the assembly section 34 and into the nip roller assembly 110. It will be noted that a gate 707 is provided at the end of the second assembly section 34 to prevent premature feeding of the strips into the nip roller section 110. This gate is lowered by a solenoid 708 when the hydraulic cylinder is activated, thereby permitting the intermediate sheet and the adjacent heel strips to be fed into the nip roller, where, as before, the edges which are to be joined are pressed together to provide an initial bonding.

In an alternative construction, the outer suction heads 695 and 697 can be replaced by suitable bracket arms fastened to the movable frame 698. These brackets would be shaped to extend behind the back end of the heel strips and would serve to push these strips into the nip roller as the frame moves forward. This gives a more positive feed to the rollers than do the suction heads, and can be done with the relatively rigid heel strips. The forepart strips assembled in the first assembly station utilize suction heads because of the flexibility of these strips precludes the use of pusher bracket arms.

SECOND ROLLER STATION

The nip roller assembly 110 preferably is substantially the same as the nip roller assembly illustrated in FIG. 17, and this assembly feeds the final composite insole sheet across support table 710 and into the pressure roller assembly 118, where pressure is applied to the bonded joints to effect a permanent bonding of the intermediate and heel strips.

The pressure roll assembly 118 feeds the composite strip across support table 711 to the final pressure roll assembly 124 which is illustrated in detail in FIG. 20. The composite sheet is guided across tables 710 and 711 by guide rails 712 and 713 supported by and laterally adjustable on cross bars 714 and 715. Bar 714 may be mounted on the frame for pressure roll assembly 118, while the cross bar 715 may be carried by the end frame members 720 and 721 of the pressure roll assembly 124.

Referring now to FIG. 20, which is an end view of the pressure roll assembly as seen from line 20—20 of FIG. 5D, it will be seen that this assembly differs in some respect from the previous roller mechanisms. It will be apparent that the assembly of FIG. 20 may be substituted for the various nip and pressure roll assemblies illustrated herein, and, if desired, assembly 124 may be the same as the previously described roller assemblies. It may be desirable in some embodiments to entirely eliminate the final pressure roll assembly 124 or, on the other hand, to provide a second pressure roll assembly following the pressure roll 68 in the first pressure roll station.

As seen in FIG. 20, the lower shaft 123 of the pressure roll assembly 124 carries a single roller 722 extending across the width of the assembly. Shaft 123 is journalled in fixed bearings carried by the end frame members 720 and 721 and carries on its outer end a spur gear 723 which drives a corresponding spur gear 724 mounted on the upper shaft 725. This upper shaft is mounted in the end frame members 720 and 721 by means of suitable journal bearings, such as the bearing illustrated in FIG. 4D at 726, these journal bearings being vertically movable within the support frame to permit adjustment of the shaft position. Such adjustment is accomplished by hand wheels 727 and 728 joined together by means of chain 729 for synchronous operation. The upper shaft carries a pair of pressure rolls 730 and 731 which are slidable on shaft 725. To adjust the lateral position of rolls 730 and 731, a threaded screw shaft 732 having opposing right-hand and left-hand threads and a guide shaft 733 extend laterally across the assembly 124 and are supported in end frame members 720 and 721. These parallel shafts 732 and 733 carry adjuster blocks 734 and 735, the first of which is illustrated in detail in FIG. 21. As may be seen in this Figure, adjuster block 734 is shaped with a pair of flanges 736 and 737 which conform to corresponding grooves in roll 730. Block 735 and roll 731 are similarly constructed. Rotation of the screw shaft 732 results in lateral motion of guide block 734 and, by reason of the location of flanges 736 and 737, this motion moves roll 730 along shaft 725. Roll 731 is similarly moved by guide block 735, but in the opposite direction by reason of the opposing threads, and the position of rolls 730 and 731 may easily be adjusted toward and away from each other to conform to the location of the joints being bonded in the composite sheet.

It has been found desirable in the manufacture of shoes to provide a perforation or scoring in the rigid toe material of the insole to facilitate adhesion to the uppers of the final shoe product. The stiffness of the materials used in making the toe portion of shoe uppers makes it difficult to form them and at the same time to fasten the uppers to the insole. To facilitate this, it has been found desirable to provide perforations or scorings on the insole, whereby the toe portion will bond more securely to the insole. With prior art, insole assembly methods, it was necessary first to perforate the toe board and then assemble the insole sheet, or after assembly to run the insole sheet through a separate perforating step. With the present device, the perforations can be produced on the toe strip during the assembly of the insole sheet, thus eliminating an additional step in the manufacture of insoles. To perform this step, the present invention contemplates the use of a toothed roll in place of one of the pressure roll assemblies in the second roller station, thereby for the first time combining the perforation of the toe strip with the manufacture of the insole sheet. Such a roll is illustrated in FIG. 21A, to which reference is now made. The pressure roll assembly 118 may be replaced by the perforating roll assembly 118' illustrated in this Figure, the assembly being generally similar in its structure to assembly 118, but including a toothed roll 738 mounted on shaft 71' and a plain roll 739 mounted on shaft 606'. The two rolls are mounted one above the other on their corresponding shafts and are generally centrally located in the roll assembly, whereby the toe portion will pass through the nip of these two rolls during the assembly operation. The remainder of the toothed roll assembly is substantially the same as the roller assembly illustrated in FIG. 17.

The perforating roller receives the composite insole strip from the nip roller assembly 110 and scores or indents the toe portion of the sheet as it is passed to the final pressure roll assembly 124. The spacing, or nip, between the rolls 738 and 739 may be adjusted so that the teeth, which cover the surface of roll 738, will score or indent the surface of the toe board to the desired depth, the pressure normally being insufficient to cause complete perforation of the toe portion. Thus, the strip, as delivered to the final pressure roll assembly, includes a pattern of indentations which serve to facilitate the manufacture of the shoe.

DELIVERY STATION

Figure 4D:
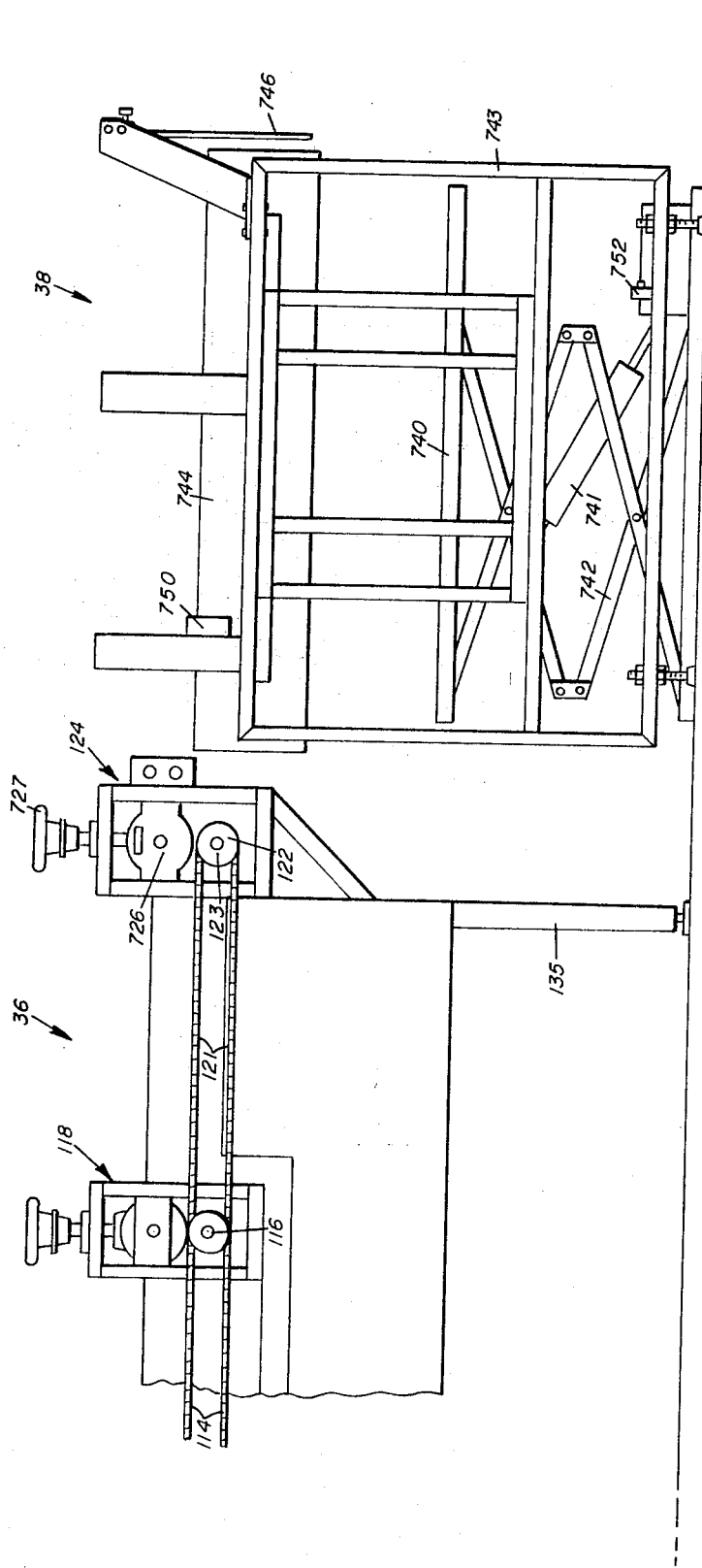

Passage through pressure roll assembly 124 completes the construction of the composite insole strip. This roller, which is operated in synchronism with the remainder of the machine, then feeds the completed sheet onto a stacker in the delivery section 38. This delivery section includes a pallet, or stacking platform 740, as shown in FIG. 4D, which is mounted on a conventional hydraulic scissors lift utilizing a hydraulic cylinder 741 and a scissors linkage 742. A stacker frame 743 surrounds the pallet and scissors lift to provide support for this mechanism and to provide guide means for directing the insole sheets into a stack. This is accomplished by means of guide fences 744 and 745 located on either side of the path of the sheets as they are expelled from the assembly machine, and by adjustable end bars 746 and 747 which stop the sheets and insure that they fall vertically down onto the platform.

At the start of a run of insole sheets, the pallet 740 is normally raised to its uppermost position, just below the level at which the sheets are fed out of the machine by the last pressure roll assembly 124. The sheets are guided onto the pallet, and it is gradually lowered as the stack of insole sheets grows. The lowering mechanism is controlled by means of a photoelectric sensor comprising a light source, or transmitter, 750 and a light receiver 751 mounted at suitable locations on frame 743 or on the guide fences 744, 745. When the stack of insole sheets reaches the level at which the light path between the source and receiver 750 and 751 is cut off, pressure is released in the hydraulic cylinder, as by conventional electrically controlled valves, and the pallet is lowered an amount sufficient to restore the light path. When the insole strips again break the light path, the pallet is lowered a second time, and so on until it reaches its lowermost limit. A certain amount of time delay is built into the photocell response so that it will operate the hydraulic system only when the stack has broken the light path, and not when a single sheet passes through the light beam. As the pallet approaches its lower limit of movement, its location will be determined by a sensing switch 752, also mounted on frame 743, which serves to stop the production of insole sheets, shutting off the feeder mechanism first, and then shutting down the machine completely when the last of the strips in process along the length of the machine have passed through the pressure roll assembly 124. The stack of completed composite insole sheets may then be removed from pallet 740, the pallet moved to the top of the delivery section, and the machine started again.

CONTROL CIRCUITS

From the brief description of the overall operation of the present machine, and from the detailed description of various parts thereof given above, the mode and manner of operation of the insole assembly machine will be apparent. However, some aspects of the operation are less evident, particularly where timing sequences are involved and where regulation of the operation is provided by certain of the sensing switches that have been identified above. Therefore, the detailed operation of the machine will now be set forth in combination with an explanation of the electrical circuitry used to control this operation, thereby to make clear the relationship between the various control elements and the mechanical structure described above. The electrical circuitry is shown in schematic form in FIGS. 22A–22D which may be vertically aligned in alphabetical order to provide a complete circuit diagram.

Figure 22A:
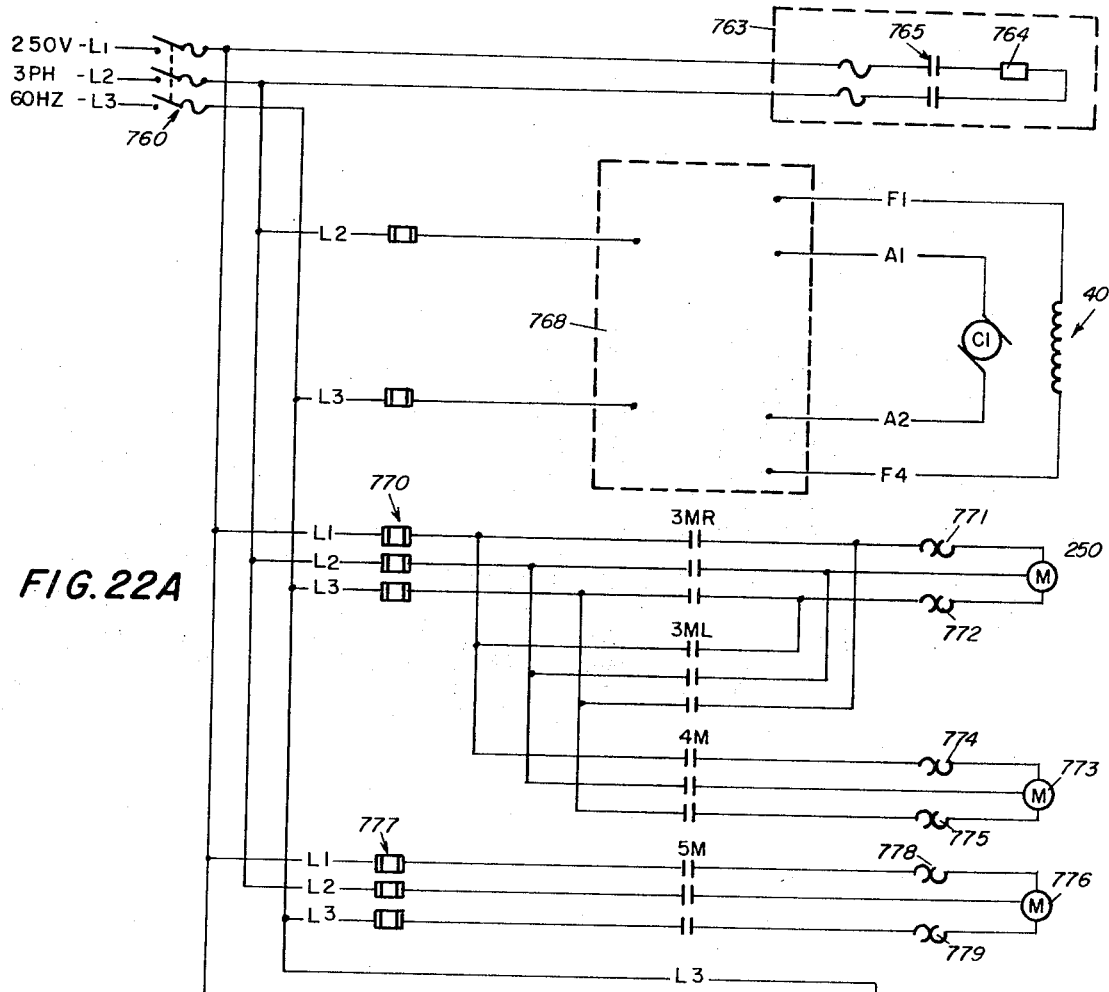

Referring now to FIG. 22A, input power to the present machine is applied by way of lines L1, L2 and L3 through a conventional power switch 760. The power supply may be a typical 230-volt, 60-cycle source, and may be connected into a control panel mounted on the side of the insole assembly machine in a housing such as that shown at 761 in FIG. 5B. The various control relays and circuit connections may also be conveniently mounted on such a control panel, with the various sensing switches which operate such control relays being located at appropriate points in the machine, as has been described. As will appear, many of the automatic machine functions may be overridden through the use of manual controls, and such controls may be mounted on a second panel 762, indicated in FIG. 4A. This second control panel may also include suitable indicator lights to permit an operator to monitor the status and operability of various parts of the machine. Although the cables and wires connecting the various sensing and limiting switches to the control panels and connecting the first and second control panels to each other are not illustrated in FIGS. 4 and 5 in order to avoid making these Figures so complex as to be unreadable, the physical location of such wires and cables will be evident to those skilled in the art from what follows.

Connected across lines L1 and L2 is a resistance heater unit 763 which is used to melt the adhesive used in joining the insole strips. The adhesive may be held at or above its melting point by a heating resistor 764 connected in series with normally open on-off switch contacts 765, suitable fuse means being provided in the supply line. The melting unit, which includes a pump to transfer melted adhesive to the applicators may be any commercially available unit, such as the Nordson Versamelt Model III, or equivalent.

Lines L2 and L3 provide single phase power to a solid state motor control circuit 768. This motor control circuit is a commercially available silicon controlled rectifier speed controller and may be, for example, a model GP100 controller manufactured by the General Electric Company. The main drive motor 40 for the insole assembly machine is connected to the output of controller 768, the field winding of the motor being connected across lines F1, F4 and the armature windings being connected across lines A1, A2 of the controller. As has been indicated, the main drive motor may be a one-half horsepower commercially available motor. The operation of the controller in response to various switch contacts will be set forth in detail hereinbelow.

Lines L1, L2 and L3 are connected through fuses 770 and through parallel reversing switches 3MR and 3ML to the feeder motor 250 which is used to raise and lower the strip-carrying platforms 140-144 in the feeder section 24. The reversing switch contacts are normally open, with contacts 3MR being closed to operate motor 250 in a direction to raise the platforms and contacts 3ML being closed to operate the motor in the ooposite direction. Overload relays 771 and 772 are connected in circuit with the feeder motor for additional protection. The motor typically may be a one-half horsepower commercially available AC motor. Also connected to lines L1, L2 and L3 through fuses 770 is a lift motor 773 which operates in conjunction with the hydraulic cylinder 741 in the delivery section 38 of the insole strip machine. Motor 773 is connected to the power supply lines through normally open contacts 4M and overload relays 774 and 775. Closure of contacts 4M serves to energize the lift motor to raise pallet 740 to receive completed composite sheets.

A vacuum pump motor 776 is operated from lines L1, L2 and L3 by way of fuses 777 and normally open contacts 5M. These contacts are closed whenever a vacuum is required in the system. Normally, energization of the motor will be manually controlled, and it will run continuously during operation of the machine in order to assure an adequate vacuum for the various suction heads. Overload relays 778 and 779 are provided in the vacuum pump motor supply line.

One phase of the three phase supply, as for example, lines L1 and L3, provide power to the primary windings 780, 782 of a control power supply transformer generally indicated at 784. The primary windings are connected in parallel across the supply lines, with a single secondary winding 786 providing power to the control circuitry for the insole assembly machine. One side of the transformer secondary is connected to ground line 788, while the other side of the transformer is connected through fuse 789 to power line 790. The various control circuits illustrated in the drawings are connected between ground line 788 and power line 790, and, for purposes of reference, the various elements of each circuit are arranged to lie in an identifiable row on the circuit diagram. These rows are numbered at the left-hand side of the circuit diagram, the numbers for the rows being enclosed in hexagonal blocks for easy reference. Certain of the circuit elements in some of the rows are indicated as being mechanically linked to a hexagonal block containing a numeral. Reference to the row indicated by this numeral will show another circuit element mechanically connected to another hexagonal figure referring back to the first row. This arrangement indicates an interconnection between the two circuit elements. For example, limit switch 300 in row 1 of the circuit diagram is indicated as being connected to an element on row 19. Reference to row 19 (FIG. 22B) indicates another contact for limit switch 300 mechanically connected to the first, with one being normally open and the other normally closed, the two contacts operating in tandem.

FEEDER MOTOR CONTROL

The first group of circuits to be considered provide the controls for feeder motor 250. Thus, row 1 includes relay coil 3MR which, when energized, closes contacts 3MR in the power supply of feeder motor 250 to operate the motor in a direction to raise the loading platforms in the machine feeder. Row 3 includes a relay coil 3ML which, when energized, closes the normally open motor contacts 3ML in circuit with feeder motor 250 to operate the motor in the opposite direction. The energizing circuits for the motor relay coils are connected across lines 788 and 790 and include in common a stop push button 791 which may be physically located on control panel 762. Manually-controlled directional switches are provided in the motor control circuits, with raise and lower push buttons 792 and 793 providing an interlock between the two relay coil circuits of lines 1 and 3 to insure that the motor can be energized in only one direction at a time. Thus, the manual raise push button 792 includes an upper contact which is normally open in row 1 and a lower contact which is normally closed in row 3, the contacts being mechanically interconnected. Similarly, manual lower push button 793 includes an upper contact in row 1 which is normally closed and a normally open contact in row 3. This interlock insures that when the manual raise push button is depressed to close the energization circuit of row 1, its lower contact will serve to open the energization circuit of row 3. Similarly, the manual lower push button opens row 1 when it closes the energization circuit of row 3.

A normally open contact for motor raise relay 3MR is connected across the normally open contact of manual raise push button 792, and is shown in row 2 as contact 3MR. Similar terminology will be used herein, whereby relay coils and their contacts will be similarly numbered, with the diagram showing the contact condition with the relay de-energized. Depression of the manual raise push button 792 will energize relay coil 3MR to shift its corresponding contacts, thereby closing contact 3MR in line 2 to seal in the energization circuit. Release of the push button will return its upper and lower contacts to the illustrated position, but with contact 3MR closed, a complete circuit is maintained through the relay. In similar manner, a normally open contact 3ML (line 4) is connected across the normally open lower contact of manual lower push button 793, whereby energization of the motor lowering relay coil in row 3 by depression of push button 793 will seal in the energization circuit of relay 3ML.

In series with the upper contacts of push buttons 792 and 793 in row 1 are contacts of the three platform limit switches illustrated in FIG. 8 at 300, 301 and 302. These limit switch contacts are normally closed, and open only when their corresponding loading platforms 143, 141 and 140 reach their uppermost limits, thus indicating that the supply of insole strips on the platforms is almost depleted. As will be seen, when any one of the platforms reaches the point where its corresponding limit switch is opened, the motor relay coil 3MR will become deenergized, thus returning its contacts to their rest, or illustrated, positions and de-energizing the motor 250. These limit switches may be any suitable microswitches having sensing arms which may be arranged to extend into the path of the moving platforms whereby contact with the platforms will cause the switches to operate.

A normally closed interlock contact of relay coil 3ML is connected in series with relay coil 3MR to insure that the motor raise coil will not become energized at the same time that the lowering coil 3ML is energized. Similarly, an interlock contact of relay coil 3MR is in series with coil 3ML so that energization of the motor raise coil will prevent energization of the motor lower coil. Overload contacts 771' and 772', corresponding to the overload contacts 771 and 772 in series with motor 250, are provided in row 1 in series with the relay coils 3MR and 3ML.

The limit switches 300, 301 and 302 in row 1 of the circuit diagram are referenced to rows 19, 20 and 21, respectively, (FIG. 22B) wherein a second, normally open, contact for each of these switches is illustrated. Contact 300' (line 19) is mechanically interconnected with contact 300 and is in series circuit with an indicator lamp 794 which may be located on the control panel 762. This indicator lamp will be illuminated when the platform level switch contact 300' closes to thereby complete a circuit across lines 788 and 790. Similarly, platform level switch 301 includes a normally open contact 301' in series with an indicator lamp 795, and platform level switch 302 includes a contact 302' in series with an indicator lamp 796. Both lamps 795 and 796 may be located on control panel 762 and are connected across lines 788 and 790 for energization when their corresponding loading platforms reach a predetermined location.

The energization circuit for lowering relay coil 3ML in row 3 includes three parallel energizing circuits, the first of which includes a normally open contact of relay 11CR in series with a normally closed contact of platform limit switch 303. The second energizing circuit includes a normally open contact of a control relay 12CR in series with a normally closed contact of platform limit switch 304, while the third circuit includes the series connection of a normally open contact of relay 13CR in series with a normally closed contact of limit switch 305. These three energizing circuits are connected through a normally closed contact of relay coil 3MR which acts as an interlock to open the lowering circuit when the motor raise circuit is energized. The parallel energizing circuits are connected in series with the motor lowering relay coil 3ML, so that a complete circuit through at least one of the circuits will maintain energization of the motor lowering circuit. A control relay coil 1CR is connected in parallel with coil 3ML and is energized when 3ML is energized. It will be seen that the motor lowering relay coil is connected across lines 788 and 790 by way of overload contacts 771' and 772' and by way of the manual raise and manual lower push-button contacts described hereinabove.

As was indicated in the description of the feeder section illustrated in FIGS. 7 and 8, the feeder motor 250 normally is continuously energized during the feed operation, with solenoid clutches being provided to connect the motor to the various platforms whenever they are to be raised. However, when any one of the platforms runs out of insole strips, the whole feeder must be shut down to avoid wasting strips by feeding fewer than the required number of strips into the machine. Thus, when the assembly operation begins, the feeder motor 250 is started in a direction to raise the platforms, and remains energized in this direction until any one of the platforms 143, 141 or 140 opens its corresponding limit switch 300, 301 or 302, or until the feeder motor is manually stopped. Motor 250 is started by depressing manual raise push button 792, which seals in upon energization of relay coil 3MR and disables the lowering circuit. After manual energization of the motor, the platform level is automatically adjusted upward by periodic energization of the appropriate solenoid clutches to keep the insole stacks level with the feed mechanism (i.e., the suction heads), as will be described. When one of the platforms reaches its upper limit, relay coil 3MR is de-energized and motor 250 is stopped.

The platforms must then be lowered for reloading by depressing the manual lower push button 793 and by selecting which platform, or platforms, are to be lowered. Closure of switch 793 permits energization of motor lowering coil 3ML through one or more of the parallel energizing circuits to operate motor 250 in a direction to lower the loading platforms, selection of the desired circuit being made by closing one or more of the normally open contacts 11CR, 12CR or 13CR. The selected circuit will remain energized until manually stopped or until its corresponding one of the three limit switches 303, 304, 305 is opened, and the motor 250 will run in its lowering direction until all three of the parallel circuits are opened. Relay contacts 11CR, 12CR and 13CR are responsive to control relay coils in rows 64, 65 and 66 which may be energized to permit selective lowering of the platforms. Contacts corresponding to these latter control relays are also included in the solenoid clutch circuits to be described to permit operation of the platform lowering motor and the control clutches from the control panel 762.

Referring now to rows 64, 65 and 66 (FIG. 22D) it will be seen that control relay coils 11CR, 12CR and 13CR are connected across lines 788 and 790 in series with corresponding contacts 800, 801 and 802 of a manually operable selector switch 803, having "maintain" contacts. A fourth contact 804 on the selector switch is connected in series with a control relay coil 16CR in row 66', and this series arrangement is also connected across lines 788 and 790. In position 1, selector switch 803 closes contacts 800 and energizes control relay 11CR, thus permitting motor lowering relay coil 3ML to be energized through the circuit of row 3 until limit switch 303 is opened by platform 143 reaching its lowermost position. It will be remembered that platform 144 is operated by the same drive shaft as platform 143, and thus will move with platform 143.

By moving selector switch 803 to position 2, contact 800 is opened, control relay coil 11CR is de-energized, and contact 801 is closed to energize relay coil 12CR. This permits energization of the motor lowering circuit until platform 141 opens limit switch 304 (line 4).

When selector switch 803 is in position 3, contact 802 is closed to energize control relay coil 13CR, thereby energizing motor 250 through the circuit of row 5 until platform 140 opens the normally closed limit switch contact 305. If it is desired to lower all platforms at the same time, selector switch 803 may be moved to its fourth position, labeled "all," thereby closing contact 804 to energize control relay coil 16CR. 16CR closes its corresponding normally-open contacts 16CR connected across each of the switch contacts 800, 801 and 802, thus energizing coils 11CR, 12CR and 13CR simultaneously. Motor 250 will then remain energized until all three of the limit switch contacts 303, 304 and 305 open. Selector switch 803 normally will be located on the control panel 762.

Figure 22B:
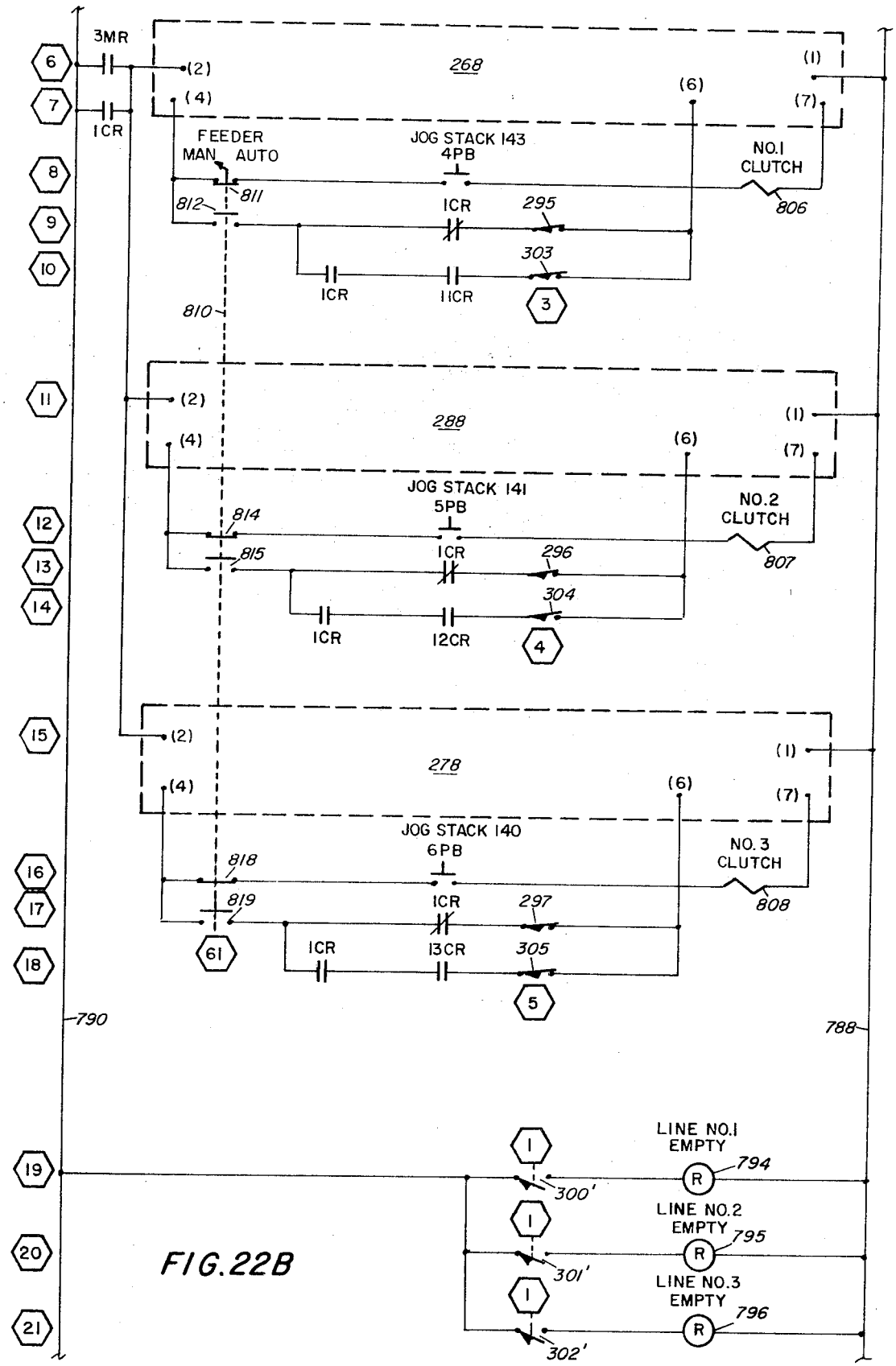

The electric clutches for the feeder section are described with respect to FIG. 7 and the control circuits therefor are illustrated in lines 6–18 of the circuit diagram, FIG. 22B. Clutches 268, 278 and 288, which are DC operated, are illustrated in block diagram form, since the electrical and mechanical structure of the clutches is well known and not necessary for an understanding of the operation of this invention. The operating coil for each clutch is illustrated in the circuit diagram, coil 806 being provided for clutch 268, coil 807 for operating clutch 288 and coil 808 being provided for clutch 278. The AC inputs of the three clutches may be connected across power supply lines 788 and 790 at row 6 by way of a normally open contact of the motor raise relay 3MR or at row 7 by a parallel normally open contact of the control relay coil 1CR. The latter control relay is connected in parallel to, and is energized with, the motor lower relay coil 3ML. The clutches may be energized whenever either the motor raise relay or the motor lower relay (i.e., the control relay 1CR) are energized and thus when feeder motor 250 is running in either the raise or lower direction. Clutches 268, 288 and 278 may be operated either manually or automatically, and for this purpose a selector switch 810 is provided which has contacts in the control circuit of each of the solenoid clutches, the contacts being ganged so that all three clutches may be simultaneously switched from manual to automatic operation.

Considering clutch 268, it will be seen that selector switch 810 includes contacts 811 in the manual circuit and contacts 812 in the parallel automatic circuit for clutch coil 806 (row 8). The manual switch contact 811 is connected in series with push button 4PB, whereby the coil 806 may be manually energized. As long as the push button is held down, coil 806 operates the clutch to connect the drive shaft of motor 250 to the raising and lowering mechanism of loading platform 143 and the platform will move up or down, depending on the direction of rotation of the motor.

By switching the feeder selector switch 810 to the automatic position, contacts 811 are opened and contacts 812 are closed, thereby placing the automatic control circuit in series with clutch coil 806. The automatic control circuit includes two parallel branches, the first of which includes a normally closed contact 1CR, which is opened when relay coil 1CR (row 4) is energized, and includes normally closed contacts of the stack height limit switch 295 (FIG. 8). The second branch of the automatic control circuit includes in series a normally open contact of relay 1CR, a normally open contact of relay 11CR, and a normally closed contact of lower platform limiting switch 303.

In the automatic mode clutch 268 will be energized through the first branch of the control circuit whenever motor 250 is energized to operate in the "raise" direction (i.e., when relay 3ML and consequently relay 1CR is not energized) and when switch 295 closes to indicate that the stack of insole strips is too low to be fed by the suction heads into the conveyor mechanism. Energization of the clutch with the feed motor 250 running in the raise direction will then cause platform 143 to move upwardly until limit switch 295 opens, thus bringing the uppermost strip of the stack into position to be picked up by the suction head assemblies 340 and 341 (FIG. 8). The normally closed contact of control relay 1CR in series with switch contact 295 opens when the motor lowering circuit is energized to prevent limit switch 295 from interfering with operation of the clutch during a lowering operation.

The lowering control for clutch 268 is in the second branch of the automatic control circuit, as shown in row 10. This circuit will permit coil 806 to operate when control relay 1CR is energized and when the platform operated by clutch 268 is selected by positioning selector switch 803 (line 64) to close contact 800 and energize control relay 11CR. Clutch 268 then remains energized until limiting switch 303 is opened by platform 143. Control relay 1CR is used to regulate this circuit instead of relay coil 3ML to provide a slight delay, whereby the motor 250 will be energized before the control circuit becomes operable.

Clutch 288, which controls the movement of loading platform 141, operates in substantially the same manner as clutch 268. Thus, a manual control circuit (row 12) includes a contact 814 of selector switch 810 which is closed during manual operation, and a push-button switch 5PB, which may be located on the control panel, connected in series with clutch coil 807. Closure of switch 5PB permits manual energization of the clutch 288 and manual lowering or raising of platform 141, depending on the direction of rotation of motor 250. For automatic operation, motor raise and motor lowering control circuit branches are connected in parallel with each other an in series with contact 815 of selector switch 810 and the clutch coil 807. The motor raise circuit branch includes a normally closed contact of relay 1CR, which is opened only when the motor lowering relay coil 3ML is energized, and a contact of stack limit switch 296. Switch 296 is closed whenever the stack of insole strips on platform 141 is below a predetermined level, and thus serves to energize clutch 288 to raise the stack to the proper level. When the stack reaches a level where the uppermost strip on the stack opens switch 296 to de-energize clutch coil 807. The lowering control circuit branch, which is in parallel with the platform raising circuit branch, includes a normally open contact of control relay 1CR and a normally open contact of control relay 12CR in series with a normally closed contact of platform limit switch 304. Thus, energization of control relays 1CR and 12CR serve to energize clutch 807 to lower stack 141 until switch 304 is opened.

Clutch 278 is controlled by a manual circuit which consists of the series connection of contact 818 of selector switch 810, a push button 6PB and a clutch coil 808. Selector switch contact 819 is connected in the automatic control circuit for clutch 278, with the automatic raising circuit branch for platform 140 including a normally closed contact of relay 1CR and the stack height control switch 297. When contact 297 is closed, platform 140 is raised until the stack of insole strips opens the contact, thus indicating that the uppermost strips are in position to be fed into the appropriate conveyor. The motor lowering circuit branch is in series with contact 819 and coil 808, but in parallel with the raising circuit branch, and includes a normally open contact of control relay 1CR and a normally open contact of control relay 13CR in series with platform limit switch 305 which opens when platform 140 has been lowered to its lowermost position.

From the circuits described in rows 1–21 and rows 64–66, it will be apparent that the feeder mechanism may be operated automatically or under manual control to position the several loading platforms for feeding insole strips to the assembly machine. For manual operation of the feeder to raise the platforms, the raise push button 792 is depressed, thereby energizing motor raise relay coil 3MR (row 1) if none of the platforms are in their uppermost position. Motor 250 will then start, and any selected one of the platforms may be manually raised by switching selector switch 810 into its manual position and operating the appropriate one of push button switches 4PB, 5PB or 6PB. With motor 250 energized, the platforms may be raised automatically in accordance with the level of the stack of insole strips merely by switching selector switch 810 to the automatic position. This places the positioning of the loading platforms under the control of stack sensing switches 295, 296 and 297.

To lower the platforms under manual or automatic control, the lowering circuit push button 793 is first depressed to open the motor raise circuit and close the motor lower circuit, thereby energizing the motor lower relay coil 3ML (row 3) through one or more of contacts 11CR, 12CR or 13CR, depending on the position of selector switch 803 (row 64). This will energize feeder motor 250 in a lowering direction, but none of the platforms will be lowered until the appropriate clutches are energized. This is accomplished by placing selector switch 810 in the automatic position, thereby permitting the clutch corresponding to the stack selected by switch 803 to be energized until it reaches its lowermost position. At this time, the corresponding one of switches 303, 304 or 305 will open, de-energizing its corresponding clutch. If only one of the platforms has been moved, the opening of switch 303, 304 or 305 will also stop motor 250; if all clutches have been energized so that all platforms are being lowered, then all three switches must open before motor 250 will shut down. Control relay 1CR is energized only during energization of the lowering circuit, thus providing a safety interlock which prevents continuity in any of the raise circuits after the motor 250 is energized and is rotating in the lowering direction. The control relay may be provided with a slight delay so that its corresponding contacts will not close until motor 250 has been energized, thereby providing a corresponding delay in the energization of the solenoid clutches. With selector switch 810 in the manual position and motor 250 rotating in the lowering direction, the platforms can be lowered manually by operating push buttons 4PB, 5PB or 6PB.

MAIN DRIVE MOTOR CONTROL CIRCUITS

Control circuits for the main drive motor 40 are illustrated in rows 22 and 23 of the circuit diagram, these circuits being shown in connection with the solid state motor control 768. Row 22 includes the manual start and stop circuit which is comprised of contact 822 of selector switch 823 which is closed when the switch is set at the manual position to close the starting circuit for the motor 40. When switch 823 is shifted to the automatic position, contacts 822 open. The starter circuit may also be opened by means of normally closed stop switch 7PB shown in series with contacts 822.

For automatic operation of motor 40, switch 823 is shifted to the automatic position, closing contact 824 which is in series with a normally open contact of time delay relay 3TR, the operating coil of which is found in line 62. As will be explained hereinafter, this time delay relay will be energized only when the system is properly set up for automatic operation, with the feeder motor 250 operating in a direction to raise the loading platforms. If a fault occurs in the system, the relay coil 3TR will be de-energized, and contact 3TR in line 23 will open a predetermined time thereafter to de-energize the main drive motor. This delay is provided to permit insole strips in transit along the machine to continue to the delivery station so that strips will not be stopped while in the assembly process. If this should happen, the adhesive would set on unfinished strips, and the strips in transit would be ruined. It will be noted that the manual stop switch 7PB is not operable during automatic operation of the machine, thus insuring that the machine will be stopped only under the control of the time delay relay 3TR.

It will be noted that a thermostatically controlled switch 826 is connected in series with the motor control circuits of rows 22 and 23. This thermostatic switch is responsive to the temperature of the thermoplastic glue which is used in the adhesive sections of the machine, and remains open as long as the glue is below a predetermined temperature. Thus, this switch insures that the assembly machine will not be operated until the glue has reached the proper melting temperature, at which time switch 826 closes to allow activation of the motor control circuit.

ASSEMBLY STATION CONTROL CIRCUITS

Figure 22C:
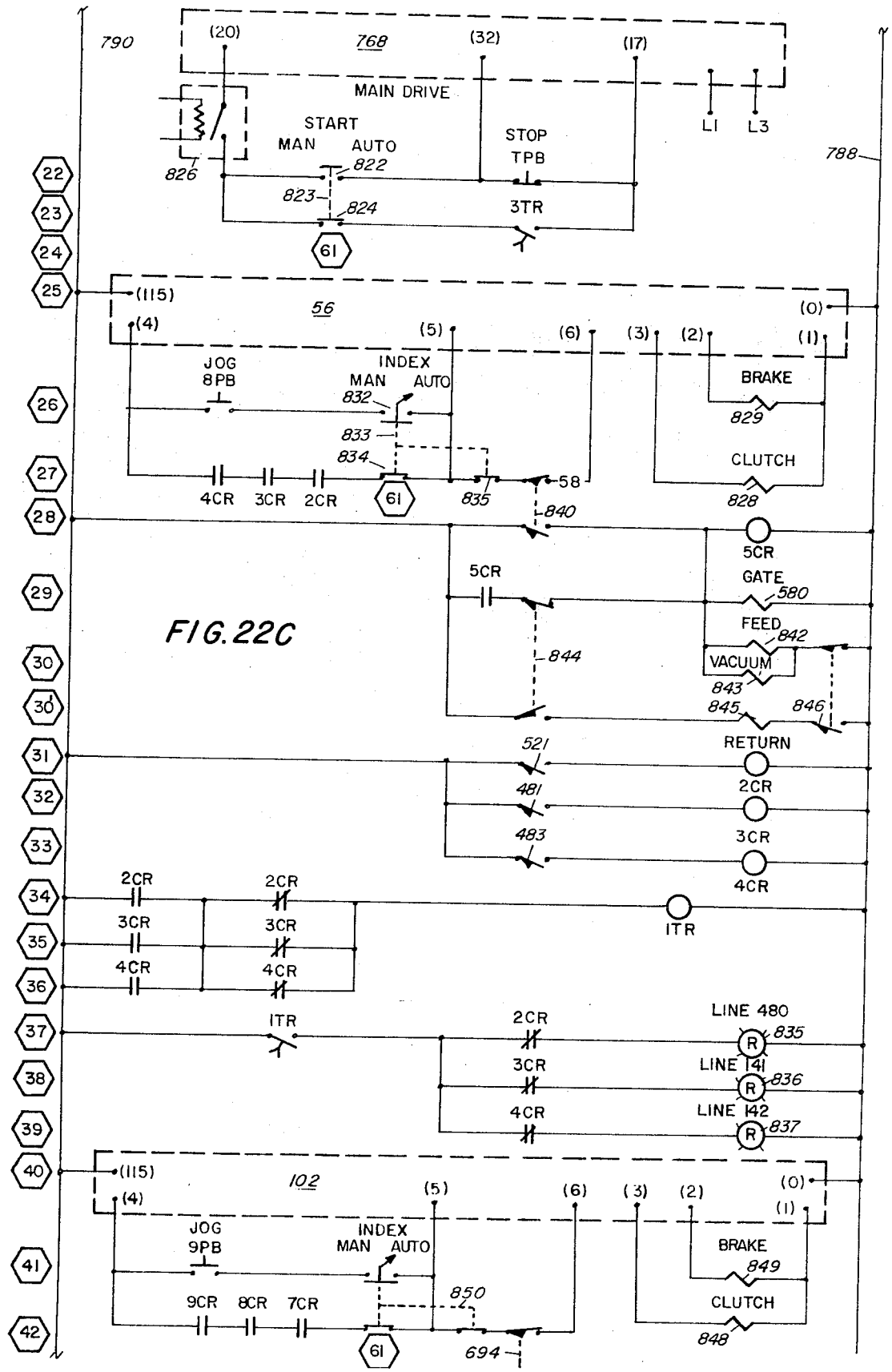

The control circuitry for the first assembly station 28 of the insole assembly machine are diagrammatically illustrated in rows 25–39 (FIG. 22C). As was described with respect to FIG. 6, the operation of the first assembly station is under the control of clutch-brake 56, energization of the clutch serving to operate the assembly mechanism to move the two side strips on conveyors 480 and 482 (FIG. 5A) into alignment with the center strip on the raised portions 512 and 513. This unit includes a clutch actuating coil 828, which causes the assembly mechanism to operate, and a brake coil 829 which becomes energized immediately upon de-energization of the clutch coil to stop the motion of the output shaft from the clutch, thereby permitting accurate positioning of the strips. Since the clutch-brake is a conventional and commercially available DC unit, further description of its mechanical and electrical structure and of the brake and clutch coils is not believed necessary.

The control circuit for clutch-brake 56 includes a manually operated push button 8PB (row 26) in series with upper contacts 832 of an indexing selector switch 833. When the indexing switch is in the manual position, with contacts 832 closed, the clutch may be energized by depressing push button 8PB and thus completing the DC circuit through clutch coil 829. The push-button switch and the indexing switch may both be located on control panel 762.

For automatic operation of clutch 56, indexing switch 833 is placed in the automatic position, thus closing its lower contacts 834 and 835. Since it is necessary to delay operation of the clutch-brake 56 until all three strips are properly positioned in the assembly section, normally open contacts 2CR, 3CR and 4CR of corresponding control relays are provided in series with contact 834, whereby the clutch will not be energized until all three of these control relays are energized.

The energization circuits for control relays 2CR, 3CR and 4CR are illustrated in rows 31, 32 and 33, where they are shown in series with limit switches 521, 481 and 483, respectively. As was noted in the description of FIG. 5A, limit switch 521 closes when the center, or toe strip is in position, abutting the gate 520. Similarly, limit switch 481 closes when the forepart strip on conveyor 380 reaches the end of the conveyor and switch 483 closes when the forepart strip on conveyor 482 reaches the end of its conveyor. Closure of limit switch 521 connects control relay 2CR across power supply lines 788 and 790, closing its normally open contact on row 27 and opening its normally closed contact on row 37. This latter contact disconnects an indicator lamp 835 to indicate that the toe strip from loading platform 140 is in position. Relay 2CR also closes a normally open contact on row 34 and opens a normally closed contact in series therewith to provide a conductive path between power supply lines 788 and 790 through a time delay relay 1TR (row 34). This conductive path for relay 1TR is through the now closed contact of 2CR and through one of two parallel normally closed contacts 3CR (row 35) or 4CR (row 36). Energization of 1TR does not, however, result in operation of its corresponding contacts immediately, the relay becoming operative only after a predetermined period of time. This time delay relay is a malfunction indicator and will serve to shut down the feed system if all three strips do not arrive to operate their corresponding limit switches within this predetermined period of time.

When the strip from platform 141 closes its corresponding limit switch 481, control relay coil 3CR (row 32) is energized to close its normally open contact 3CR on row 27, open its normally closed contact 3CR on row 38 to thereby de-energize indicator lamp 836, and close its normally open contacts and open its normally closed contacts on row 35. The closure of the normally open contacts on row 35 again provide a conductive path to time delay relay 1TR on row 34 as long as one of the three parallel normally closed contacts in rows 34, 35 and 36 remains closed. Finally, when the insole strip from loading platform 142 closes limit switch 483, control relay 4CR in row 33 closes its normally open contacts 4CR in row 27, opens its normally closed contacts 4CR in row 39 to de-energize indicator lamp 837, and shifts its corresponding contacts in line 36 to provide another conductive path through time delay relay 1TR.

When all three limit switches 521, 481 and 483 are closed, the corresponding contacts on rows 34, 35 and 36 will all be shifted and, with no conductive path remaining between lines 788 and 790, time delay relay 1TR will be de-energized. If this de-energization occurs within the predetermined period of time, the machine will continue operating; failure of one of the sets of contacts to shift in time indicates that one of the strips failed to arrive at the assembly station on schedule, and this will cause time delay relay 1TR to shut down the feeder portion of the machine to prevent it from jamming. However, as will be shown below, even the operation of relay 1TR will not shut the machine down immediately, for the delay circuits mentioned above maintain the energization of the main drive motor to allow strips in transit to complete the assembly operation.

With contacts 2CR, 3CR and 4CR simultaneously and momentarily closed on row 27, clutch 56 will be energized and shafts 545 and 557 (FIG. 5B) will rotate to move the forepart strips off their corresponding conveyors 480 and 482 into alignment with the beveled edges of the center toe strip. This alignment is signaled by the shifting of the contacts of an alignment sensing switch 840 (rows 27, 28) which is illustrated in FIGS. 5B, and which may be suitably positioned on the assembly mechanism for actuation by one of the lugs 550 or 560 carried by the assembly drive chains or for actuation by one of the strips as it moves into position. Opening of the upper contacts of limit switch 840 when the strips are aligned de-energizes clutch 828 and causes energization of brake 829 to halt the assembly mechanism. Sensing switch 840 is a momentary type switch and, when actuated by alignment of the forepart strips with the toe strip will shift from the illustrated position to open its upper contact and close its lower contact momentarily. The switch will remain in this shifted condition for a period of time sufficiently long to allow the three strips to start out of the assembly station, after which it will drop back to its illustrated position in readiness for the next assembly sequence.

When limit switch 840 shifts, its lower contact (line 28) connects control relay 5CR, gating solenoid 580 feed solenoid 842, and vacuum solenoid valve 843 across power supply lines 788, 790. Since alignment switch 840 is of the momentary type, control relay 5CR acts as a sealing relay, closing its normally open contacts 5CR in row 29 to provide a current path between lines 788 and 790 which bypasses the lower contacts of switch 840. This maintains energization of gate solenoid 580 which pulls down gate 520 (FIG. 5B) to permit the insole strips to be moved from the first assembly station into the nip rollers of the first roller assembly section 30. At the same time, feed solenoid 842 is energized to operate the control valve 590 on hydraulic cylinder 588 and vacuum solenoid 843 is energized to activate the suction heads carried by frame 584, whereby the suction heads will pick up the three insole strips and frame 584 will move forward under the control of the hydraulic cylinder to feed the strips across gate 520 and into nip rollers 66.

The sealing contacts 5CR in row 29, which maintain energization of the gate solenoid 580 and the feed solenoid 842, are connected in series with the upper contacts of a second sensing switch 844. Switch 844 shifts to the illustrated position when the center toe strip is moved into position in the assembly station. This switch contact remains closed until the insole strips have been withdrawn from the first assembly station by the nip roller 66, at which time the upper contacts of switch 844 open to de-energize gate coil 580, relay 5CR and feed coil 842. Switch 844 at the same time closes its lower contacts (row 30'), connected in series with a return solenoid coil 845 which, when energized, operates through control valve 590 to return frame 584 to its initial position. An additional sensing switch 846 may also be mounted in the assembly section to sense the motion of suction head frame 584. This switch may be located on one of frame members 519 or 518 adjacent slide bars 585 or 586 for actuation when frame 584 reaches the limit of its forward motion. The upper contact of switch 846 is then opened by frame 584 to de-energize the feed solenoid 842 and the vacuum solenoid 843. At the same time, the lower contacts of switch 846 are closed to complete the path through return solenoid coil 845, whereby frame 584 is returned to its initial position. After the insole strips have passed out of the first assembly section 28, the frame 584 will return to its initial position and switch 844 can return to the illustrated position, placing the assembly circuitry in condition for the next assembly cycle. This delay prevents the suction heads from returning while the strip is still in the assembly section, and thus prevents the suction heads from dragging on the strips.

It will be noted that the time delay relay 1TR in row 34 includes a normally open contact 1TR in row 37, whereby a fault condition due to the failure of one of the component strips to arrive will allow relay 1TR to be energized. This will complete a circuit through contact 1TR in row 37 and one or more of normally closed contacts 2CR, 3CR and 4CR, depending on which strip failed to arrive, thereby turning on one or more of the indicator lights 835, where the fault exists.

Rows 40-54 provide the control of the second assembly station 34 in the subject machine, the circuitry regulating the energization and de-energization of clutch 102. Since the control circuitry for clutch 102 is basically the same as that of clutch 56, the circuitry will be reviewed only briefly. Clutch coil 848 and brake coil 849 are so arranged that when one is energized, the other is released. Manual operation of the clutch 102 is accomplished by means of push button 9PB in row 41 when the indexing selector switch 850 is in the manual position. When in the automatic position, and when normally open contacts 7CR, 8CR and 9CR are closed, the clutch coil 848 may be energized to move the heel strips from conveyors 446 and 447 into alignment with the intermediate strip positioned on the raised portion 650, 651 of the second assembly station 34. The normally open control relay contacts in row 42 are closed by means of their corresponding control relay coils in rows 46, 47 and 48, which coils are energized in response to closure of position limit switches 654, 448 and 449. These switches close when the intermediate sheet and heel strips are properly positioned for the alignment operation. The control relays 7CR, 8CR and 9CR also include parallel interlock contacts in series with a time delay relay 2TR in row 49 so that if all of the strips are not properly positioned in the second assembly station within a predetermined period of time, a fault condition will exist and the feed portion of the machine will shut down. Similarly, these control relays operate indicator lamps 852, 853 and 854, the lamps being in circuit with a contact of the time delay relay 2TR so that a malfunction will be indicated on the control panel lamps.

As soon as the three strips have reached the ends of their corresponding paths, the outside strips abutting against the ends of the conveyors and the center strip abutting against gate 707, clutch 102 is energized, whereby drive chains 666, 668 and 682, 683 move the outer heel strips toward the center of the assembly station, into alignment with the beveled outer edges of the center strip. When the heel strips reach the shoulders formed in the assembly platforms 652 and 653, alignment limit switch 694 shifts, de-energizing clutch coil 848, energizing brake coil 849, and completing a circuit through control relay 6CR in line 43 to seal in a circuit through gate coil 708 and feed coil 854. The gate coil 708 moves gate 707 from the path of the insole strips, while feed coil 854 energizes the hydraulic cylinder 703 to move frame 698 and the suction heads carried thereby forward, with vacuum solenoid valve 855 operating the suction heads. This lifts the insole strips and feeds them into the nip rollers 110 in the second roller station 36. As the strips move out of the second assembly station, sensing switch 856 will shift, de-energizing the control relay coil 6CR and the gate feed and vacuum coils 708, 854 and 855. When frame 698 reaches the end of its forward motion, sensing switch 858 shifts, permitting return coil 860 to be energized, whereby the frame is returned to its initial position for the next assembly cycle. It will be noted that the limit switches 856 and 654 perform similar functions in their respective circuits, and thus it may be desirable to utilize a single switch contact, with control relay 7CR serving to operate suitable contacts in rows 44 and 45' in place of switch 856. However, the present arrangement is shown since it provides greater reliability than would be provided by the use of a single switch and relay contacts.

DELIVERY SECTION CONTROL CIRCUITS

Rows 55–58 of the circuit diagram illustrate the controls for the scissors lift which regulates the position of pallet 740 in the delivery section 38. Energization of lift motor 773 (FIG. 22A) is controlled by the energization of relay coil 4M in row 55. This relay is connected across power supply lines 788 and 790 through a normally closed stop push button 11PB, through a parallel branch starting circuit which comprises a start push button 10PB and a parallel sealing circuit, and through normally closed overload relay contacts of overload relays 774 and 775. Also connected in series with the relay coil 4M is a limit switch 862 which may be located on the delivery station frame 743 to determine when pallet 740 is at its uppermost limit. Switch 862 may be located adjacent the scissors mechanism or may be contacted by the pallet itself, and opening of this switch de-energizes lift motor 773.

At the beginning of the assembly operation, start button 10PB is depressed to energize relay 4M, and thus to energize lift motor 773. While relay 4M is energized, its contacts close the sealing circuit across push button 10PB so that the pallet will continue to move upwardly after release of the button to raise the pallet to a position to receive completed composite insole sheets. Limit switch 862 automatically prevents the pallet from being raised too far, while stop button 11PB permits manual control of its position. With the assembly machine in operation, completed composite strips will be fed to pallet 740, and the pallet must be gradually lowered so that the stack of completed sheets forming thereon will not extend above the feed point from pressure roller 124. This is accomplished by means of a photorelay circuit which is responsive to the light source 750 and photoelectric cell 751, mounted on the frame of the delivery section. The light source and photocell are arranged at the desired stack level, and whenever the light path between these two units is broken by the stack, a photo-relay circuit shown in block form at 864 energizes a relay coil PC in row 57. Relay PC closes its normally open contact PC in line 60 to energize a lowering solenoid 866. This latter solenoid releases hydraulic fluid from the scissors lift cylinder 741 to allow scissors linkage 742 to collapse a small amount and lower pallet 740, re-establishing the light path between units 750 and 751, de-energizing relay PC and reopening its contact to de-energize solenoid 866. Push button 12PB shunts the normally open contacts of relay PC to permit manual energization of lowering solenoid 866.

One contact of a lower limit switch 752 is connected in series with lowering solenoid 866. This switch is opened when pallet 740 reaches its lowermost limit, and thus prevents further energization of lowering solenoid 866. The other contact of this switch is connected in line 61 of the circuit diagram, and, as will be explained, the opening of this other contact serves to shut down the assembly machine after a period of time sufficiently long to allow strips in process through the machine to be assembled and delivered to the delivery station 38. Thus, switch 752 will be activated while there is still sufficient space on the pallet stack to receive additional composite sheets in transit through the machine.

FAULT SENSING CIRCUITS

The main condition and fault sensing circuit for the machine of this invention is contained in row 61 of the circuit diagram, to which reference is now made. This circuit requires that all selector switches be in the automatic position before the machine can start, requires that the feeder motor be running in a direction to raise the loading platforms and requires that the time delay fault detecting relays be de-energized. Thus, row 61 includes in series a contact 868 of selector switch 810, a contact 869 of selector switch 823, a contact 870 of selector switch 833 and a contact 871 of selector switch 850, all of which must be shifted to their automatic setting to close their corresponding contacts in this row. As has been noted, a contact of lowering switch 752 is connected in the series circuit of line 61 and must also be closed, indicating that pallet 740 is in a raised position, before the machine can operate. A normally open contact 3MR is in the series circuit of line 61, which contact is closed upon energization of the motor raise relay coil 3MR in row 1, which energizes the feed motor in a direction to raise loading platforms 140–144. A normally closed contact of time delay relay 1TR is also included, this contact opening upon the occurrence of any fault in the first assembly section which has prevented all three insole strips from being properly positioned within the prescribed period of time. It is, of course, important that these strips be moved promptly through the various stages of the machine, for the feeder mechanism will automatically supply new strips to the machine at timed intervals and a delay somewhere along the line can cause a serious malfunction in the operation. Thus, time delay relay 1TR stops the feed portion of the machine if some of the strips are delayed. Similarly, a contact in row 61 of time delay relay 2TR will open if a delay is sensed in the second assembly station.

A push button 14PB in row 61 permits manual stopping of the automatic cycle, while a push button 13PB starts the operation. Control relay 10CR operates a corresponding contact 10CR in row 62 to provide a bypass for push button 13PB to seal in the operation of the machine. Time delay relay coil 3TR in row 62 is energized by the closure of push button 13PB when all the rest of the condition responsive contacts indicate that the machine is ready for automatic operation. Energization of relay coil 3TR closes its normally open contacts 3TR in row 23 to start the main drive motor 40. The machine will then operate until one of the condition sensing contacts in row 61 opens, at which time the relay coil 3TR will be de-energized. By reason of its delay characteristics, however, the main drive motor will not immediately be de-energized. The motor will remain running for a predetermined length of time, until contact 3TR in line 23 opens, to permit any insole strips already in process in the machine to be assembled and fed to the pallet 740 in the delivery section. This time delay prevents additional losses by permitting strips to which adhesive has been applied to continue through the machine in a normal assembly operation. If the machine were to shut down immediately because, for example, the feeder motor 250 had been de-energized when one of the loading platforms ran out of insole strips, such a stoppage would ruin the strips in process, causing unnecessary loss. Thus, for example, the opening of contact 3MR by reason of de-energization of coil 3MR in row 1 would merely mean that additional strips would not be fed into the assembly machine and that the machine would stop after those strips in the machine had been assembled into a composite sheet. In similar manner, the machine would continue to run even after the pallet 740 had reached bottom and had opened switch 752.

VACUUM CONTROL CIRCUITS

It will be noted that control relay 10CR in row 61, which is in parallel with time delay relay 3TR, includes corresponding normally open contacts 10CR in row 63 in series with a vacuum control solenoid coil 874 which regulates the operation of the suction heads in the feeder section 24 of the subject machine. Energization of relay 10CR, therefore, is required to initiate the feeding of strips into the assembly machine at the feeder section. The occurrence of a fault in the machine, as sensed in row 61 of the control circuit, will immediately de-energize relay coil 10CR. Although the main drive motor will continue to run in such an event, by reason of the delay in timing relay 3TR, the de-energization of coil 10CR will open the circuit to solenoid 874 and prevent the suction heads from feeding any more insole strips into the machine conveyors. Thus, any strips already in the machine will complete their run, and the machine will shut down.

Also connected in series with solenoid 874 is the synchronizing switch 362 which is operated by cam 361 mounted on the suction head drive mechanism of the feeder section 24 and illustrated in FIG. 4A. This cam is driven by the main drive motor and is carried by the shaft which operates the reciprocating mechanism for the suction head assemblies. Since solenoid 874 regulates the vacuum supply to the suction heads, it will be seen that the opening and closing of switch 362 synchronizes the application of vacuum with the position of the suction head assemblies. In operation, then, the feeder suction heads move into contact with the uppermost insole strips on their respective stacks, a vacuum is drawn in the heads to grip the insole strips, the heads move to lift the strips and carry them to the conveyors, and the vacuum is removed to release the strips. This operation periodically feeds insole strips to the respective conveyors in the machine in synchronism with the rest of the assembly operation. The vacuum control valves for the machine (not shown) are operated by solenoid 874 in response to the closure of contacts 10CR and synchronizing switch 362.

Figure 22D:
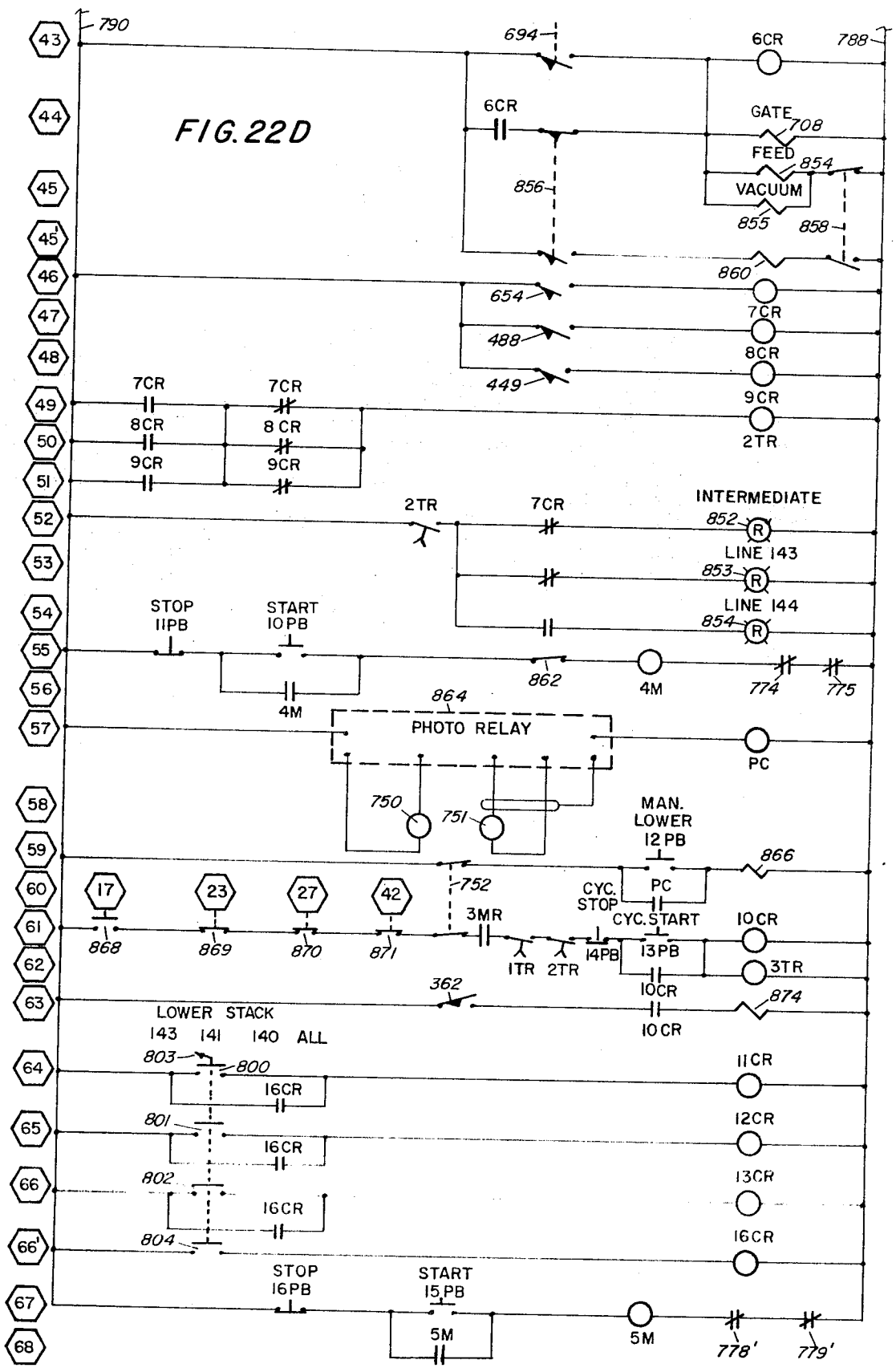

The final control circuit for the system is illustrated in rows 67 and 68 of FIG. 22D, this circuit providing energization of the vacuum pump motor 776 (FIG. 22A). This circuit includes a start push button 15PB and a stop push button 16PB, both manually operated and both located on the control panel 762. These push buttons are connected in series with the motor starting relay coil 5M across supply lines 788 and 790, energization of coil 5M serving to close the normally open bypass contacts 5M in row 68 to seal in its energizing circuit. Coil 5M also closes contacts 5M in the vacuum pump motor circuit of FIG. 22A. Overload relays 778 and 779 in series with motor 776 have corresponding normally closed contacts 778' and 779' in series with coil 5M in line 67.

Although the specific operation of the machine of the present invention will be apparent from what has gone before, the general functioning of the machine may briefly be stated as follows. Loading platforms 140–144 are lowered and appropriate heel, forepart and toe strips are stacked thereon. For automatic operation, the various selector switches are shifted to their automatic positions, the vacuum motor is started by depressing push button 15PB, the pallet 740 is raised to its uppermost position by depressing push button 10PB, the feeder motor 250 is started in the raise direction by depressing raise button 2PB and the cycle start button 13PB is depressed. When the thermoplastic glue has been heated to the proper temperature, the main drive motor will start and the suction head assemblies in the feeder section will periodically supply strips to the five conveyors 370–374. The center strip passes through the first adhesive section where glue is applied to its under beveled surfaces, and the strip is then fed to the first assembly station 28. The two strips from platforms 141 and 142 are fed directly to the first assembly section, and when all three strips are properly located there, clutch 56 is energized to align the flanking strips with the center strip. Thereafter, the three strips are picked up and fed through a nip roller in the first roll assembly 30 to provide initial contact between the beveled, adhesive coated edges of the center strip and the corresponding edges of the flanking strip. The joined edges pass through a pressure roll assembly 68 to provide a firm bond. The intermediate strip so formed is fed through a second adhesive station 32 where glue is applied to the outermost beveled edges of the intermediate strip, and this strip is fed into the second assembly section 34. The outermost insole strips from platforms 143 and 144 have been fed directly to the second assembly station, and when these two strips and the intermediate strip are in place, the second assembly mechanism is energized by way of clutch 102, again to align the outermost strips with the adhesive coated edges. The three pieces are then fed into nip rollers 110 of the second roll assembly where the outer strips are initially joined to the corresponding edges of the intermediate strip. The joined edges are then fed through two pressure roll assemblies 118 and 124 to produce the final composite sheet which is stacked on pallet 740. As the composite sheets are completed and fed onto the pallet, the pallet is slowly lowered under the control of photocell relay unit 864.

The automatic operation of the machine continues in this manner until a fault occurs, until one of the loading platforms is emptied of insole strips, or until the pallet 740 is filled, any one of which conditions automatically stops the machine. The machine may also be manually stopped. In any stop operation, the feeder mechanism is first disabled and then, after a predetermined period, the main drive motor is stopped, thereby permitting strips in process on the machine to complete their run so that the thermoplastic adhesive which has been applied to appropriate edges will not solidify without a joint being made.

Although the machine is adapted to assemble five strips, it will be apparent that the mechanism may be set up to accommodate a fewer number, if desired. This may be accomplished by appropriate disabling or latching of selected sensing and limiting switches so that the absence of a particular strip will not cause the machine to shut down. Thus, for example, if the strip carried by platform 144 is not to be used, sensing switch 449 could be latched closed so that the absence of a strip on conveyor 447 would not disrupt the operation of the machine. At the same time, one of the adhesive applicators would be disabled so that adhesive is not applied to an unbonded edge.

As has been explained in some detail, it is also possible to accommodate the present machine to various widths of insole strips by adjusting the location of the various adhesive applicators, roller assemblies, and the like. Although the various oppositely-threaded screw rods illustrated herein for such adjustments have been shown as being interconnected so that the applicators and other assemblies move in and out together, it may be desirable to adjust the two sides of the machine separately. This is particularly desirable where there is lost motion in the adjustment mechanism which makes accurate alignment difficult, and can be accomplished simply by providing separate, or separable screw rods.

Numerous modifications and variations in the machine of the present invention and in the described method of assembling insole strips will be apparent to those skilled in the art. Thus, for example, the center strips or sheets in each of the assembly stations need not be carried on raised platforms in the manner illustrated and described, but may be carried in a trough of suitable depth and width, with the adjacent outer strips being moved into position above the corresponding edges instead of beneath them. The assembly operation would then bond the outer adjacent strips onto the upper surface edges of the central strip or intermediate sheet. Although appropriate changes would have to be made in the location of the adhesive applicators, the operation of the machine would be basically the same, with the strips to be assembled being aligned at different levels and then fed through suitable bonding rollers.

A further modification of the raised receiving portion of the assembly platforms in either the first or second assembly stations, or both, involves the use of a roller conveyor for the platform portion. The stepped up portions of the platforms may be removed and replaced by a stationary roller conveyor, with both sides of the platform, including the shoulders, being movable as illustrated to adjust the lateral location of the forepart pieces in the first station or the heel pieces in the second station. The roller conveyor is somewhat narrower than the toe portion or the intermediate sheet portion which it must carry, so that the edges to be bonded extend over the sides of the conveyor for alignment with the outer strips. The conveyor thus serves the same purpose as the raised platform portions, but the rollers provide better tracking for the central strips so that the strips will be fed in proper alignment through the assembly stations.

It will be understood that although the illustrated strips are provided with beveled edges at the point of assembly, it may be desirable to join strips which are not beveled, or which are beveled to a greater extent than is illustrated. In either case, the edge bonding feature of the present invention is present.

The feeder section illustrated in the drawings has been found to be operable in a satisfactory manner. However, it will be apparent that if greater flexibility should be desired it is possible to provide separate clutches for each of the platforms 140-144, rather than providing the three clutch arrangements which cause the outer platforms to operate in synchronism. The additional clutches and support shafts necessary for such an arrangement, as well as the additional control circuitry required, would be duplications of the elements illustrated herein, and thus do not require specific description. Furthermore, the feeder section suction heads may be varied in number, spacing, and size, depending upon the size, weight and texture of the strip material being fed into the machine. Whereas two suction heads are shown for some of the strips, it may be possible to utilize only a single such head where the material being handled is light in weight.

Although microswitches have been indicated throughout the machine as the sensing means for detecting the location of the various strips and the position of the loading and delivery platforms, it will be apparent that any type of sensing switch can be used. For example, air flow sensing switches, proximity switches, magnetic switches and the like may all be suitable for use in this machine and may be used with appropriate modifications of the control circuitry.

Although the invention has been described in terms of using a thermoplastic adhesive, it will be apparent that other types of adhesive can be used if proper setting characteristics are available. The prior art has utilized latex adhesives in assembling insole strips, but such adhesives have not been found suitable for the present machine since they do not dry sufficiently fast. Similarly, the thermoplastic adhesives have not been practical for use in hand assembly operations since these adhesives set too fast to allow hand application and assembly. If a fast drying latex adhesive were available, it conceivably could be used in the present machine without slowing down the production of insole strips. Alternatively, it may be possible to operate the present machine with latex adhesive by precoating the strips before placing them in stacks on the loading platforms 140-144. Such precoated strips would not require the application of additional adhesives, and thus the adhesive applicators in the two adhesive stations could be moved out of the path of the strips as they move to the assembly and roller stations. The present machine could then be used merely to assemble the precoated strips, and it will be apparent that such machine assembly would be considerably faster than a corresponding hand assembly operation.

Thus, there has been disclosed a machine for the automatic assembly of strip material into a composite sheet by adhesive edge joining of adjacent strips automatically, accurately and economically. The machine, although particularly useful in the assembly of composite sheets from which shoe insoles may be cut, is also useful in the assembly of strips of any type to form a resultant composite sheet. Thus, it is desired that the invention not be limited to the specific embodiment disclosed herein, but that the inventive concept be limited only by the scope of the following claims.

We claim:

1. A machine for edge laminating a plurality of strips to form a composite sheet comprising a feeder section, a first adhesive section, a first assembly station, and a first roller section, means for conveying a first one of said strips from said feeder section through said adhesive section to said first assembly station, means for conveying a second strip to said first assembly station, means in said first assembly station for aligning the leading edges of said first and second strips in a plane perpendicular to their common direction of travel and thereafter aligning corresponding edges of said strips in a common vertical plane, said strips being vertically spaced, and means for conveying said first and second aligned strips in synchronism through said first roller section to move said strips toward each other, thereby joining said strips and forming said sheet.

2. The machine of claim 1, wherein said feeder section comprises means for receiving stacks of said strips and means for removing one strip at a time from each stack for deposit on corresponding conveying means.

3. The machine of claim 1, wherein said first adhesive section includes means for applying adhesive to at least one edge of said first strip, whereby said first strip can be joined to said second strip along said edge.

4. The machine of claim 1, wherein said first roller station includes a nip roll and a pressure roll for bonding corresponding edges of said strips to form said edge laminated composite sheet.

5. The machine of claim 1, wherein said first adhesive section includes means for applying adhesive to at least one edge of said first strip as said first strip is being conveyed to said first assembly station.

6. The machine of claim 5, wherein said second strip is conveyed directly to said first assembly station, said first assembly station including means for aligning said one adhesive-coated edge of said first strip with a corresponding edge of said second strip.

7. A machine for edge laminating a plurality of strips to form a composite sheet comprising a feeder section, a first adhesive section, a first assembly station, and a first roller section, means for conveying a first one of said strips from said feeder section through said adhesive section to said first assembly station, means for conveying a second strip to said first assembly station, means in said first assembly station for longitudinally aligning said first and second strips, means responsive to the longitudinal alignment of said first and second strips for vertically aligning corresponding edges of said strips, and means for conveying said first and second aligned strips in synchronism through said first roller section to join said strips and form said sheet.

8. The machine of claim 7, further including means responsive to the vertical alignment of said strips for energizing said means for conveying said strips through said first roller station.

9. The machine of claim 8, said first roller station includes a nip roll and a pressure roll for bonding said corresponding edges of said first and second strips, thereby forming said composite sheet.

10. In an assembly machine for edge bonding strips of material to form a composite sheet, a first adhesive station, means for conveying a first strip through said adhesive station while coating one edge of said strip with adhesive, means for longitudinally aligning and thereafter vertically aligning said adhesive-coated edge of said first strip with a corresponding edge of a second strip, and means responsive to said longitudinal and vertical alignment for pressing said edges together to join said strips.

11. The assembly machine of claim 10, further including control circuit means for said machine, said control circuit having a drive motor control circuit for regulating said means for conveying, sensing means responsive to the locations of said strips for operating said means for aligning, and sensing means for advancing said strips to said means for pressing, whereby strips are sequentially fed through said adhesive station, aligned, and pressed to form composite sheets automatically.

12. The assembly machine of claim 10, further including a second adhesive station, means for conveying the sheet formed from said first and second strips through said second adhesive station while coating one edge of said sheet with adhesive, means for longitudinally and vertically aligning the adhesive-coated edge of said sheet with a corresponding edge of a third strip, and means for pressing said last-named corresponding edges together to join said sheet and said third strip.

13. The assembly machine of claim 12, further including control circuit means for synchronizing the operation of said machine, whereby sets of first, second and third strips may be fed to said machine in timed sequence automatically to form a plurality of said composite sheets.

14. The assembly machine of claim 13, further including feeder means for supplying said strips, said feeder means including first, second and third platforms for receiving stacks of said first, second and third strips, respectively, and means for drawing and feeding to a corresponding conveyor the topmost strip from each stack.

15. The assembly machine of claim 14, wherein said means for drawing and feeding the topmost strip from each stack comprises at least one suction head assembly movable in a reciprocating path to pick up and deliver said strip, said suction head assembly including a suction head, guide block means reciprocable on a horizontally extending arm and supporting said suction head, said suction head being vertically movable with respect to said guide block, and cam means adjacent said arm for causing said suction head to move vertically with respect to said guide block as said suction head is reciprocated horizontally along said arm.

16. The assembly machine of claim 15, wherein said first, second and third platforms are vertically movable to maintain the topmost strip of each stack accessible to said suction head assemblies, said control circuit means further including sensing means responsive to an empty platform to disable said suction head assembly.

17. The assembly machine of claim 15, said control circuit means further including means responsive to a malfunction in said machine to disable said suction head assembly and to shut down the remainder of said assembly machine a predetermined time thereafter.

18. The assembly machine of claim 13, wherein said means for vertically aligning said first and second strips comprises means for moving one of said first and second strips laterally with respect to the other of said first and second strips, whereby one of said corresponding edges is disposed above the other.

19. The assembly machine of claim 18, wherein said means for vertically aligning the said corresponding edges of said sheet and said third strip comprises means for moving said strip laterally with respect to said sheet to dispose one of said corresponding edges vertically above the other.

20. The assembly machine of claim 19, further including feeder means for supplying said strips, said feeder means including first, second and third platforms for receiving stacks of said first, second and third strips, respectively, and means for simultaneously drawing and feeding to a corresponding conveyor the topmost strip from each stack whereby a set of strips is fed to said assembly machine.

21. In an automatic assembly machine for edge bonding diverse strips of material to form composite sheets, a first applicator station for applying adhesive to two edges of a first strip; a first assembly station; means for conveying said first strip to said first assembly station and into longitudinal alignment with second and third strips whereby the leading edges of said strips are in a plane perpendicular to their common direction of travel; means at said assembly station for vertically aligning corresponding edges of said second and third strips with said adhesive-coated edges of said first strip, said corresponding edges of said strips being in common vertical planes and vertically spaced; a roller station; means for advancing said first, second and third aligned strips in synchronism into said roller station to press said vertically spaced corresponding edges together, thereby joining said strips and forming a sheet; a delivery station; and means for feeding said sheet to said delivery station.

22. The automatic assembly machine of claim 21, wherein said first applicator station comprises roller applicator means for applying a liquid adhesive to the edge surfaces of said first strip, the spacing of said roller applicator means being adjustable to receive strips of various widths.

23. The automatic assembly machine of claim 21, wherein said first assembly station includes a first platform for receiving said first strip and support means for receiving said second and third strips, second and third platforms adjacent said first platform, and means responsive to longitudinal alignment of said strips for moving said second and third strips laterally onto said second and third platforms and into vertical edge alignment with said first strip.

24. The automatic assembly machine of claim 23, wherein the level of said second and third platforms is below that of said first platform, whereby the edges of said second and third strips are spaced below the corresponding edges of said first strip when vertically aligned.

25. The automatic assembly machine of claim 24, wherein said means for laterally moving said second and third strips comprises motor driven lug means, and control circuit means for operating said lug means only when said strips are longitudinally aligned.

26. The automatic assembly machine of claim 21, wherein said means for advancing said first, second and third strips into said roller station comprises a plurality of suction heads spaced above said strips and adapted to pick up said strips, and means for moving said suction heads toward said roller station thereby to carry said strips to said roller station.

27. The automatic assembly machine of claim 26, wherein said means for conveying said first strip into longitudinal alignment includes stop gate means for limiting the travel of said first strip, and wherein said means for advancing said first, second and third strips into said roller station further comprises means for sensing said vertical alignment and thereafter retracting said stop gate and activating said means for moving said suction heads.

28. The automatic assembly machine of claim 21, further including a main drive train, means for selectively connecting said drive train to said applicator station, said first assembly station, said conveying means, said alignment means, and said roller station; and a control circuit for operating said means for selectively connecting said drive train, whereby sets of first, second and third strips are edge bonded to form said sheets.

29. The automatic assembly machine of claim 28, said control circuit including first sensor means to detect the longitudinal alignment of said first, second and third strips, and timer means for disabling said drive train if said strips are not longitudinally aligned within a predetermined time period.

30. The automatic assembly machine of claim 29, said control circuit further including means responsive to said first sensor means for operating said drive train to vertically align corresponding edges of said first, second and third strips, and second sensor means for detecting said vertical alignment.

31. The automatic assembly machine of claim 30, said control circuit further including means responsive to said second sensor means to activate said means for advancing said first, second and third strips into said roller station.

32. The automatic assembly machine of claim 31, said control circuit further including manual override means whereby said machine can be manually controlled.

33. The automatic assembly machine of claim 21, further including feeder means for supplying said strips to said applicator station and said first assembly station, said feeder means being adapted to supply to said machine sets of three strips at spaced time intervals for assembly into sheets.

34. The automatic assembly machine of claim 33, further including a first conveyor for carrying said first strip from said feeder means through said applicator station to said first assembly station and second and third conveyors for carrying said second and third strips, respectively, directly to said first assembly station.

35. The automatic assembly machine of claim 34, further including a second applicator station for applying adhesive to two edges of said sheet, a second assembly station, means for conveying said sheet to said second assembly station and into longitudinal alignment with fourth and fifth strips; means for vertically aligning corresponding edges of said fourth and fifth strips with said adhesive-coated edges of said sheet; a second roller station; means for advancing said sheet and said fourth and fifth strips into said second roller station to press said last-named corresponding edges together to form bonded joints, whereby a composite sheet is formed, said composite sheet being delivered to said delivery station.

36. The automatic assembly machine of claim 35, wherein said feeder means is adapted to supply fourth and fifth strips with each set of strips, and fourth and fifth conveyor means for carrying said fourth and fifth strips, respectively, from said feeder means directly to said second assembly station.

37. The automatic assembly machine of claim 36, further including control circuit means for synchronizing the operation of said machine, whereby said sets of five strips are fed periodically to said machine for assembly into composite sheets, said control circuit means including means for detecting a malfunction in said machine and for shutting down said machine in response thereto.

38. The automatic assembly machine of claim 37, wherein said control circuit means includes first and second sensing means for said first and second assembly stations for detecting the longitudinal and vertical alignment of said strips, and timer means responsive to a malfunction of said machine to disable said feeder means and thereafter to shut down said assembly and roller stations.

39. The automatic assembly machine of claim 21, further including control circuit means for synchronizing the operation of said machine and wherein said composite sheet formed thereby is an insole sheet for use in making insoles for shoes and said adhesive comprises a fast-setting thermoplastic adhesive, whereby said assembly machine can produce said composite insole sheets at a relatively high rate of speed.

40. The automatic assembly machine of claim 21, wherein said first strip is a toe strip for an insole; said roller station further including means for producing indentations in said toe strip during assembly of said composite sheet.

41. The machine of claim 40, wherein said means for producing indentations includes a toothed roller and a smooth roller forming a nip through which said toe strip passes.

* * * * *